(12) United States Patent
Langen et al.

(10) Patent No.: US 12,473,111 B2
(45) Date of Patent: Nov. 18, 2025

(54) METHOD AND APPARATUS LOADING OF CASES WITH ITEMS

(71) Applicant: AFA SYSTEMS LTD., Brampton (CA)

(72) Inventors: H. J. Paul Langen, Brampton (CA); Sharran Badrie, Brampton (CA); Tomasz Kardynal, Mississauga (CA); Constantin Mighiu, Thornhill (CA)

(73) Assignee: AFA SYSTEMS LTD., Brampton (CA)

( * ) Notice: Subject to any disclaimer, the term of this patent is extended or adjusted under 35 U.S.C. 154(b) by 23 days.

(21) Appl. No.: 17/186,618

(22) Filed: Feb. 26, 2021

(65) Prior Publication Data

US 2022/0258894 A1    Aug. 18, 2022

(30) Foreign Application Priority Data

Feb. 12, 2021 (CA) ..................... 3109187

(51) Int. Cl.
    *B65B 35/30*      (2006.01)
    *B65B 5/06*      (2006.01)
    (Continued)

(52) U.S. Cl.
    CPC ............... *B65B 35/30* (2013.01); *B65B 5/06* (2013.01); *B65B 7/20* (2013.01); *B65B 43/10* (2013.01); *B65B 43/126* (2013.01); *B65B 43/54* (2013.01)

(58) Field of Classification Search
CPC .. B65B 35/30; B65B 5/06; B65B 7/20; B65B 43/10; B65B 43/126; B65B 43/54
See application file for complete search history.

(56) References Cited

U.S. PATENT DOCUMENTS

| 1,434,230 A | 10/1922 | Shawver et al. |
| 1,471,924 A | 10/1923 | Saylor et al. |

(Continued)

FOREIGN PATENT DOCUMENTS

| CA | 2700657 C | 11/2007 |
| CA | 2712878 C | 2/2011 |

(Continued)

OTHER PUBLICATIONS

International Search Report and Written Opinion of the International Searching Authority issued by the Canadian Intellectual Property Office on May 16, 2022, in connection with International Patent Application No. PCT/CA2022/050198, 11 pages.

(Continued)

*Primary Examiner* — Joshua G Kotis
*Assistant Examiner* — Scott A Howell

(57) ABSTRACT

A system is disclosed for loading cases with items comprising: an item delivery apparatus operable to deliver a plurality of items to a transfer station; a collation platform operable to support a group of items; a pedestal apparatus operable to support the group of items; a first transfer apparatus operable to transfer a plurality of items from the item delivery apparatus to the collation platform. A second transfer apparatus transfers the group of items from the collation platform to the pedestal apparatus. At least one movement rod moves the group of items. A case movement apparatus such as a six-axis robotic arm is moves an erected case in a path that sheaths a group of items located on said pedestal apparatus with an erected case. The path of the case may have a tilted position and include an arced pivoting movement.

54 Claims, 30 Drawing Sheets

(51) Int. Cl.
  *B65B 7/20* (2006.01)
  *B65B 43/10* (2006.01)
  *B65B 43/12* (2006.01)
  *B65B 43/54* (2006.01)

(56) References Cited

U.S. PATENT DOCUMENTS

| | | |
|---|---|---|
| 2,549,800 A | 4/1951 | George |
| 2,706,935 A | 4/1955 | Pasjack |
| 2,786,316 A | 3/1957 | Silva et al. |
| 2,869,297 A | 1/1959 | Neer |
| 2,879,638 A | 3/1959 | Hill |
| 2,900,778 A | 8/1959 | Hartbauer |
| 2,902,810 A | 9/1959 | McGihon |
| 3,292,813 A | 12/1966 | Roegner |
| 3,461,642 A | 8/1969 | Langen et al. |
| 3,619,967 A | 11/1971 | Alduk |
| 3,626,661 A | 12/1971 | Reichert et al. |
| 3,698,151 A | 10/1972 | Arneson |
| 3,716,962 A | 2/1973 | Langen |
| 3,757,486 A | 9/1973 | Feurston et al. |
| 3,803,993 A | 4/1974 | Graham |
| 3,843,039 A | 10/1974 | Brown et al. |
| 3,930,438 A | 1/1976 | Hackman et al. |
| 3,940,907 A | 3/1976 | Ganz |
| 4,010,593 A | 3/1977 | Graham |
| 4,010,597 A | 3/1977 | Nelson |
| 4,031,817 A | 6/1977 | Raschke |
| 4,061,081 A | 12/1977 | Pinto et al. |
| 4,109,444 A | 8/1978 | Lee |
| 4,163,414 A | 8/1979 | Bachman, Jr. et al. |
| 4,213,285 A | 7/1980 | Mancini |
| 4,414,789 A | 11/1983 | Pattarozzi |
| 4,553,954 A | 11/1985 | Sewell et al. |
| 4,569,182 A | 2/1986 | Leuvering |
| 4,570,421 A * | 2/1986 | Focke .................. B65B 7/20 53/376.5 |
| 4,674,261 A * | 6/1987 | Sabel .................. B65B 5/028 53/242 |
| 4,763,462 A | 8/1988 | Johnson, Jr. et al. |
| 4,802,324 A | 2/1989 | Everson |
| 4,823,539 A | 4/1989 | Kuckhermann et al. |
| 4,915,678 A | 4/1990 | Morita |
| 4,942,720 A | 7/1990 | Berney |
| 4,962,625 A | 10/1990 | Johnson, Jr. et al. |
| 5,024,640 A | 6/1991 | Saitoh |
| 5,042,233 A | 8/1991 | Huang et al. |
| 5,060,451 A | 10/1991 | DeMay et al. |
| 5,061,231 A | 10/1991 | Dietrich et al. |
| 5,105,600 A * | 4/1992 | DePoint, Jr. ............ B65B 5/024 53/238 |
| 5,106,359 A | 4/1992 | Lott |
| 5,115,625 A * | 5/1992 | Barbulesco ............. B65B 7/20 53/284 |
| 5,145,070 A | 9/1992 | Pallett et al. |
| 5,207,630 A | 5/1993 | Decker et al. |
| 5,341,626 A | 8/1994 | Beckmann |
| 5,352,178 A | 10/1994 | Pazdernik |
| 5,393,291 A | 2/1995 | Wingerter |
| 5,411,464 A | 5/1995 | Calvert et al. |
| 5,440,852 A | 8/1995 | Lam |
| 5,456,570 A | 10/1995 | Davis et al. |
| 5,531,852 A | 7/1996 | Walsh |
| 5,600,936 A | 2/1997 | Moncrief et al. |
| 5,624,368 A | 4/1997 | Cromwell |
| 5,626,002 A | 5/1997 | Ford et al. |
| 5,720,156 A | 2/1998 | Bridges et al. |
| 5,727,365 A * | 3/1998 | Lashyro ............. B65B 61/207 53/238 |
| 5,782,064 A * | 7/1998 | Beeman .................. B65B 7/20 53/377.6 |
| 5,997,458 A | 12/1999 | Guttinger et al. |
| 6,032,853 A | 3/2000 | Chevalier |
| 6,099,450 A | 8/2000 | Schenone et al. |
| 6,128,886 A | 10/2000 | Johnson, Jr. et al. |
| 6,226,965 B1 | 5/2001 | Lam |
| 6,378,275 B1 | 4/2002 | Andersson |
| 6,588,175 B1 | 7/2003 | Gaudenzi |
| 6,688,075 B2 | 2/2004 | Cristina |
| 6,721,762 B1 | 4/2004 | Levine et al. |
| 6,764,436 B1 | 7/2004 | Mazurek |
| 6,799,671 B1 | 10/2004 | Sanchez Gomes |
| 6,876,958 B1 | 4/2005 | Chowdhury et al. |
| 6,912,762 B2 | 7/2005 | Lile et al. |
| 6,913,568 B2 | 7/2005 | Frank et al. |
| 6,955,032 B2 | 10/2005 | Smith |
| 6,968,668 B1 | 11/2005 | Dimario et al. |
| 7,073,705 B2 | 7/2006 | Auclair et al. |
| 7,093,408 B2 | 8/2006 | Duperray et al. |
| 7,131,941 B2 | 11/2006 | Makar et al. |
| 7,174,698 B2 | 2/2007 | Spatafora et al. |
| 7,243,481 B2 | 7/2007 | Draghetti |
| 7,302,785 B2 | 12/2007 | Heuvel et al. |
| 7,326,165 B2 | 2/2008 | Baclija et al. |
| 7,404,788 B2 | 7/2008 | Monti |
| 7,510,517 B2 | 3/2009 | Goodman |
| 7,682,122 B2 | 3/2010 | Maynard et al. |
| 7,720,567 B2 | 5/2010 | Doke et al. |
| 7,758,292 B2 * | 7/2010 | Close .................. B65B 69/0025 414/412 |
| 7,788,881 B2 | 9/2010 | Johnson et al. |
| 7,828,708 B2 | 11/2010 | Huang et al. |
| 7,832,183 B2 | 11/2010 | Jacob et al. |
| 7,988,406 B2 | 8/2011 | Schafer |
| 7,991,505 B2 | 8/2011 | Lert, Jr. et al. |
| 8,156,013 B2 | 4/2012 | Dearlove et al. |
| 8,340,812 B1 | 12/2012 | Tian et al. |
| 8,365,389 B2 | 2/2013 | Taylor |
| 8,621,831 B2 * | 1/2014 | Moylan .................. B65B 39/06 53/169 |
| 8,622,883 B2 | 1/2014 | Flynn |
| 8,671,654 B2 | 3/2014 | Langen |
| 8,961,380 B2 | 2/2015 | Langen |
| 9,061,477 B2 | 6/2015 | Chandaria |
| 9,090,400 B2 | 7/2015 | Wurman et al. |
| 9,114,897 B2 | 8/2015 | Kim et al. |
| 9,126,380 B2 | 9/2015 | Dittmer et al. |
| 9,315,344 B1 | 4/2016 | Lehmann |
| 9,336,509 B1 | 5/2016 | Arun Singhal et al. |
| 9,714,145 B1 | 7/2017 | Lehmann |
| 9,718,570 B1 | 8/2017 | Ortiz et al. |
| 9,796,080 B2 | 10/2017 | Lindbo et al. |
| 9,927,815 B2 | 3/2018 | Nusser et al. |
| 9,975,699 B2 | 5/2018 | Yamashita |
| 10,074,073 B2 | 9/2018 | Stevens et al. |
| 10,233,019 B2 | 3/2019 | Lert |
| 10,248,112 B2 | 4/2019 | Zhu et al. |
| 10,471,597 B1 | 11/2019 | Murphy et al. |
| 10,489,870 B2 | 11/2019 | Asaria et al. |
| 10,556,713 B2 | 2/2020 | Langen |
| 10,618,736 B2 | 4/2020 | Khodl et al. |
| 11,505,341 B1 * | 11/2022 | Danner, Jr. ............. B65B 7/20 |
| 2003/0183484 A1 | 10/2003 | Peterman et al. |
| 2003/0200111 A1 | 10/2003 | Damji |
| 2003/0222129 A1 | 12/2003 | Williams |
| 2004/0112520 A1 | 6/2004 | Hanschen et al. |
| 2004/0148911 A1 | 8/2004 | Hermodsson et al. |
| 2004/0168408 A1 | 9/2004 | Spatafora |
| 2005/0079966 A1 | 4/2005 | Moshier et al. |
| 2006/0042188 A1 | 3/2006 | Ford |
| 2006/0096242 A1 | 5/2006 | Makar et al. |
| 2006/0096712 A1 | 5/2006 | Makar et al. |
| 2006/0117716 A1 * | 6/2006 | Bonnain .................. B65B 5/024 53/466 |
| 2006/0277269 A1 | 12/2006 | Dent et al. |
| 2007/0038673 A1 | 2/2007 | Broussard et al. |
| 2007/0072755 A1 | 3/2007 | Monti |
| 2007/0197364 A1 | 8/2007 | Monti |
| 2007/0204567 A1 | 9/2007 | Wintring et al. |
| 2008/0067225 A1 | 3/2008 | Moore |
| 2008/0110135 A1 | 5/2008 | Jacob et al. |
| 2008/0116085 A1 | 5/2008 | Aris et al. |
| 2008/0141632 A1 | 6/2008 | Monti |
| 2009/0239726 A1 | 9/2009 | Huang |

(56) References Cited

U.S. PATENT DOCUMENTS

| | | |
|---|---|---|
| 2009/0277134 A1 | 11/2009 | Jacob et al. |
| 2009/0319395 A1 | 12/2009 | Chandaria |
| 2010/0170201 A1* | 7/2010 | Aquarius ............... B65B 5/105 53/531 |
| 2010/0263333 A1 | 10/2010 | Langen |
| 2011/0030318 A1* | 2/2011 | Moylan .................... B65B 5/04 53/458 |
| 2011/0111939 A1 | 5/2011 | Bassi |
| 2011/0154784 A1* | 6/2011 | Poutot .................... B65B 5/105 53/247 |
| 2011/0272458 A1 | 11/2011 | Hardy |
| 2011/0297559 A1 | 12/2011 | Davis |
| 2012/0006651 A1* | 1/2012 | Cote ....................... B25J 15/00 198/468.6 |
| 2012/0096808 A1* | 4/2012 | Poutot .................... B65B 5/024 53/235 |
| 2013/0218799 A1 | 8/2013 | Lehmann et al. |
| 2013/0247519 A1 | 9/2013 | Clark et al. |
| 2014/0179501 A1* | 6/2014 | Akama ................. B31B 50/262 493/162 |
| 2014/0260119 A1 | 9/2014 | Baltes et al. |
| 2015/0072847 A1 | 3/2015 | Graham et al. |
| 2015/0072848 A1 | 3/2015 | Graham et al. |
| 2015/0073587 A1 | 3/2015 | Vliet et al. |
| 2015/0087491 A1 | 3/2015 | Langen |
| 2015/0225104 A1 | 8/2015 | Reed |
| 2015/0291295 A1 | 10/2015 | Langen |
| 2015/0329231 A1* | 11/2015 | Moncrief .................. B65B 5/06 53/543 |
| 2016/0129587 A1 | 5/2016 | Lindbo et al. |
| 2016/0229571 A1* | 8/2016 | Hansen ................... B31B 50/07 |
| 2016/0304281 A1 | 10/2016 | Elazary et al. |
| 2017/0101200 A1* | 4/2017 | Anderson ............... B65B 59/04 |
| 2018/0065807 A1 | 3/2018 | Lert, Jr. |
| 2018/0086019 A1 | 3/2018 | Langen |
| 2018/0126683 A1* | 5/2018 | Johnson ................. B31B 50/07 |
| 2018/0150793 A1 | 5/2018 | Lert, Jr. et al. |
| 2018/0327161 A1 | 11/2018 | Helms |
| 2019/0062074 A1* | 2/2019 | Johnson .................. B65B 5/105 |
| 2019/0152703 A1 | 5/2019 | Sellner et al. |
| 2019/0160774 A1 | 5/2019 | Langen |
| 2019/0233151 A1* | 8/2019 | Ford ....................... B65B 35/58 |
| 2019/0248522 A1 | 8/2019 | Prinz et al. |
| 2019/0263545 A1* | 8/2019 | Yokota .................... B65B 43/54 |
| 2019/0389611 A1* | 12/2019 | Pettersson ............. B65B 59/003 |
| 2020/0039744 A1 | 2/2020 | Lert et al. |
| 2020/0087010 A1 | 3/2020 | Almogy et al. |
| 2020/0216203 A1 | 7/2020 | Langen |
| 2020/0254707 A1 | 8/2020 | Iwasa et al. |
| 2020/0406570 A1 | 12/2020 | Hirata et al. |
| 2021/0016905 A1 | 1/2021 | Lindbo et al. |
| 2021/0138756 A1 | 5/2021 | Langen |
| 2022/0161445 A1* | 5/2022 | Larouche ............. B25J 15/0206 |
| 2023/0226792 A1 | 7/2023 | Iwasa et al. |

FOREIGN PATENT DOCUMENTS

| | | |
|---|---|---|
| CA | 3023959 A1 | 11/2017 |
| CA | 3044850 A1 | 6/2018 |
| CN | 108891698 A | 11/2018 |
| DE | 2250667 C3 | 4/1974 |
| EP | 0559604 A1 | 9/1993 |
| EP | 1177980 A2 | 2/2002 |
| EP | 3337739 B1 | 2/2020 |
| GB | 2 096 093 A | 10/1982 |
| JP | 5943401 B1 | 7/2016 |
| JP | 2018-154345 A | 10/2018 |
| JP | 2020-142844 A | 9/2020 |
| WO | 96/32322 A1 | 10/1996 |
| WO | 2013/142106 A1 | 9/2013 |
| WO | 2014/161644 A2 | 10/2014 |
| WO | 2015/039669 A1 | 3/2015 |
| WO | 2017/081281 A1 | 5/2017 |
| WO | 2018/197400 A1 | 11/2018 |
| WO | 2019/021281 A2 | 1/2019 |

OTHER PUBLICATIONS

Non-Final Office Action mailed by the USPTO on Oct. 5, 2023, in the related U.S. Appl. No. 18/092,022.
"Automated Bottle Pallet Unloader with FANUC Pick & Place Robot—Clear Automation", Video available online at: https://www.youtube.com/watch?v=qwbDX58FVFM, Sep. 2, 2016.
"Pick it 3drobotvisionmadeeasy universalrobots depalletizing pallet crates flex", Video available online at: https://www.youtube.com/watch?v=-Js1DfvBq40, Jun. 9, 2016.
"Smart automated machine loading with Pickit and Universal robots", Video available online at: https://www.youtube.com/watch?v=9fYcaisl1qY, Jun. 10, 2016.
"OPRA—Order Picking Robotic AGV", Video available online at: https://www.youtube.com/watch?v=yGhmOfAbi_U, Apr. 21, 2011.
"Advanced Automation with AutoStore Warehouse Robots", Video available online at: https://www.youtube.com/watch?v=ecftHVqxRpg&t=133s, Oct. 9, 2015.
"DB Schenker implementing next generation e-commerce", Video available online at: https://www.youtube.com/watch?v=udr0OOxmPbc, Jan. 22, 2016.
"New Concepts in Robotics for Distribution", Video available online at: https://www.youtube.com/watch?v=w7shAlf2Wjs, Apr. 19, 2011.
"Krones: Automatic order-picking system", Video available online at: https://www.youtube.com/watch?v=yU6OwsqETzl&t=84s, Feb. 15, 2010.
"Pick2Pallet LED Light System—Designed for Order Picking", Video available online at: https://www.youtube.com/watch?v=msSBgPByolY, Jul. 11, 2017.
Robotics Case Erector and Installation Archive—obtained online from https://swspackaging.com/installations/robotic-case-erector-tote-tender-32217/.
Random Robotics Case Erector—obtained online https://motioncontrolsrobotics.com/product/random-robotic-case-erector/.
XPAK USA, LLC, XPAK Robox™—Robotic Random-Size Box Erector Brochure, http://www.xpakusa.com/pdf/XPAK%20-%20ROBOX%20Robotic%20Case%20Erector%20Model%20XP-E3000R.pdf (last printed Mar. 22, 2016).
International Search Report issued by the Canadian Intellectual Property Office on Jun. 27, 2013 in connection with International PCT Patent Application No. PCT/CA2013/000245 filed on Mar. 15, 2013, 5 pages.
Written Opinion of the International Searching Authority issued by the Canadian Intellectual Property Office on Jun. 27, 2013 in connection with International PCT Patent Application No. PCT/CA2013/000245 filed on Mar. 15, 2013, 6 pages.
International Preliminary Report on Patentability issued by the International Bureau of WIPO on Oct. 28, 2014 in connection with International PCT Patent Application No. PCT/CA2013/000245 filed on Mar. 15, 2013, 7 pages.
"Full Layer Glass Bottle and Case Palletizer / Depalletizer", Video available online at: https://www.youtube.com/watch?v=PGajWaQ9jNg&t=75s, Dec. 17, 2013.
"Pack, Seal & Palletize—Garbage Bag Rolls", Video available online at: https://www.youtube.com/watch?v=qFHUX6bqXcg, Sep. 24, 2019.
"Robotic Palletizing Cell with Accumulation—HSC & RSC Cases", Video available online at: https://www.youtube.com/watch?v=mF0yF5hTrZ8, Dec. 18, 2019.
"VPick™ Robot Guidance for Mixed Case Depalletizing", Video available online at: https://www.youtube.com/watch?v=z-FbC2CMmus&t=60s, Apr. 19, 2019.
"AQFlex® XS: advanced performance and unique agility in a compact design", Video available online at: https://www.youtube.com/watch?v=prx18DnJjTw, May 5, 2017.

(56) References Cited

OTHER PUBLICATIONS

"Intralox ARB Technology, Enabling Rapid Depalletizing (6 of 6)", Video available online at: https://www.youtube.com/watch?v=1kdMZCxiElc, Dec. 9, 2011.
"Depalletizing Robot | Autotec Solutions", Video available online at: https://www.youtube.com/watch?v=8yOsG4t41Hc, Jul. 17, 2018.
"Autotec Solutions", Video available online at: https://www.youtube.com/channel/UCEtJjzx-G7nGvYgKqB4yitg, Jun. 27, 2018.
"Intralox ARB Depalletizing Systems", Video available online at: https://www.youtube.com/watch?v=YIRbmxGlzj4, Mar. 31, 2014.
"Combi RCE Robotic Random Case Erector installed by SWS Packaging", Video available online at: https://youtu.be/9-W9gfCtZhE, Aug. 13, 2017.
"Palletizing and Depalletizing | Honeywell Intelligrated", Video available online at: https://www.youtube.com/watch?v=8nFn6xnnTbc&t=83s, Oct. 4, 2018.
"The Magic Bus: A fully automated can depalletizer with pallet management", Video available online at: https://www.youtube.com/watch?v=y073yPWZSx0&t=258s, Apr. 9, 2020.
"Dual Case Robotic Palletizing System with Corner Board Stretch Wrapper—Kaufman Engineered Systems", Video available online at: https://www.youtube.com/watch?v=h4tyZt2seVE, May 12, 2017.
"Automated Depalletizing System Uses FANUC Robots for Complex Depalletizing—PASCO", Video available online at: https://www.youtube.com/watch?v=VVz3xNIjYAk, Jan. 16, 2015.
"Automated Pallet Jack Order Selection.wmv", Video available online at: https://www.youtube.com/watch?v=g_-V31UL4Ww&t=98s, Mar. 5, 2010.
"System Logistics APPS: Automatic Pick to Pallet System", Video available online at: https://www.youtube.com/watch?v=v5bPGlgENP8, Oct. 15, 2013.
"A look inside one of Amazon's robotic fulfillment centers", Video available online at: https://youtu.be/YL9XjyXsKKk, Jan. 2, 2019.
"Automatic Horizontal Baler / Baling Press Machine (HBA150-110130)", Video available online at: https://youtu.be/vLbAbSLBSyY, Jun. 28, 2018.
"Poly bagmaker inserter FLEXIM-31", Video available online at: https://youtu.be/D88VRdm68mk, Mar. 20, 2017.
"Inside Amazon's Fulfillment Center in Kent, Washington", Video available online at: https://youtu.be/Zm0toTbg8J4, May 31, 2018.
"The Grand Theory of Amazon", Video available online at: https://youtu.be/UyohSu-Ft_U, Jun. 2, 2018.
"How Amazon Receives Your Inventory", Video available online at: https://youtu.be/dAXdeqcHBp4, Dec. 23, 2013.
"Inside An Amazon Warehouse on Cyber Monday", Video available online at: https://youtu.be/qRQwkJLRfWw, Nov. 28, 2016.
"Inside Edition Producer Goes Undercover to Deliver Amazon Packages", Video available online at: https://youtu.be/YzdEQJ9V-8M, Nov. 20, 2018.
"I went undercover as an Amazon delivery driver. Here's what I learned about the hidden costs of free shipping", Title retrieved at: https://www.thestar.com/news/investigations/2019/12/19/i-went-undercover-as-an-amazon-delivery-driver-heres-what-i-learned-about-the-hidden-costs-of-free-shipping.html, Dec. 19, 2019.
"Automated Decasing System Uses Six FANUC Robots to Decase Bottles—StrongPoint Automat", Video available online at: https://youtu.be/bTkz4RYkevQ, May 20, 2016.
"Automated labeling and palletizing, courtesy of StrongPoint Automation", Video available online at: https://youtu.be/X6ukaEe_vOM, Jan. 24, 2020.

"New Concepts in Robotics for Distribution", Video available online at: https://youtu.be/w7shAlf2Wjs, Apr. 19, 2011.
"Fruits Picking with FANUC", Video available online at: https://youtu.be/Xq2yTJs8NXI, Jun. 30, 2019.
"The Warehouse of the Future—WITRON's OPM Technology at Meijer in Wisconsin", Video available online at: https://youtu.be/bn5jVKhFUs, Mar. 29, 2017.
"AutoStore | The Future of Warehousing is Reality | English", Video available online at: https://youtu.be/b3X3r5UVtEM, Jul. 29, 2015.
"RCE Random Robotic Case Erector Bottom Taper", Video available online at: https://youtu.be/WEHgWYnSDmk, Oct. 10, 2017.
"AGV Automation—Food Industry", Video available online at: https://youtu.be/dVR8Qmq1Ytl, Nov. 7, 2016.
"Corrugated Boxes: How It's Made Step By Step Process | Georgia-Pacific", Video available online at: https://youtu.be/C5nNUPNVWAw, Mar. 16, 2015.
"Automated warehouse solutions for CSH | SSI Schaefer", Video available online at: https://youtu.be/xKrQQYHMT-A, Oct. 8, 2018.
"Inside Alibaba's smart warehouse staffed by robots", Video available online at: https://youtu.be/FBI4Y55V2Z4, Sep. 20, 2017.
"Inside A Warehouse Where Thousands Of Robots Pack Groceries", Video available online at: https://youtu.be/4DKrcpa8Z_E, May 9, 2018.
"THOMANN, New logistics centre for eCommerce-giant (english)", Video available online at: https://youtu.be/NRLpIXRqs78, Jun. 27, 2017.
"WITRON realizes automated logistics center of E.Leclerc SOCARA", Video available online at: https://youtu.be/qLCSHUqhnYs, Oct. 8, 2018.
"Picking: A logistics centre sectored in different areas", Video available online at: https://youtu.be/9KAXH-D05XU, Mar. 31, 2017.
"E-Commerce Automation at Newegg's Robotic Distribution Center", Video available online at: https://youtu.be/ZBRoXW6YtGI, Oct. 16, 2018.
"Order Fulfillment Process", Video available online at: https://youtu.be/jqaJAfmBvBM, Mar. 7, 2015.
International Search Report and Written Opinion from the International Searching Authority, issued by the Canadian Intellectual Property Office on Feb. 12, 2021, in connection with International Patent Application No. PCT/CA2020/051502, 15 pages.
International Search Report issued by the Canadian Intellectual Property Office on Aug. 8, 2013, in connection with International PCT Patent Application No. PCT/CA2013/000230, 5 pages.
Written Opinion of the International Searching Authority issued by the Canadian Intellectual Property Office on Aug. 8, 2013, in connection with International PCT Patent Application No. PCT/CA2013/000230, 8 pages.
International Preliminary Report on Patentability issued by the Canadian Intellectual Property Office on May 26, 2015, in connection with International PCT Patent Application No. PCT/CA2013/000230, 9 pages.
"Robotic order picking from pallets and flowracks by Robomotive", Video available online at: https://www.youtube.com/watch?v=O7641Lfo81c, Sep. 18, 2018.
"Solutech robot pallet picking", Video available online at: https://www.youtube.com/watch?v=rUrll1u64Qc, Mar. 26, 2015.
"Swisslog ItemPiQ: Efficient robot-based automated item picking for order fulfillment", Video available online at: https://www.youtube.com/watch?v=qMsgnTq6C_s, Feb. 22, 2019.
"Warehouse Pallet Robots and Pick Station", Video available online at: https://www.youtube.com/watch?v=S4H8_oX3SOY, Mar. 12, 2019.

* cited by examiner (ii)

(iv)

METHOD AND APPARATUS LOADING OF CASES WITH ITEMS

CROSS-REFERENCE TO RELATED APPLICATION

This application claims the foreign priority benefit of Canadian Patent Application Serial No. 3109187 filed on Feb. 12, 2021. The contents of the aforementioned application are incorporated by reference herein.

FIELD

The present invention relates generally to methods and systems for the loading of items into cases.

BACKGROUND

Containers are used to package many different kinds of items. One form of container used in the packaging industry is what is known generically as a "box" and it can be used to hold various items including products and sometimes other boxes containing products. Some in the packaging industry refer to boxes used to package one or more products as "cartons". Also, there are containers/boxes that are known by some as "cases". Examples of cases include what are known as regular slotted cases ("RSC"). In this patent document, including the claims, the words "cases", "cartons" and "containers" are used collectively and interchangeably to refer to boxes, cartons, and/or cases that can be used to package items.

Cases come in many different configurations and are made from a wide variety of materials. However, many cases are foldable and are formed from a flattened state—commonly called a case blank. Cases may be made from an assortment of foldable materials, including but not limited to cardboard, chipboard, paperboard, corrugated fibreboard, other types of corrugated materials, plastic materials, composite materials, and the like and possibly even combinations thereof.

In many known systems, case blanks may be serially retrieved from a magazine, and reconfigured from a flattened state into an erected state, and then placed in a slot on a conveyor. The erected case may then be moved by the conveyor to a loading station where the case may be filled with one or more items and then sealed.

To permit the blanks to be readily opened up into an erected state from a flattened state, the blanks may be held in the magazine in a generally completely flattened configuration and then can be folded and sealed such as by gluing or taping panels and/or flaps together to form an erected case. Specialized apparatus that can handle only flat, unfolded and unsealed blanks for cases are known.

Some blanks are provided to users not in a flat, unfolded and unsealed form, but rather in what is known as a "knock-down" blank or "KD". A KD blank may be provided in a folded and flattened configuration and be partially glued or otherwise partially sealed such as along one side seam thus being formed in a generally flattened tubular shape. Accordingly, each case blank may require opposite panels to be pulled apart and reconfigured from a flattened tubular configuration to an erected. open tubular or sleeve-like configuration that is suitable for delivery to another system such as a conveyor. The blank may then have one side opening closed by folding and sealing the flaps, and may then be filled from the opposite side with one or more items while on the conveyor ('side loading'). Also, any required additional flap folding and sealing such as with glue or tape can be carried out to enclose and completely close and seal the case with one or more items contained therein. Alternately, for example, an erected blank can be reoriented from a side orientation to an upright orientation with the opening facing upwards and a having a sealed bottom end. The erected case can then be moved to a loading system where it may be filled from its top side with one or more items via an opening that is facing upwards ('top loading'). The items may be top loaded using, at least in part, gravity to "drop" the item into the erected, bottom sealed case. The top opening of the case can then be closed by folding over and sealing the top flaps.

However, in some situations, it is not desirable to top load or side load items into an erected carton/case. For example, where the size and shape of items to be loaded are narrow or tapered on the top and sides. This can present a challenge for the automated loading of items. For example, an electromechanical system may have challenges to lift and adjust a group of several items as a result of the shape of the items. Also, top loading items into a tightly fitting interior space area of an open top case can be challenging. Furthermore, some items such as glass or plastic bottles are particularly susceptible to being damaged or broken when being top loaded into an erected carton/case, particularly when they are "drop packed" into an erected case.

In some situations, it would be desirable to be able "bottom load" a carton/case. In a such a bottom loading operation, there is relative upward movement of one or more items through a case opening that is oriented/facing in a downward direction. However, there are significant challenges in bottom loading of case, such as for example the difficulty of closing the bottom flaps when items are otherwise supported within the interior storage space of an erected carton/case. Accordingly, improved methods and systems are desirable for the loading of one or more items through an opening of a case.

SUMMARY

According to one aspect there is provided a system of loading cases with items, the system comprising: an item delivery apparatus operable to deliver a plurality of items to a transfer station; a collation platform operable to support a group of items; a pedestal apparatus operable to support the group of items; a first transfer apparatus operable to transfer a plurality of items from said item delivery apparatus at said transfer station, to said collation platform, to form the group of items on said collation platform; a second transfer apparatus operable to transfer the group of items from said collation platform to said pedestal apparatus; at least one movement rod operable to be driven in longitudinal movement by a rod movement drive apparatus; a case movement apparatus located proximate said pedestal apparatus, said case movement apparatus operable to move an erected case in a path that sheaths a group of items located on said pedestal apparatus with an erected case; wherein in operation: (a) said item delivery apparatus delivers a plurality of items to said transfer station; (b) said first transfer apparatus transfers a plurality of items from said item delivery apparatus at said transfer station, to said collation platform, to form a group of items on said collation platform; (c) said second transfer apparatus transfers said group of items from said collation platform to said pedestal apparatus; (d) said at least one movement rod engages said group of items and moves said group of items to a loading position on said pedestal apparatus; (e) said at least one movement rod dis-engages from said group of items said group of items at said loading position on said pedestal apparatus; and (f) said case movement apparatus moves an erected case to sheath said group of items located at said loading position on said pedestal apparatus.

According to another aspect there is provided a system of loading cases with items, the system comprising: a case movement apparatus located proximate a pedestal apparatus, said case movement apparatus operable to move an erected case in a path that sheaths a plurality of items located on said pedestal apparatus with an erected case; wherein said case movement apparatus comprises a multi-axis robot arm having an end effector operable to engage with, and release, a case; wherein said plurality of items are each supported on a base portion in a generally vertically upright orientation, and wherein end effector is operable to move said erected case in a path to sheath said plurality of items, said path having a tilted path position in which while said erected case is located proximate to said group of items, said erected case is tilted from a vertical axis.

According to another aspect there is provided a system of loading cases with items, the system comprising: longitudinally spaced first and second movement members operable to be driven in longitudinal movement by a movement drive apparatus; a case movement apparatus located proximate a pedestal apparatus, said case movement apparatus operable to move an erected case in a path that sheaths a group of items located on said pedestal apparatus with an erected case; wherein in operation: (a) said first and second movement members, engage said group of items and move said group of items to a loading position on said pedestal apparatus; (b) said first and second movement members, dis-engage from said group of items when said group of items are at said loading position on said pedestal apparatus; (c) said case movement apparatus moves an erected case to sheath said group of items located at said loading position on said pedestal apparatus.

According to another aspect there is provided a method of loading cases with items comprising: (a) delivering a plurality of items to said transfer station; (b) transferring a plurality of items at said transfer station, to a collation platform, to form a group of items on said collation platform; (c) transferring said group of items from said collation platform to a pedestal apparatus; (d) engaging said group of items with transversely oriented trailing and leading movement rods and moving said group of items longitudinally to a loading position on said pedestal apparatus; (e) dis-engaging said leading and trailing movement rods from said group of items while said group of items are at said loading position on said pedestal apparatus; (f) sheathing said group of items located at said loading position on said pedestal apparatus with an erected case.

According to another aspect there is provided a method of loading cases with items, the method comprising: moving an erected case with a case movement apparatus in a path that sheaths a plurality of items located on a pedestal apparatus with an erected case; wherein said case movement apparatus comprises a multi-axis robot arm having an end effector operable to engage with, and release, a case; wherein said plurality of items are each supported on a base portion in a generally vertically upright orientation; and wherein said end effector moves said erected case in a path to sheath said plurality of items, said path having a tilted path portion in which while said erected case is located proximate to said group of items, said erected case is tilted from a vertical axis.

According to another aspect there is provided a system of loading cases with items, the system comprising: an item delivery apparatus operable to deliver a plurality of items to a collating apparatus, said collating apparatus operable to transform a plurality of items into a group of items; a pedestal apparatus operable to support the group of items; at least one movement member operable to be driven in longitudinal movement by a movement member drive apparatus; a case movement apparatus located proximate said pedestal apparatus, said case movement apparatus operable to move an erected case in a path that loads a group of items located on said pedestal apparatus into an erected case through a bottom opening in said case; wherein in operation: (a) said item delivery apparatus delivers a plurality of items to said collating apparatus; (b) said first collating apparatus forms the group of items; (c) said at least one movement rod engages the group of items and moves the group of items to a loading position on the pedestal apparatus; (d) said at least one movement rod dis-engages from said group of items while the group of items is at said loading position on said pedestal apparatus; (e) said case movement apparatus moves an erected case to load said group of items through said bottom opening in said erected case.

Other aspects and features will become apparent to those of ordinary skill in the art upon review of the following description of specific embodiments of the invention in conjunction with the accompanying figures.

BRIEF DESCRIPTION OF THE DRAWINGS

In the figures which illustrate example embodiments.

DETAILED DESCRIPTION

System Overview

Figure 1:
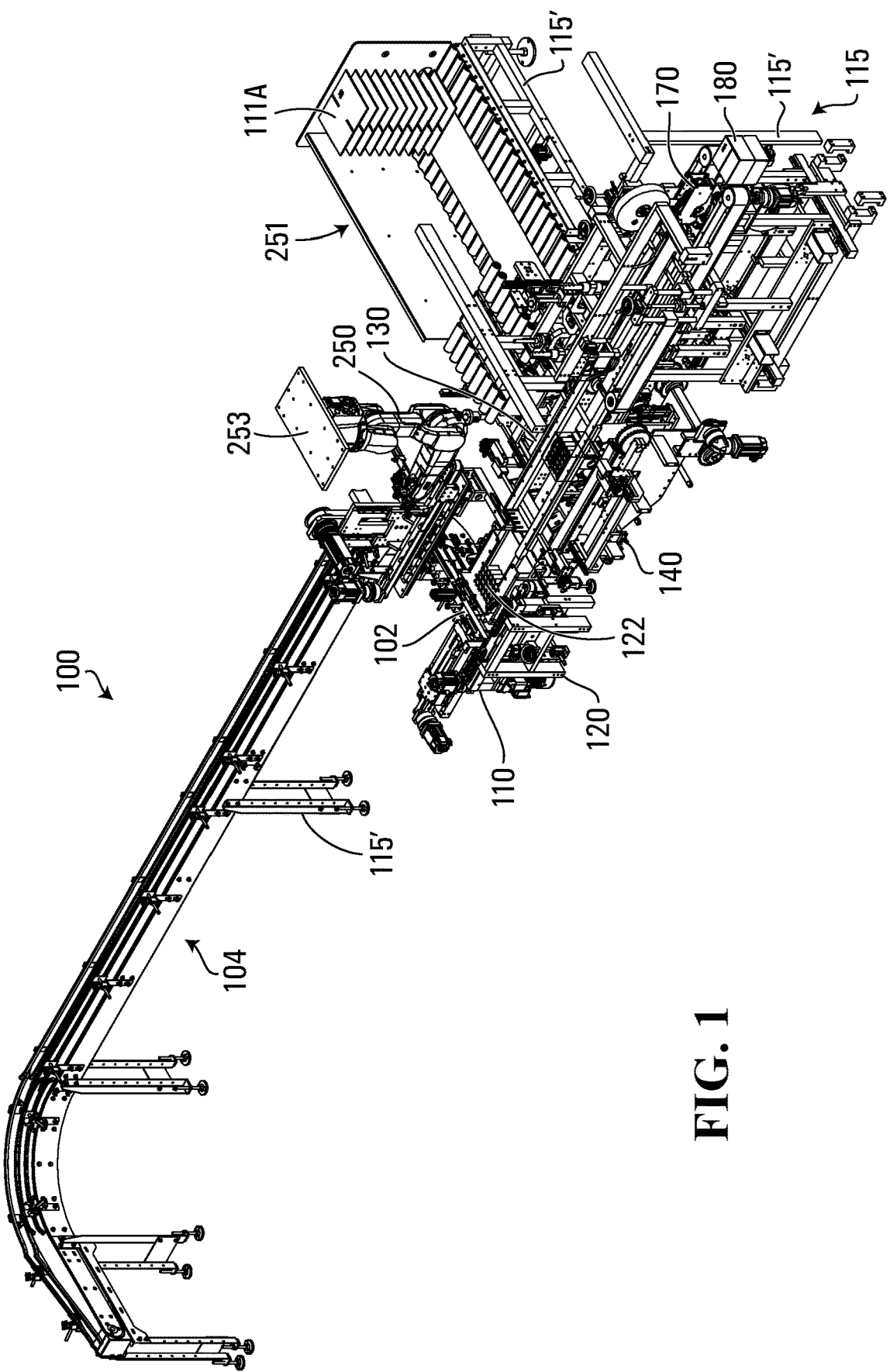
FIG. 1 is a perspective view of a system for loading erected cases with one or more items and closing and sealing the top and bottom ends of loaded cases.

With reference to FIG. 1, in overview, a system 100 operable for loading items 102 into cases formed from case blanks 111A is illustrated. Individual items 102 may be singular units of a manufactured product, which may be delivered to system 100 from a separate manufacturing facility or from another source. Items 102 may include a rigid body may have interior cavity that may hold a substance. For example, individual items 102 may be individual glass or plastic bottles containing a liquid such as a beverage (e.g. bottles of wine or beer) or individual bottles or other rigid containers holding another material or substance such as a liquid like, for example, laundry detergent. Items 102 may alternatively be paperboard or composite cartons (such as cartons of juice or milk) or metal, paperboard or composite cans of a product such as cans of a food, or cans of spray paint. Items 102 may be a rigid item (or semi-rigid) and may be an item it is desired to be collated and/or bottom-loaded into an interior storage space 107 defined by the interior surfaces of panels A-D of an erected case 111C (FIG. 3). Typically, each item 102 loaded into an erected case 111C using system 100 will be stable and self-supporting, at least when formed into a group 122 (FIG. 4) of items. Each item 102 may be self-supporting on a base portion. Items 102 may not be a type of container containing a substance, but rather some other self-supporting rigid or semi-rigid item to be loaded into a case. In embodiments, items 102 may be self-supporting and stable only when formed into a collated group 122 of items.

Items 102 may be configured with a base portion configured to support the item 102 (such as a generally flat base support surface) in a generally vertically upright orientation. Each item 102 may be shaped with a main lower body portion having an outer surface of a first cross-sectional size/diameter and an upper neck region having an outer surface of a smaller cross-sectional size/diameter (such as in a typically shaped wine bottle). By way of example only, items 102 may be 150 ml plastic plastic or glass bottles with an upper cylindrical shorter neck region, a vertically extended generally cylindrical body portion, and, may also have a bottle cap or other closure secured over a top opening in the neck region. The interior cavity thereof may contain a liquid or a semi-liquid product therein. Item 102 may have a shoulder formed at the join between the body portion and the neck portion/closure.

Figure 3A:
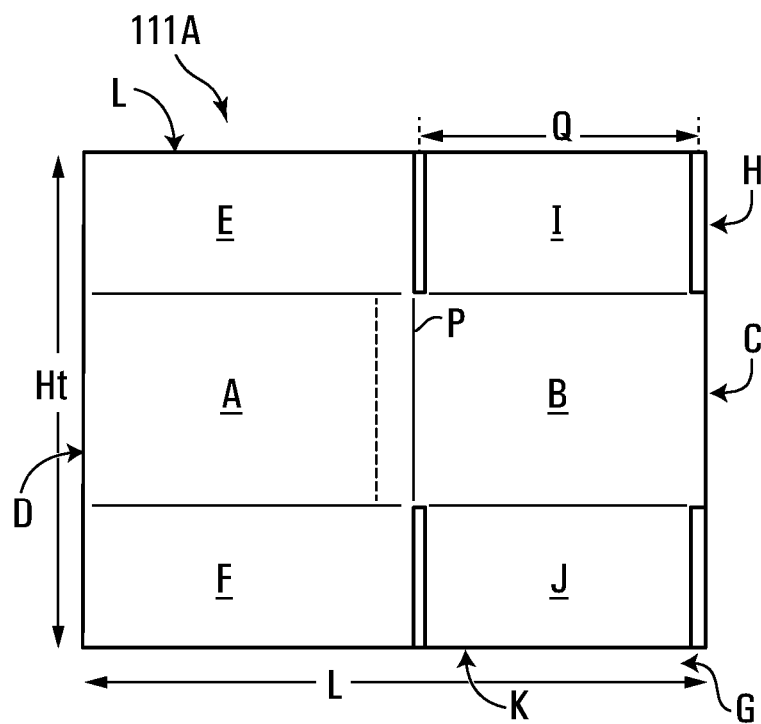
FIGS. 3A and 3B are top and perspective views of an example a non-erected case that can be used in the system of FIG. 1.
Figure 3B:
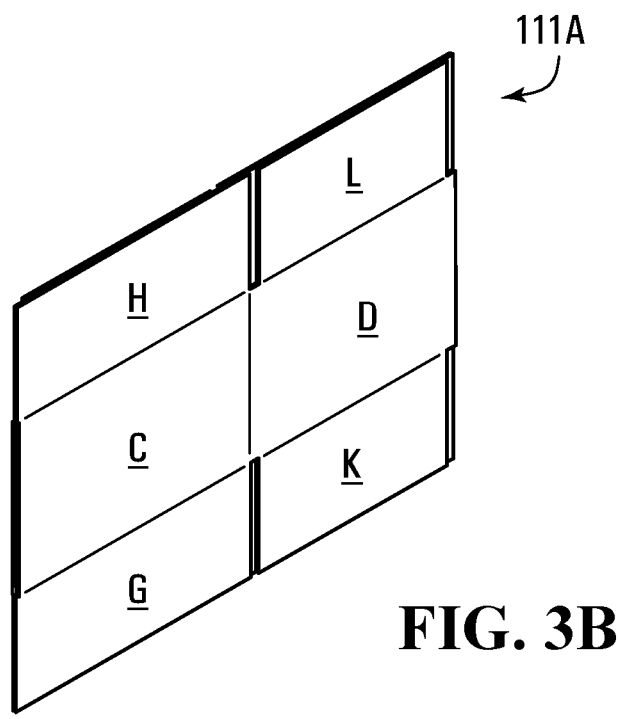
Figure 3C:
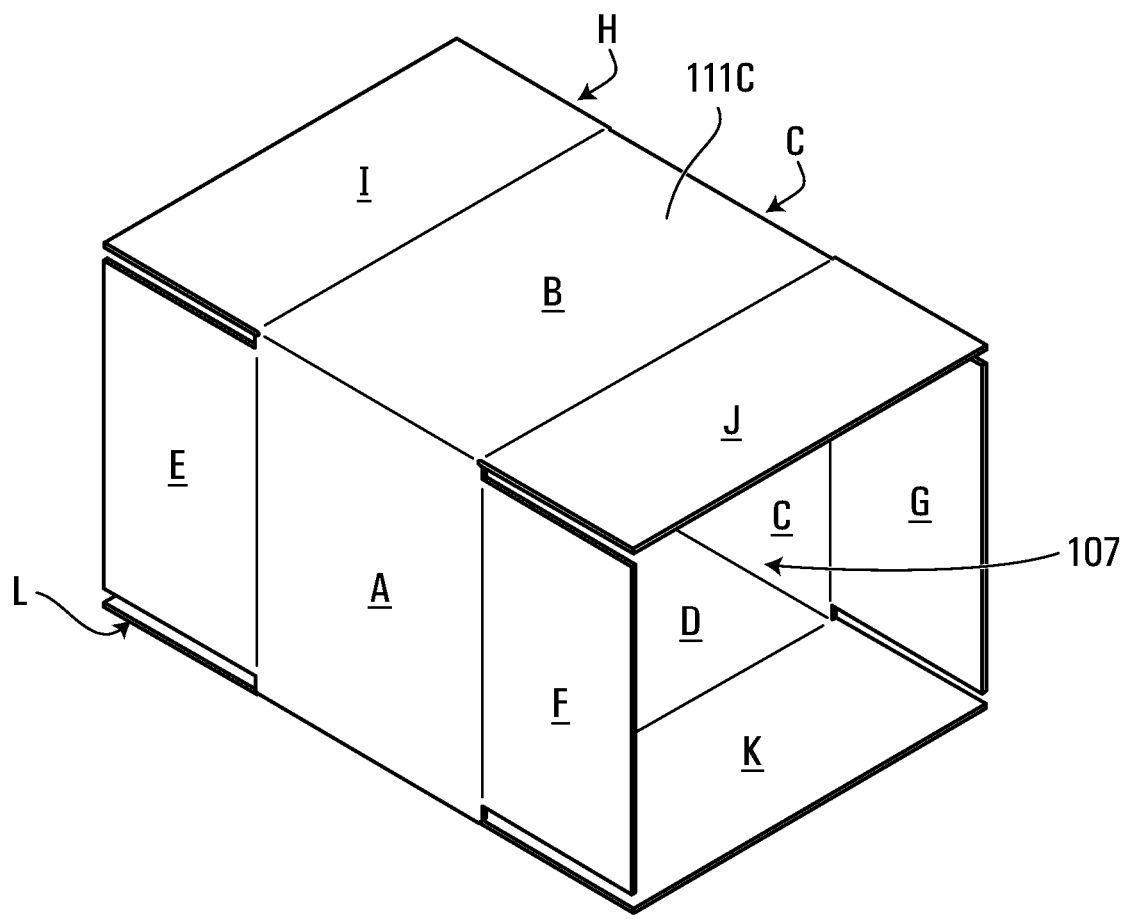
FIG. 3C is a perspective view of the case of FIGS. 3A and 3B, in an erected configuration.

With reference to FIGS. 3A to 3C, each blank 111A used in system 100, may have opposed minor side panels A and C interconnected to a pair of opposed major side panels B and D to form a tubular sleeve, seen in FIG. 3C, when opened. An overlap strip of case blank material may be provided between panel B and panel A that can be sealed by conventional means such as a suitable adhesive, to provide an overlapping seam joint in the vicinity of "P" (see FIG. 3A). This seam joint at the overlap forms a knock-down case blank in which the panels A, B, C and D are joined into a blank 111A that is of generally flattened tubular configuration, as shown in FIGS. 3A and 3B.

Also, as shown in FIGS. 3A-C, are opposed pairs of end flaps E, H and end flaps L, I that are provided at one (e.g. top) end of the respective side panels A-D. A second set of pairs of opposed end flaps F, G and K, J are provided on the opposite, (e.g. bottom) end of side panels A-D. However, in other embodiments, cases having other panel and flap configurations can be formed. The panels and flaps may be connected to adjacent flaps/panels by predetermined fold/ crease lines such as shown in FIGS. 3A and 3B. These fold/crease lines may for example be formed by a weakened area of material and/or the formation of a crease with a crease forming apparatus. The effect of the fold lines is such that one panel such as for example panel A can be rotated relative to an adjacent panel such as D or B along the fold lines. Flaps may also fold and rotate about fold lines that connect them to their respective panels.

Case blanks 111A may be made of any suitable material(s) configured and adapted to permit the required folding/ bending/displacement of the material to reach the desired configuration. Examples of suitable materials are chipboard, cardboard or creased corrugated fibre board. It should be noted that the blank may be formed of a material which itself is rigid or semi-rigid, and not easily foldable but which is divided into separate panels and flaps separated by creases or hinge type mechanisms so that the case can be erected and formed. In some embodiments, case blanks 111A may be delivered to system 100 in a form in which the case blank is already in a tubular shape and may be completely or partially sealed at an upper end, with the bottom end being open. In some embodiments, the cases may not be rectangular or square in horizontal section shape.

System 100 may have a programmable logic controller ("PLC") 132 for controlling various operational components of the system. System 100 may also include a robotic arm 250, a blank magazine 251 holding a plurality of vertically stacked, flattened case blanks 111A, an item infeed conveyor 104, a first transfer apparatus 112, and a collation platform 120 located within an area generally designated as a collating station 119. First transfer apparatus 112 may be operable to successively transfer a plurality of items from infeed conveyor 104 to collation platform 120, forming a collated group 122 of items. System 100 may also include an area (such as a casing area/station 130) where a plurality of items 102 that have been collated into a group 122, may be loaded into an erected case 111C (FIG. 3C) and then the erected and loaded case has its end flaps closed and then the case is sealed. This process may be repeated to successively form a plurality of collated groups 122 each of which may be loaded into its own respective erected case 111C and sealed therein.

In some other embodiments, top end flaps of each erected case 111C may be closed and sealed or partially sealed prior to loading of items 102 therein. Within the casing area 130 may be located several components including robotic arm 250, a pedestal apparatus 140, and a rod movement sub-system 203 that may include a pair of transversely oriented, longitudinally movable, movement rods 200-1 and 200-2 (see also FIGS. 9A-9C). A second transfer apparatus 175 may operate to successively move groups 122 of collated items 102 from collation platform 120 to pedestal apparatus 140.

Collation platform 140 may receive individual items 102 delivered singly in series and transferred from infeed conveyor 104. Items 102 may be delivered to a transfer location in a single line of items, with no spacing between the adjacent items 102 in the line. In other embodiments, items 102 may be delivered either in a predefined spacing therebetween or with randomly sized spacing between each of the items. System 100 may be operable to transform the plurality of individual items 102 provided to system 100 into a series of collated groups 122 of items 102 that can each be delivered serially to casing area 130 for loading and sealing in its own case.

Figure 6:
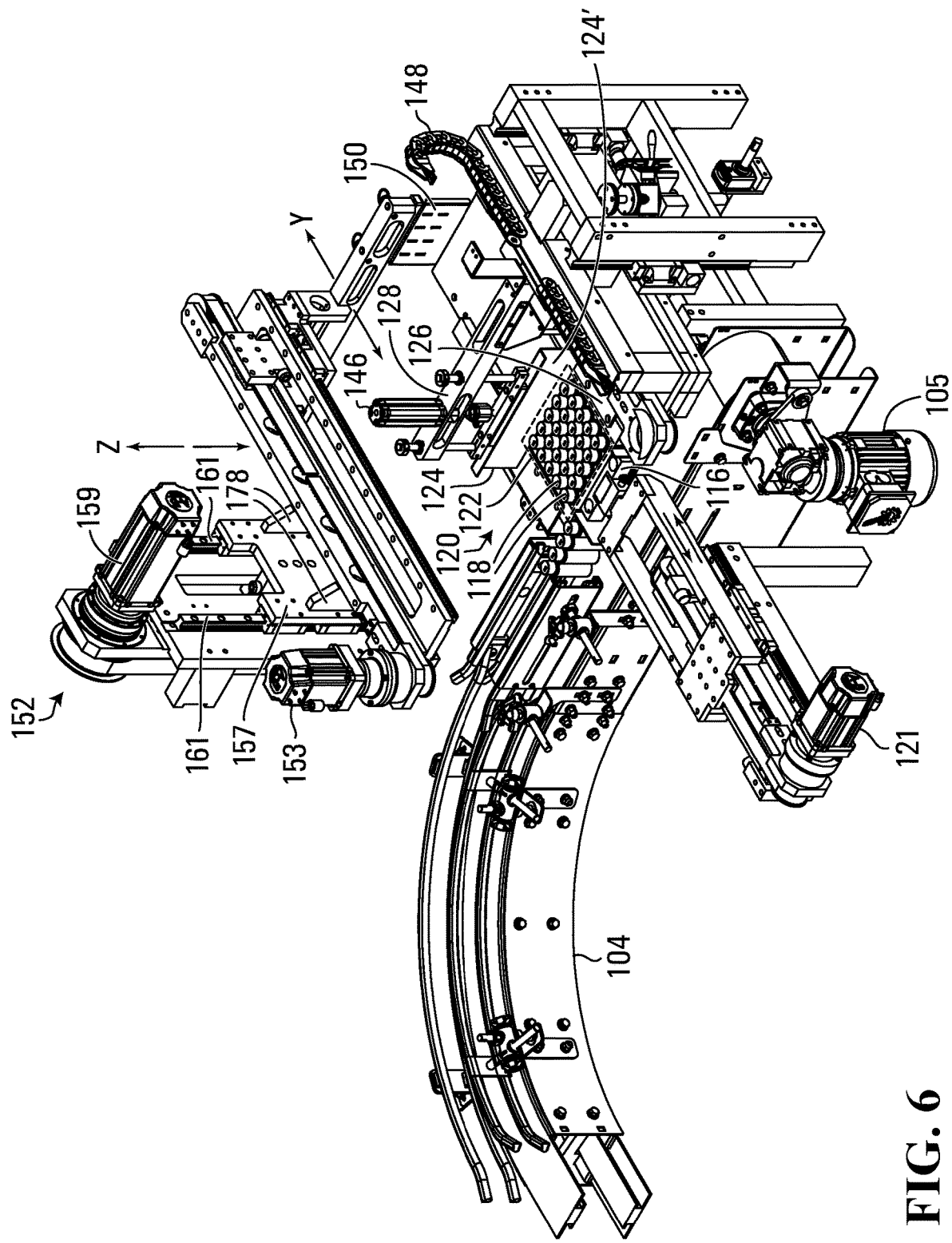
FIG. 6 is a perspective view of the areas of FIG. 4 in a third operational configuration.

Individual items 102 may be delivered by input conveyor 104 in series in a generally vertically upright orientation, each item 102 supported on its base portion, to a transfer station 110 (FIG. 1) that is at a location at the end area of infeed conveyor 104 and the input area of collation platform 120. A plurality of items 102 which form a sub-group of items (that may form a row 118 of items in a group 122—see FIG. 6), may be transferred from input conveyor 104 to collation platform 120. Successive sub-groups/rows 118 of items 102 may be transferred from input conveyor 104 to collation platform 120 to form a completed, collated group 122. Several sub-groups/rows 118 of items (each of which may form a single row in a group 122 comprising multiple rows of items) may be aggregated/collated to form a group 122 of items 102. Thus, between input conveyor 104 and collation platform 120, individual items 102 may be transformed from a series of individual items 102 delivered in series, into a collated group 122 on collation platform 120.

Collation platform 120 may have an item support surface made of a strong, low friction material such as UHMW polyethylene to allow items 102 to easily slide over the support surface.

A group 122 may be formed on collation platform 120 in an ordered array of items 102 (e.g. a rectangular array of a first number N1 of rows of items with a second number N2 of items in each row). Depending upon the desired configuration of the array of items 102 when loaded into an erected case 111C, adjacent rows of items may be transversely offset from each other (e.g. if the items 102 are generally cylindrical and are interleafed at their outer abutting surface areas). The number of items 102 in each group 122 to be loaded into a single erected case 111C may be determined based on one or more specific dimensions and shape associated with the individual items 102 and the shape of the interior storage space 107 and its dimensions, in an erected case 111C.

At least some, if not all, of the components of system 100 may be mounted to a system frame 115 (only some of which is illustrated in the Figures). System frame 115 may include various inter-connected vertical and horizontal post/beam support members such as frame members 115' and be configured to permit certain components of system 100 that are described herein to be mounted thereto.

Collated groups 122 of items 102 are sequentially transferred from collation platform 120 to a central loading platform 164 (FIG. 9) of pedestal apparatus 140 in casing area 130, using a combination of transfer apparatus 175 and a rod movement sub-system 203. Thus, the combination of (i) first transfer apparatus 112 to transfer a plurality of items from infeed conveyor 104 to collation platform 120, and (ii) transfer apparatus 175 and a rod movement sub-system 203 to transfer the items from the collation platform 120 to the central loading platform 164 comprise an item movement sub-system. As will become evident, rod movement sub-system performs a plurality of different functions within system 100. At casing area 130, each collated group 122 of items 102 is sequentially, bottom loaded into an interior storage space 107 (FIG. 3C) of an erected case 111C by having an erected case 111C moved by robotic arm 250 under control of PLC 132 in a particular and pre-determined path such that the group of items 102 is sheathed by an erected case 111C. An erected case 111C may be moved on a path whereby it is tilted at an angle and then brought down over top of a group 122 of collated items 102, so as to encapsulate or enclose the collated group of items 102 within the interior storage space 107 of the erected case 111C, while the group 122 of items 102 is positioned on the collation platform 120 and while the group 122 may be stationary relative to frame 115. The path of movement of the erected case 111C as it is moved by robotic arm 250 is such that none of the lower flaps (e.g. flaps J, K F and G) are caught on any upper edges or upper surfaces of any items 102 in the group 122, and so the erected case 111C will be moved to a position where the lower panels, J, K, F and G remain oriented vertically downwards when the group 122 of items 102 has been received within storage space 107 of erected case 111C.

Once a group 122 of items 102 is properly positioned within the storage space 107 of an erected carton 111C, at least two opposed bottom flaps of each erected case 111C (e.g. trailing flap G and leading flap F) may be moved to a closed position using a combination of pedestal apparatus 140 and movement rods 200-1, 200-2 of rod movement sub-system 203. Thereafter, a case 111D with at least the flaps G and F having been moved to a closed position, may be moved from the pedestal apparatus 140 to output conveyor 170. During movement to output conveyor 170 and/or while being moved on output conveyor 170, case 111D may have the remaining top and bottom flaps closed, and the top and bottom ends may also be fully sealed. Case 111D may also be optionally labelled while moving through output conveyor 107 using a labelling apparatus. Thereafter, output conveyor 170 may deliver each loaded and fully sealed case 111E to an output station, where for example fully closed, sealed and loaded cases 111E may be successively stacked on a pallet by a conventional stacking apparatus (not shown) to be ready for shipping to a destination.

Figure 2:
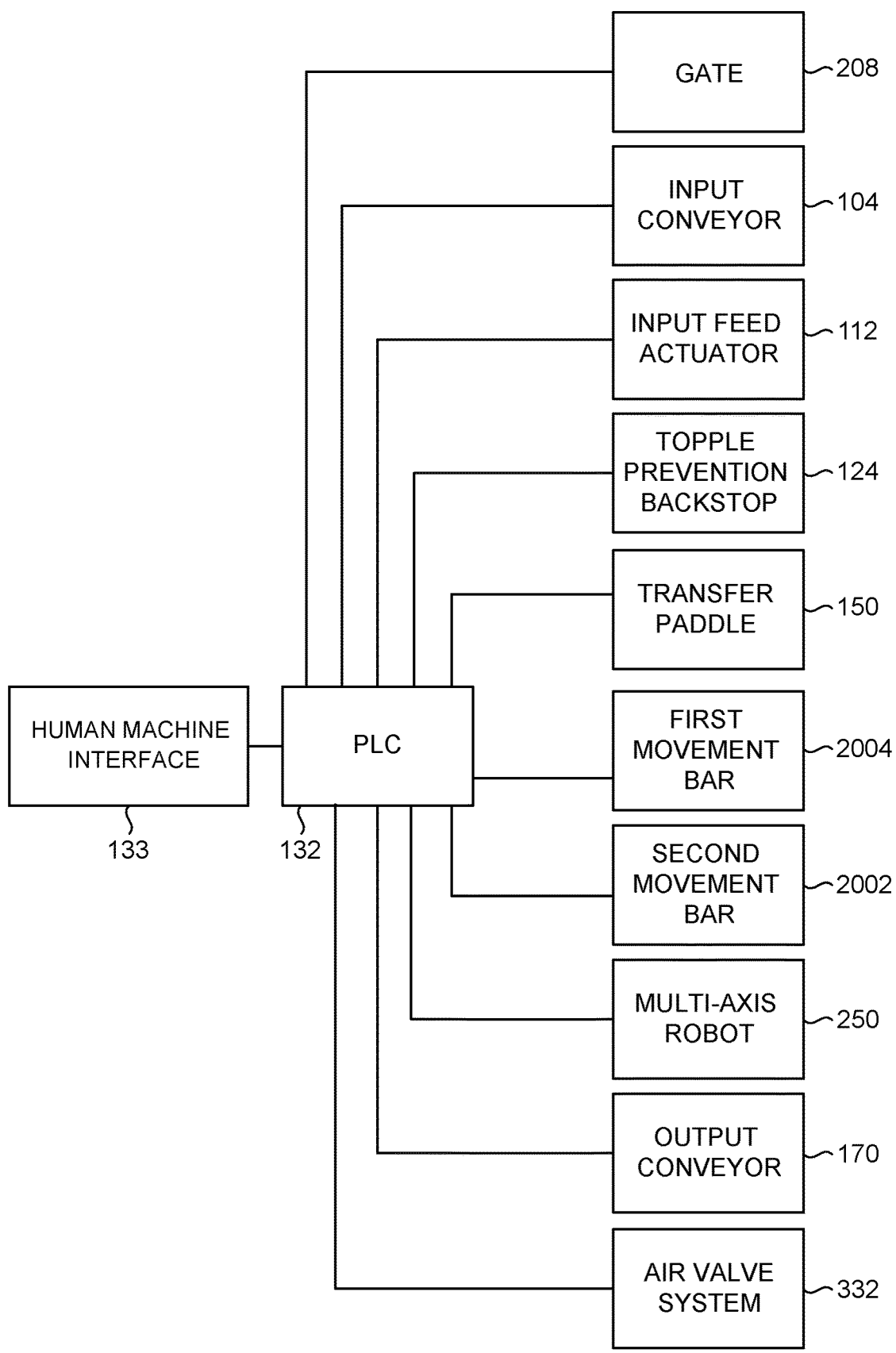
FIG. 2 is a block diagram illustrating computer components used to manage the system of FIG. 1.

An example of a scheme for the power and data/communication configuration for system 100 is illustrated in FIG. 2. The operation of the components of system 100 may be controlled by PLC 132. PLC 132 that may be accessed and configured by a human operator through a Human Machine Interface (HMI) module 133 secured to frame 115. HMI module 133 may be in electronic communication with PLC 132. PLC 132 may be any suitable PLC and may for example include a unit chosen from the Logix 5000 series devices made by Allen-Bradley/Rockwell Automation, such as the ControlLogix 5561 device. HMI module 132 may be a Panelview part number 2711P-T15C4D1 module also made by Allen-Bradley/Rockwell Automation.

Electrical power can be supplied to PLC 132/HMI 133, and to all the various servo motors and DC motors that are described further herein. Compressed/pressurized air can also be supplied to the vacuum generators and pneumatic actuation through valve devices such as solenoid valves that are controlled by PLC 132. Servo motors may be connected to and in communication with servo drives that are in communication with and controlled by PLC 132. Similarly, DC motors may be connected to DC motor drives that are in communication with and controlled by PLC 132, again all as described further herein. Additionally, various other sensors are in communication with PLC 132 and may (although not shown) also be supplied with electrical power.

With reference again to FIGS. 3A, 3B, and 3C, an example of one kind of knock-down case blank 111A that can be processed by system 100 to form a regular slotted case (RSC) is disclosed. System 100 may be configured so that other types of knock-down case blanks, and knock-down case blanks of different sizes may also be processed.

Each case blank may be generally initially formed and provided in a knock-down configuration 111A—i.e., a flattened tubular configuration—as shown in FIGS. 3A and 3B. Each tubular case blank 111A may have a height dimension "Ht"; a length dimension "L"; and a major panel Length "Q" (see FIG. 3A). By inputting each of these three dimensions for a blank to be processed by system 100 into PLC 132, PLC 132 can determine if the system 100 can process that sized blank 111A without the necessity for manual intervention to make an adjustment to one or more components of system 100. If PLC 132 determines that the adjustment can be made without human intervention, PLC 132 may make the necessary adjustments to positions and/or movements of at least some of the components forming system 100.

As will be described further hereinafter, case blank 111A may be transformed from a knock-down configuration (i.e., a generally flattened tubular configuration) to an open sleeve erected configuration (open tubular configuration) 111C, the erected case 111C may be loaded, and the end flaps may be folded and sealed to form a desired erected, loaded and fully closed and sealed case configuration 111E. System 100 is configured to deliver each erected case 111C with a downwardly facing, bottom opening with flaps F, G, J, K being in an orientation that is generally planar with corresponding connected side panels A, C, B and D, suitable for loading a group of items 102 through the bottom opening into the interior storage space 107 of the erected case 111C where the group of items 102 are to be held.

First Transfer Apparatus and Item Collation

Figure 4:
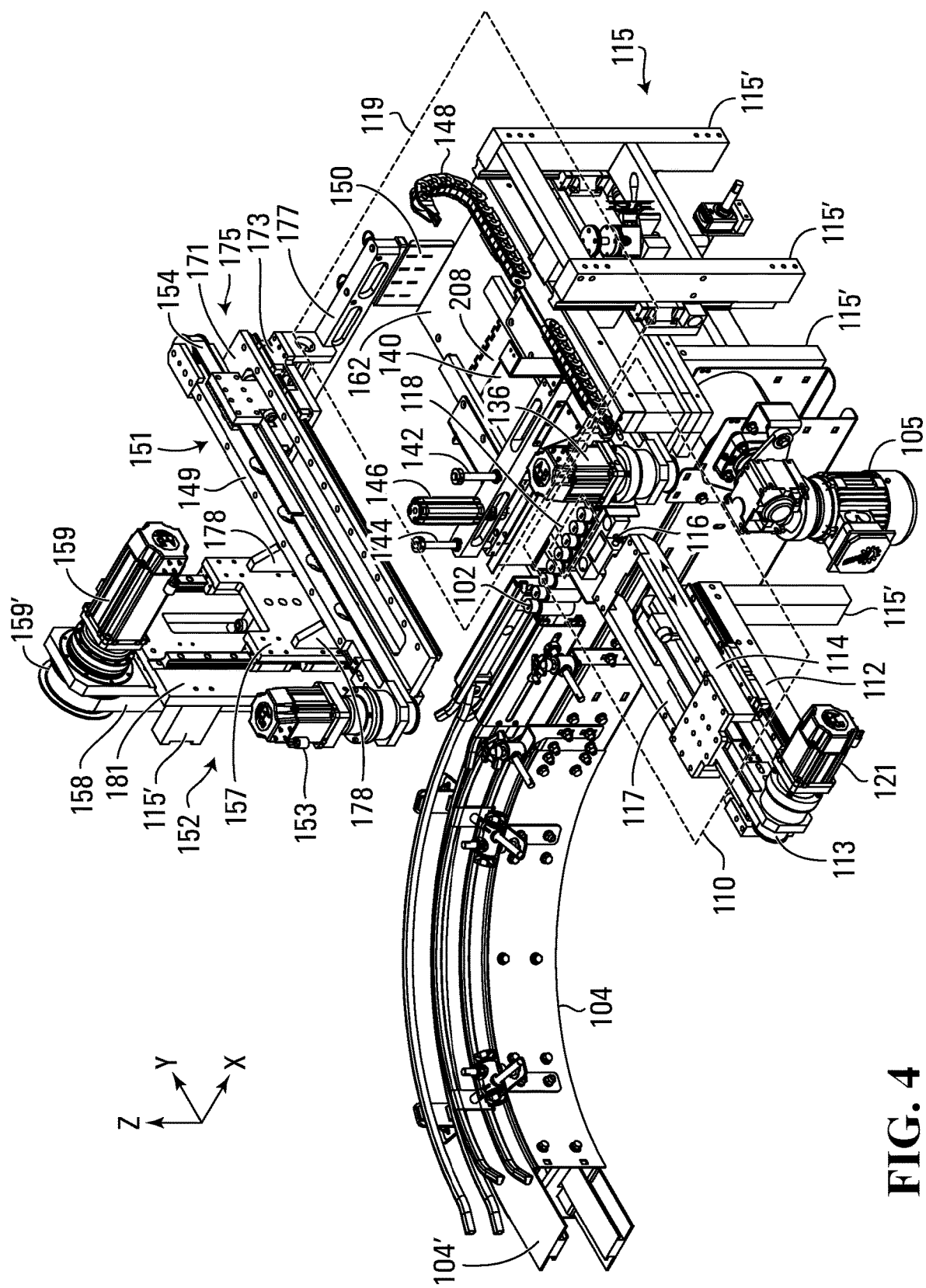
FIG. 4 is an upper perspective view of the item transfer area and item collation area of the system of FIG. 1, in a first operational configuration.

With reference now to FIG. 4, infeed conveyor 104 may be a driven conveyor with a moving belt 104' that provides an upward facing, moving support surface that can support a plurality of items 102 thereon. Infeed conveyor 104 may be configured to deliver the individual items 102 from a source/supply of such items to a transfer location at transfer station 110, adjacent and generally level with the support surface of collation platform 120. The support surface of belt 104' of infeed conveyor 104 may be configured as a movable continuous belt having an upper run and lower run with items supported on the upper run and may be made from a suitable material that will allow items to easily slide over it when pushed by header 116, such as suitable hard plastic commonly used in belt conveyors. Belt 104' may be driven by a suitable motor 105 such as a DC motor or a variable frequency drive motor controlled by PLC 132 through a DC motor drive (sold by Oriental under model AXH-5100-KC-30) by PLC 132. The upward facing surface of belt 104' may have an end-run portion at a location that is adjacent to, and may have a side edge region that is directly adjacent/proximate a forward transverse edge region of support surface of collation platform 120. In other embodiments other types of item delivery/supply apparatuses may be provided, including other types of conveyors such as by way of example only magnetic conveyors or roller conveyors.

System 100 may also include first transfer apparatus 112 at transfer station 110 located proximate and oriented in a longitudinal direction. Transfer apparatus 112 may have a pusher header 116 that operates across the end of belt 104' of infeed conveyor 104 and onto the forward edge region of collation platform 120. First transfer apparatus 112 may include a linear actuator 114 attached to pusher header 116 that is capable of intermittent, linear, reciprocating back and forward movement under the control of PLC 132 in a longitudinal direction (Y direction). When activated by PLC 132, linear actuator 114 may be configured to translate header 116 between a first retracted position and a second extended position, in a longitudinal direction (direction Y) that may be generally perpendicular to the direction of inflow of items 102 on conveyor belt 104' at the end region of the infeed conveyor 104. The reciprocating, linear movement of header 116 may be generated using a piston, lead screw, or belted motor system. An example a suitable motor is a servo motor such as the model MPL-B330P-MJ24AA made by Allen Bradley. According to some belted embodiments, a motor 121 such as a servomotor, stepper motor, or other rotational system may be configured to drive a belt or chain. A belt 113 may be mounted between idler wheels and inter-connected to a sliding rack 117. Header 116 may be removably or permanently affixed to sliding rack 117. An example of a suitable rail system for sliding rack 117 is the Bosch Rexroth ball rail system in which the rails are made from steel and the blocks have a race of ceramic balls inside allowing the block to slide on the rails. Motor 121 may further include an encoder communicably linked to PLC 132.

According to some embodiments, a particular header 116 of one shape/dimensions may be removed and interchanged with another header 116 having an alternative shape/dimensions. Accordingly, if the size and/or shape of individual items 102 require a specific header design, the specific header 116 of a desired shape/dimensions can be selected and installed to correspond/fit the particular items 102 being processed by system 100 at a particular time. Header 116 may have a generally flat pushing surface that is vertically oriented, and which also extends across the body regions of a plurality individual items 102 located at the end region of infeed conveyor 104. In some embodiments, header 116 may have a complementary engaging surface shape to that of the body region surface shape of the individual items being delivered by infeed conveyor 104. For example, header 116 may have a plurality of concave surface shapes arranged in series, which closely match the convex outer surfaces of a plurality of items 102 arranged in series when located at the end region of infeed conveyor 104.

As shown in in FIG. 4, in a first retracted position, header 116 does not impede flow of the infeed conveyor 104 and is positioned outside of the conveyor path of the conveyor belt 104' in the end region. This allows an inflow of several individual items 102 into the end transfer region of infeed conveyor 104. Therefore, several items 102 that form a sub-group 122 of items may be positioned to extend across the width of the operational surface of header 116.

System 100 may be configured to operate infeed conveyor 104 (with items 102 delivered in tight contact, serial formation) and header 116 in a manner that provides for the smooth sliding movement of a sub-group of items 102 from infeed conveyor 104 onto collation platform 120 to form a row 118 of items. For example, based on a calculated timing of operation of infeed conveyor 104, PLC 132 may send an input signal to intermittently start and stop movement of infeed conveyor 104 to deliver a given number N2 of items 102 to a transfer position. Alternatively, one or more electronic eye sensors. such as the model 42KL-D1LB-F4 eye sensors made by ALLEN BRADLEY may be communicably linked to PLC 132, and based on a sensed value/signals (e.g. an indicator that the number N2 of specific individual item 102 that will form a sub-group are all located in the desired specific positions at a transfer position), responsive to the sensed value/signals, PLC 132 may signal to the infeed conveyor 104 to stop movement of the belt 104' of infeed conveyor 104. The number of individual products 102 that are positioned on infeed conveyor 104 spanning across the operational surface of header 116 and forming a subgroup of items 102, may correspond to the number of items N2 desired for a collated row 118 for each arrayed group 122 of products 102 that it is desired to fit into a sealed case 111E, the sealed case 111E containing a number N1 of collated rows 118 in the arrayed group.

Figure 5:
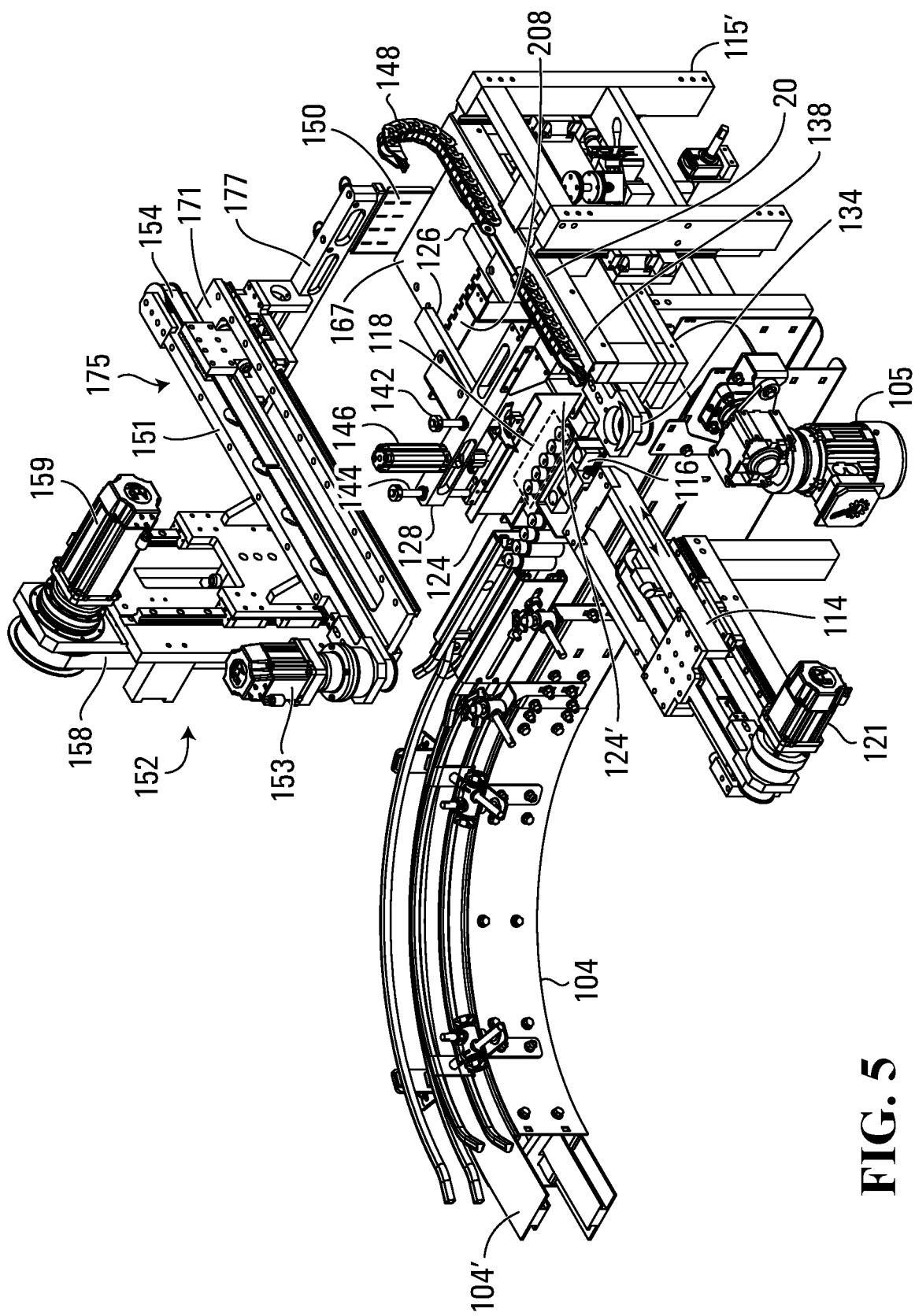
FIG. 5 is a perspective view of the areas of FIG. 4 in a second operational configuration.

With particular reference now to FIG. 5, header 116 may be configured and operable to move from the first retracted position to the second extended position, in a longitudinal direction (Y direction) in a plough like movement, to transversely push and slide the predetermined number of individual items 102 in the subgroup at the transfer location from the infeed conveyor 104 onto an upper item support surface of collation platform 120.

Upon determination from PLC 132 that the collated row 118 is present at the transfer position spanning across the surface of header 116, PLC 132 may send a signal to linear actuator 114 to activate and initiate the movement of the header 116. Header 116 will move from the first position to the second position. Through this movement, header 116 will abut individual items 102 and push the items from infeed conveyor 104 onto the collation platform 120. This movement may be done in a manner that the items 102 slide smoothly and together on their bases from the infeed conveyor 104 onto the upper surface of collation platform 120. Movement of header 116 may be at a predefined speed. Accordingly, the movement of a collated row 118 of items 102 may be of a character that the individual items 102 will be less likely to topple over. This movement will produce a first collated row 118 on the collation platform 120.

After moving from the first position to the second position, header 116 will be returned back by control of PLC 132, to the first retracted position (i.e. the position shown in FIG. 2). Once returned to the retracted position, a new plurality of individual items 102 may be delivered to the end region of infeed conveyor 104 and the transfer location, under control of PLC 132. This subgroup may then also be pushed by header 116 onto collation platform, also causing any prior sub-groups/rows 118 of items that are already on collation platform 120, to move longitudinally, further downstream on the support surface of collation platform 120. As will be evident from FIG. 6, this process may be repeated until the desired number N1 of subgroups of items 102, arranged in collated rows 118, are on the collation platform 120 to form a desired size of group 122 of collated items 102 to be loaded into an erected case 111C.

The item support surface of collation platform 120 may be a low friction material which allows for easy sliding of items 102 when supported on their bases, across the adjacent and vertically and transversely aligned upward facing support surfaces. Sides plates may be also provided in association with collation platform 120 extending on both transverse sides of the length of the collation platform 20, to form bumper members (bumpers) 126 with inward facing support surfaces at a fixed width/transverse spacing corresponding to the width of a collated row 118. Bumpers 126 may be constructed with metal support frames and having inner support surfaces of a similar low friction, high rigidity material such as UHMW polyethylene, to allow each collated row 118 to maintain its positioning and restrict sliding movement to a single dimension (e.g. easy sliding in the longitudinal direction Y along the collation platform 120).

According to some embodiments, the distance between bumpers 126 may be adjustable, such that the bumpers 126 may be repositioned to operate with an alternative header 116 of different width dimensions, to allow for different dimensions of collated items 102 and/or different numbers of items in each row 118 of a desired group 122. For automatic adjustment by PLC 132, bumpers 126 could be mounted on an adjustment mechanism that provides for spacing adjust by operation of a servo motor in a manner similar to that described elsewhere herein.

To prevent toppling of a subgroup/row 118 of items 102, and/or of a plurality of adjacent rows 118 of items 102, on collation platform 120, as header 116 pushes items from infeed conveyor 104 onto collation platform 120, a topple plate 124 that may comprise part of first transfer apparatus 112, may also be provided at collating station 119. Topple plate 124 may be a vertically and transversely extending plate that may have a generally flat support surface 124' (FIGS. 5 and 6) that can be moved to support positions that ensure that the individual items 102 remain upright and are prevented from falling over throughout the transfer of the several subgroups/rows 118 of items 102 from infeed conveyor 104 to collation platform 120, during the successive longitudinal pushing movements of header 116. Support surface 124' of topple plate 124 may be positioned on an opposite side of the rows 118 of items to header 116, as the rows of items are being collated on collating platform 120. Header 116 may be positioned in consistent or intermittent abutment or be positioned proximate to the first collated row 118 on collating platform 120.

Figure 7:
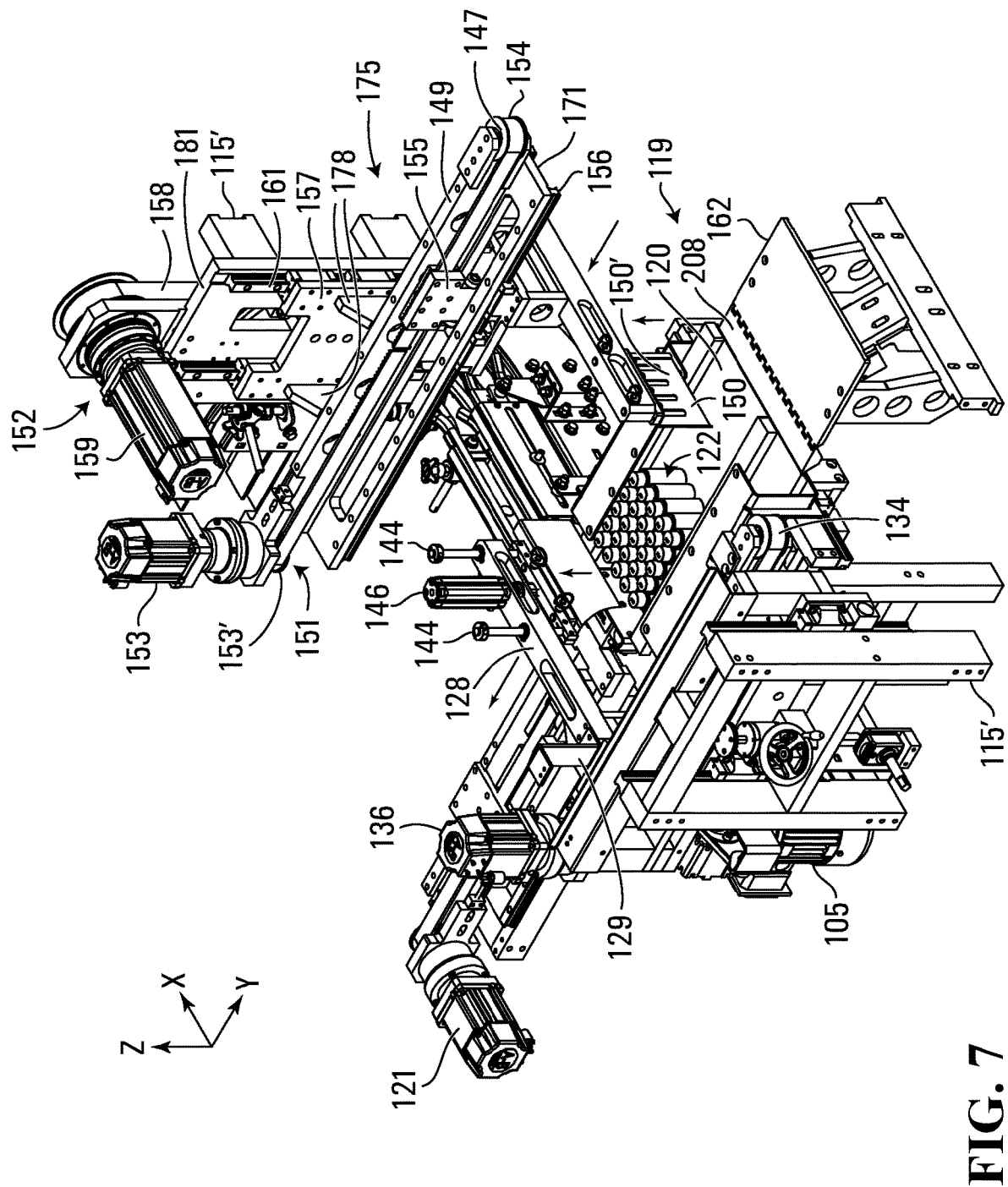
FIG. 7 is a is a perspective view of the areas of FIG. 4 in a fourth operational configuration.

Topple plate 124 may be connected to a sliding beam apparatus 128. Sliding beam apparatus 128 may be interconnected to a drive belt 134 (FIG. 7) with belt 134 being operable to be moved by a motor 136 (FIGS. 4 and 7). Sliding beam apparatus 128 may be cantilever supported at one end by a carriage block 129 that may be operable to movement on longitudinal and horizontal guiderails 138, to ensure stability while sliding beam apparatus 128 moves backwards and forwards in a horizontal longitudinal direction Y. An example usable motor is a servo motor such as the model MPL-B330P-MJ24AA made by Allen Bradley. Again, a suitable rail system is the Bosch Rexroth ball rail system referenced above. Carriage block 129 may be interconnected to drive belt 134. Accordingly, turning motor 136 may drive belt 134 to move carriage block 129 to slide on guide rails 138 to translate sliding beam apparatus 128 in longitudinal cyclical movement under control of PLC 132, such as indexed forward movement, and continuous rearward movement. The result is topple plate 124 moves under control of PLC 132 in backwards and forwards, longitudinal horizontal motion.

Movement of topple plate 124 in the longitudinal direction may be controlled by PLC 132 and may be operable to occur in co-ordination with the movement of header 116. The movement of topple plate 124 can be configured such that as header 116 pushes each additional collated row 118 of items 102 from infeed conveyor 104 onto collation platform 120, topple plate 124 will index forward longitudinally, in the same longitudinal direction and the same distance of movement of the first row 118. This forward movement of header 116, and any rows 118 or items in front of header 116, can be co-ordinated to be in tandem, at the same or a similar speed as the forward movement of topple plate 124. Alternatively, topple plate 124 may move a defined, limited distance before movement of header 116 commences, but the distance being sufficiently small to prevent toppling over of any items 102. A longitudinal operating window of movement of topple plate 124 may extend from proximate a first upstream transverse edge area of the collation platform 120 (i.e. allowing receipt of the first collated row 118 on to the collation platform) to proximate a second downstream transverse edge of the collation platform 120 (i.e. allowing receipt of the final collated row 118 of items 102 to form a completed group 122 on collation platform 120 arranged in an ordered array).

Topple plate 124 may also be capable of up and down vertical movement relative to the upper surface of collation platform 120. A vertical movement apparatus 142 may be connected to topple plate 124 and may also be supported on sliding beam apparatus 128, for longitudinal movement therewith. Vertical movement apparatus 142 may include a reciprocating driven rod member, operable to driven up and down by a motor 146 under control of PLC 132. Alternatively, vertical movement apparatus 142 may by a servo-driven device. The driven rod member may be interconnected at its lower distal end to topple plate 124. The driven rod member may be a piston rod of a double/two-way acting (up and down) pneumatic cylinder operated by pressurized air delivered to the piston through air hoses, with electronic valves selectively controlling the flow of pressurized air, with the valves being part of air valve system 332 (FIG. 2) controlled by PLC 132. The vertical up and down movement of the driven rod member may be guided by a pair of transversely spaced guide rods 144, that may be cylindrical rods that have bottom ends fixedly attached to a top edge portion of topple plate 124. Guide rods 144 may pass through and side within vertical cylindrical guide passages within sliding beam apparatus 128. Thus, when driven member of motor 146 moves upwards and downwards, guide rods stabilize the up and down vertical movement of topple plate 124.

An operational window of vertical movement of topple plate 124 may be defined at a minimum bottom/downward operating position that ensures the collated items 102 do not topple/fall over while sliding from infeed conveyor 104 onto collation platform 120; and a maximum top/upward position that provides an adequate clearance height such that the lower edge of the topple plate 124 is located above the highest portion of collated items 102 to allow for the topple plate 124 to move longitudinally rearward, over top of, and past the group 122, without interfering with/contacting the items. Topple plate 124 may move vertically to have clearance over the collated items 102, then return to the first position proximate leading upstream edge area of collation platform 120.

An encoder may be provided for at least motor 136 and the encoder may rotate in relation to the rotation of the respective drive wheel of motor 136. The encoder may be in communication with, and provide signals through the servo drive to PLC 132. Thus PLC 132 can in real time know/determine/monitor the horizontal position of belt 134 in space and may also be able to adjust the vertical position of the driven rod of motor 146 by operating motor 146, in part based on the longitudinal position and direction of movement of topple plate 124. PLC 132 can determine and monitor in real time the longitudinal (Y direction) and also adjust the vertical position (Z direction) between a fully up and fully down position, of topple plate 124 at any given time. The particular types of encoder that may be used is known as an "absolute" encoder. Thus system 100 can be "zeroed" such that due to the calibration of the encoder of motor 136 the zero-zero position of the end effector in the Y direction is set within PLC 132. The zero-zero position can be set with the transfer at its most horizontally left position. PLC 132 can then substantially in real time, keep track of, and change the vertical and horizontal position of topple plate 124 as PLC 132 moves system 100 through the processing sequence for moving a group of items 102 from infeed conveyor 104 to collation platform 120.

Also associated with topple plate 124 may be a first, generally horizontally oriented caterpillar device 148. Caterpillar device 148 may have a hollow cavity holding hoses and wires carrying pressurized air/vacuum and electrical/communication wires/hoses. Caterpillar 148 allows such hoses and wires to move longitudinally as the beam apparatus 128 and topple plate 124 are moved longitudinally backwards and forwards (in direction Y). Caterpillar device 148 allow hoses and wires to supply motor 146 with pressure for controlling the pneumatic movement of the driven member of motor 146. An example of suitable caterpillar devices that could be employed is the E-Chain Cable Carrier System model #240-03-055-0 made by Igus Inc. It should be noted that electrical communication between the PLC 132 and the drive mechanisms of topple plate 124 could in other embodiments be accomplished using wireless technologies that are commercially available.

Motors 121, 136 may be provided and be in electronic communication with PLC 132 through a servo drive (as seen in FIG. 3) and operate in both directions and if they are servo motors/drives at varying speeds. Examples that could be used are servo VPL-B1003T-PJ12AA made by ALLEN BRADLEY, in combination with servo drive 2094-BC01-MP5-S also made by ALLEN BRADLEY and gear head AE090-010-P2 FOR VPL-_100_A/B made by Apex.

Motor 146 may be operated dependent at least in part upon the horizontal position of topple plate 134, by the turning on and off pressurized air, by PLC 132 operating appropriate electronic valves of valve system 332.

Second Transfer Apparatus

Turning again to FIG. 7, second transfer apparatus 175 may also be provided at collating station 119, operating generally between collation platform 120 and pedestal apparatus 140 in casing area 130. Transfer apparatus 175 may be configured to transfer successively, each group 122 of collated items 102 from the collation platform 120 to pedestal apparatus 140. When transferred to pedestal apparatus 140, each group 122 of items 102 is then sheathed/covered by robotic arm 250 with an erected case 111C. In the casing area 130 may be located, in addition to robotic arm 250 and pedestal apparatus 140, rod movement sub-system 203 that may include a pair of transversely oriented, independently longitudinally movable, movement rods 200-1 and 200-2.

Figure 8:
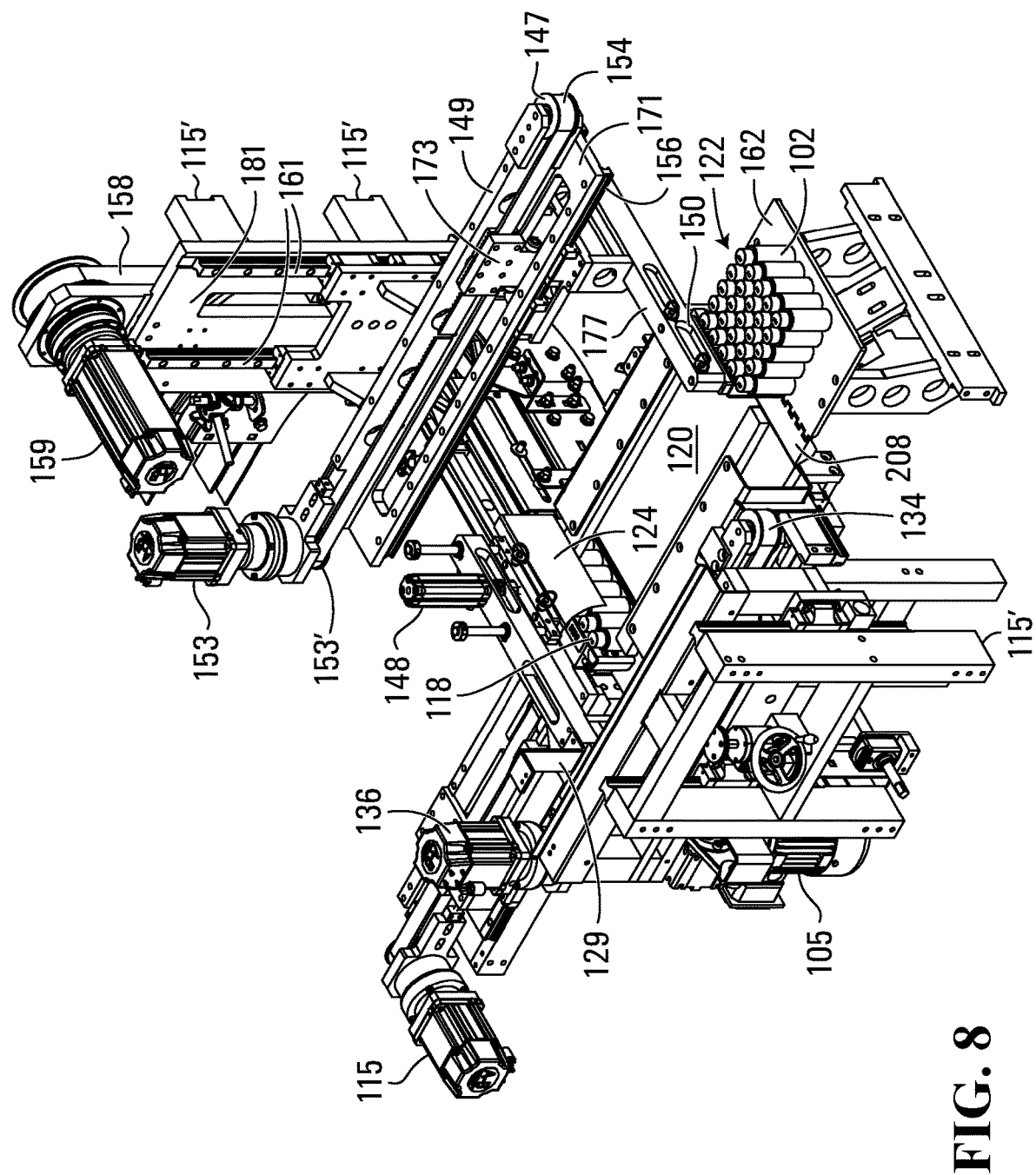
FIG. 8 is a perspective view of the areas of FIG. 4 in a fifth operational configuration.

Pedestal apparatus 140 provides one or more generally horizontal support surfaces upon which a collated group 122 of items 102 can be moved over and supported while being sheathed by/enclosed within an erected case 111C by robotic arm 250. The horizontal item support surfaces of pedestal apparatus 140 may be made from a suitably strong, low friction material such as a low friction stainless steel. Transfer from collation platform 120 to pedestal apparatus 140 may be performed using transfer apparatus 175 to move each collated group 122 of items 102 from the collation platform 120 onto an input transfer platform 162 of pedestal apparatus 140. Transfer apparatus 175 may comprise a generally flat, transversely extending rigid plate 150 with a vertical and transversely oriented forward engagement surface 150' movable in the longitudinal (Y) direction and in the vertical (Z) direction. Engagement surface 150' may have a contoured engagement/pushing surface that matches an outer curved surface of the body region of each item 102. With particular reference also now to FIG. 8, transfer apparatus 175, controlled by PLC 132, is operable to position transfer paddle 150 to engage with the collated items 102 in a first position behind each collated group 122 of items 102 on the collation platform 120, and push collated items 102, moving them with sliding movement longitudinally downstream across the collation platform 120 and onto to the support surface of input transfer platform 162 of pedestal apparatus 140 (the position shown in FIG. 8).

Transfer apparatus 175 may include a horizontal movement system 151 and a vertical movement system 152 in electronic communication with, and both being controlled by, PLC 132. Horizontal movement system 151 may be mounted on moving support components of vertical movement system 152. The movement of the transfer paddle 150 may be defined by the combined movement of horizontal movement system 151 and vertical movement system 152. Horizontal movement system 151 and vertical movement system 152 may each comprise a belted—motor driven system.

Horizontal movement system 151 may include a horizontally and longitudinally oriented, horizontal movement support frame member 149 which supports a motor 153 that drives a continuous, horizontally oriented drive belt 154 that is also supported for movement on support frame member 149. Drive belt 154 may be supported for movement between a drive wheel 153' of motor 153 and an idler wheel 147. Horizontal movement system 151 may also include a rail support frame 171 that supports laterally spaced, longitudinal and horizontal guide rails 156. A carriage 173 may be mounted for sliding horizontal and longitudinal movement along guide rails 156. A transversely and horizontally oriented support cantilevered beam 177 may be connected to and supported by carriage 173. Cantilevered beam 177 may extend from carriage 173 that is generally located on the transversely opposite side of the flow path of items 102 to the carriage block 129 and guiderails 138 that support cantilever sliding beam apparatus 128. In this way, the support and driving apparatuses of topple plate 124 may be located in positions that do not interfere with the support and driving apparatuses of transfer paddle 150.

A transfer paddle mounting plate 155 may be fixedly connected to carriage 173 and interconnected with drive belt 154. Transfer paddle 150 may be fixedly connected to support beam 177 and move in reciprocating back and forward sliding movement on guide rails 156 with beam 177, and carriage 173. Thereby, a movement of motor 135 may move belt 154, causing longitudinal horizontal movement of transfer paddle 150.

Horizontal movement support frame 149, and rail support frame 171 may themselves be mounted via spaced vertically oriented mounting plates 178 to a carriage 157. Carriage 157 may be interconnected to a continuous vertical oriented drive belt 158 driven by vertical motor 159, and carriage 157 may supported by and on vertical guide rails 161. Guide rails 161 may be mounted on vertically and longitudinally extending support plate 181. Support plate 181 may be supported by a plurality frame members 115'. Drive belt 158 may be supported for movement between a drive wheel 159' of motor 159 and a lower idler wheel (not visible). Carriage 157 may be configured to slide along vertically oriented (Z-direction) guide rails 161 for stability, in reciprocating upward and downward sliding movement on guide rails 161. Thereby, a movement of motor 159 may move belt 158, causing vertical movement of carriage 157. The vertical movement of carriage 157 results in the vertical movement of horizontal movement support frame 149, and rail support frame 171, transfer paddle mounting plate 155, beam 177 and transfer paddle 150 that are interconnected thereto.

The co-ordinated operation of motors 153 and 159 by PLC 132 can result in the vertical and longitudinal movement of transfer paddle 150. Motors 153 and 159 may be selected having a torque strength suitable to slide collated items 102 from collation platform 120 to the input transfer platform 162. An example suitable motor for both horizontal and vertical movement of the transfer paddle are servo motors such as the model VPL-B1003T-PJ12AA made by Allen Bradley.

Transfer apparatus 175 may have an operating longitudinal range of movement for movement of transfer paddle 150 that extends between a downstream edge area of the collation platform 120 to at least the upstream edge area of the input transfer platform 162. The vertical axis operating range of transfer paddle 150 may be such that the transfer paddle 150 may be positioned in an activated position where the lower transversely extending edge of transfer paddle 150 may be located proximate/close to the upward facing support surface of collation platform 120, and may be lifted vertically to an upper vertical position that provides transfer paddle 150 clearance to move transversely above and rearwards behind a group of collated items that may be located on collation platform 120.

Both motors 153 and 159 can be independently driven in both directions at varying speeds by PLC 132 (FIG. 3) through servo drives. In this regard, both servo motors 153 and 159 may be provided with two separate ports, one for connection to a power line and the other for connection to a communication line to provide communication with the servo drive and PLC 132. Servo motors 153, 159 may also have a third input which may provide input for an electric braking mechanism. It should be noted that all of the servo motors described herein may be similarly equipped. Motors 153 and 159 may further include encoders that enable PLC 132 to estimate belt position of drive belts 154, 158, in real time and thus move transfer paddle 150 both vertically upwards and downwards, as well as backwards and forwards in a longitudinal direction.

According to some embodiments, transfer paddle 150 may be positioned vertically and horizontally using only motors 153 and 159. Alternatively, in other embodiments, the transfer paddle may be articulatable on its own in a vertical axis, using a servomotor or a compressed air cylinder.

Figure 7A:
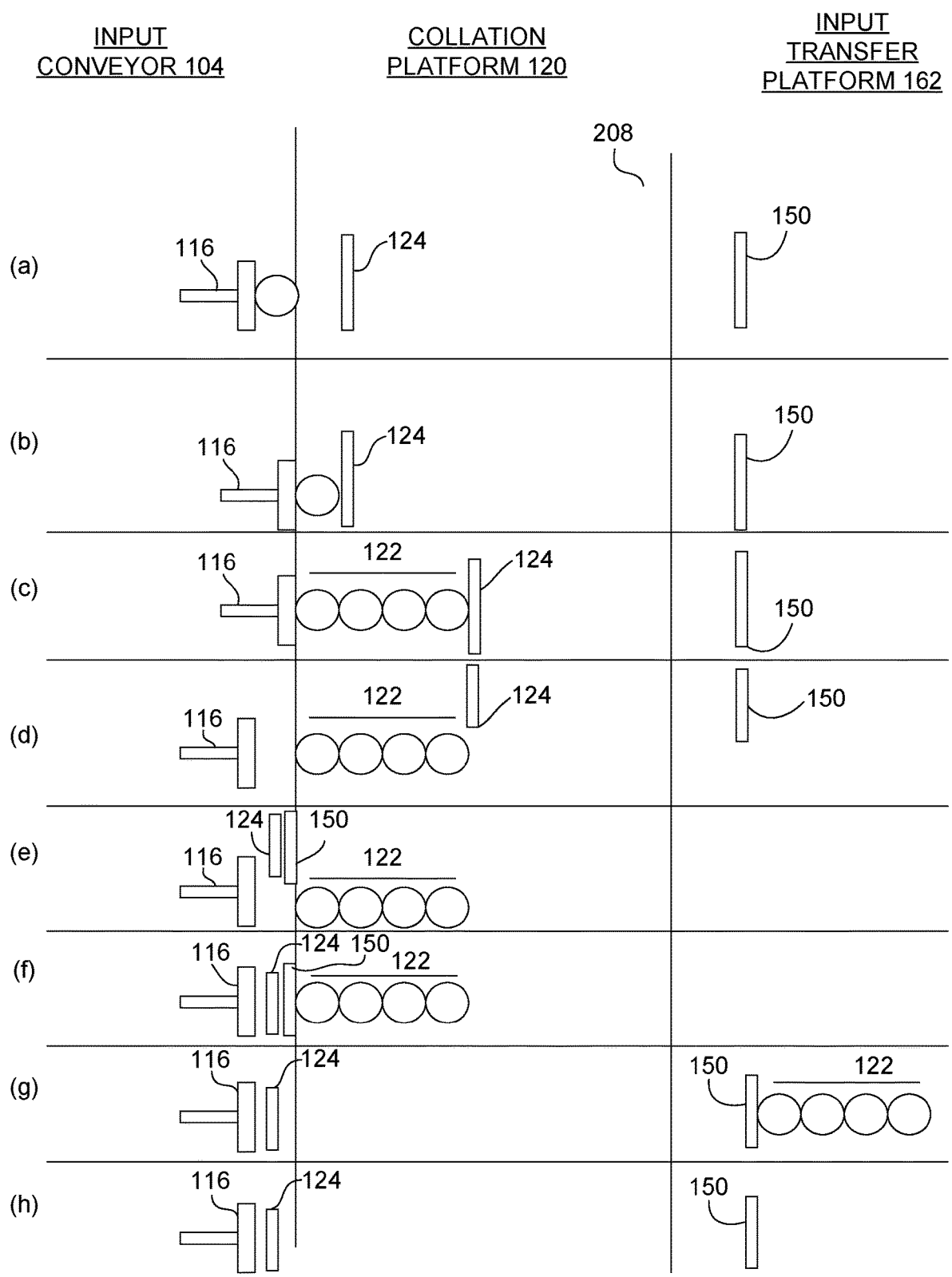
FIG. 7A is a schematic side view showing a cycle of movement of some components of the system of FIG. 1.

Header 16, topple plate 124 and transfer paddle 150 may move in a co-ordinated movement relationship such as that depicted schematically in FIG. 7A, as shown in steps (a) to (h). Initiating a cycle of movement, a first row 118 of items may be transferred by co-operative movement of header 116 and positioning of topple plate 124 (position (a) to position (b). The co-ordinated movement/positioning of header 116 and topple plate 124 continues by adding rows 118 of items to form a group 122 on collation platform 120 (position (c)) as header 116 repeatedly adds rows 118 to collation platform 120, and topple plate will index backwards as each row is added, until a group 122 is formed.

With a group 122 located on collation platform 120 (position (c)), topple plate 124 will be raised vertically upwards and move backwards to a position behind the group 122 (to position (d) and then to position (e)). Transfer paddle 150 will also move upwards (position (d), and then backwards (position (e)) and then downwards to a position immediately behind the group 122 and in front of topple plate 124 (position (f)). Then transfer paddle 150 can push the group 122 forwards from collating platform 120 onto input transfer platform 162 (from position (f) to position (g)). Thereafter movement rods 200-1, 200-2 (not shown in FIG. 7A) can take over the control of movement of the group 122 and engage the front and rear sides of the group of items to move the group away (position (h)). Topple plate 124 will then move longitudinally forward positioning itself to be ready to support another first row 118 that will move onto collation platform 120. Thereafter, another cycle of movement of header 116, topple plate 124, and transfer paddle 150 can commence again (position (a)).

Pedestal Apparatus

Figure 9:
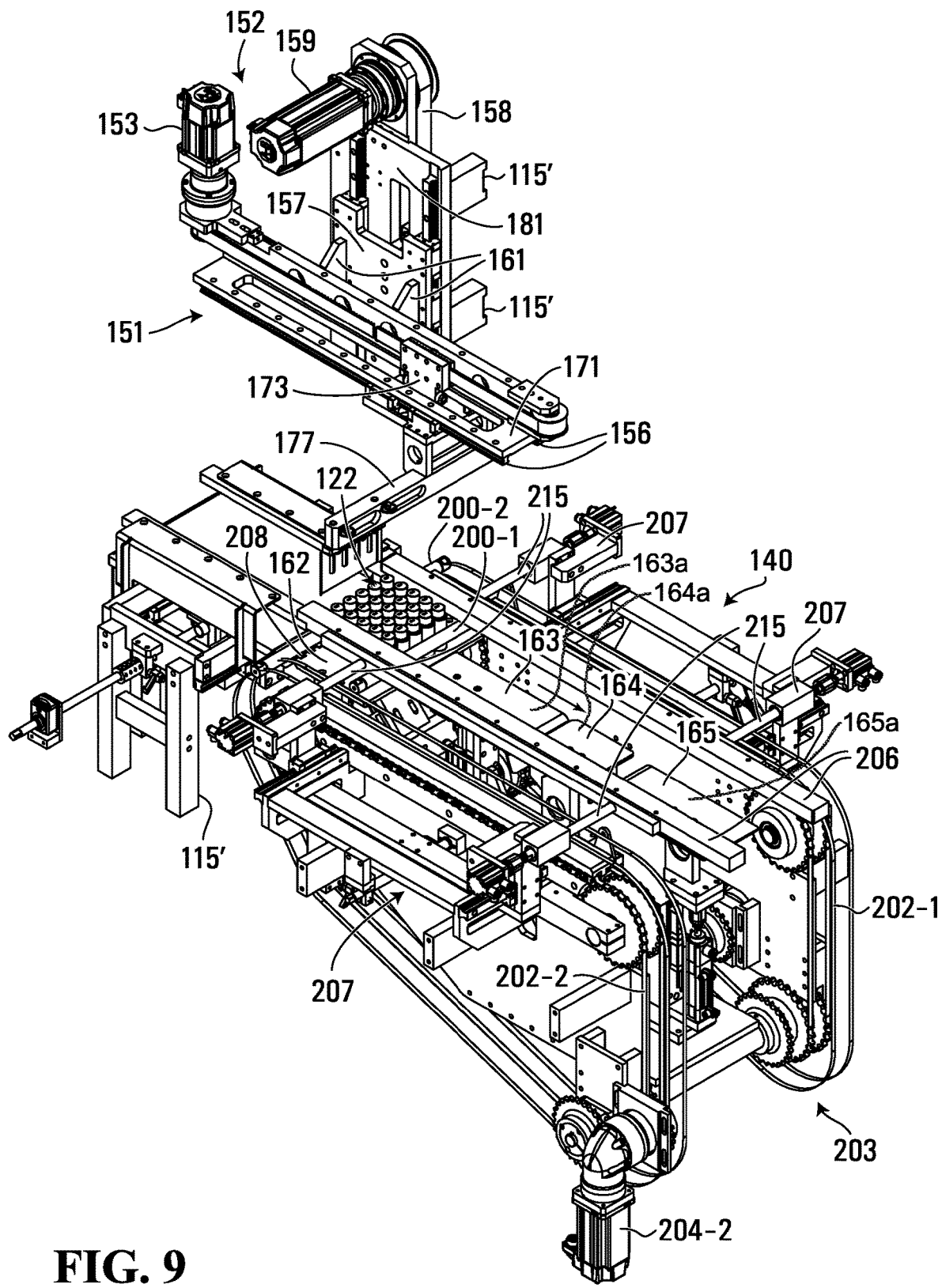
FIG. 9 is a perspective view of the item collation area, moving rod sub-system and pedestal apparatus components of the system of FIG. 1, in a first operational configuration.
Figure 9A:
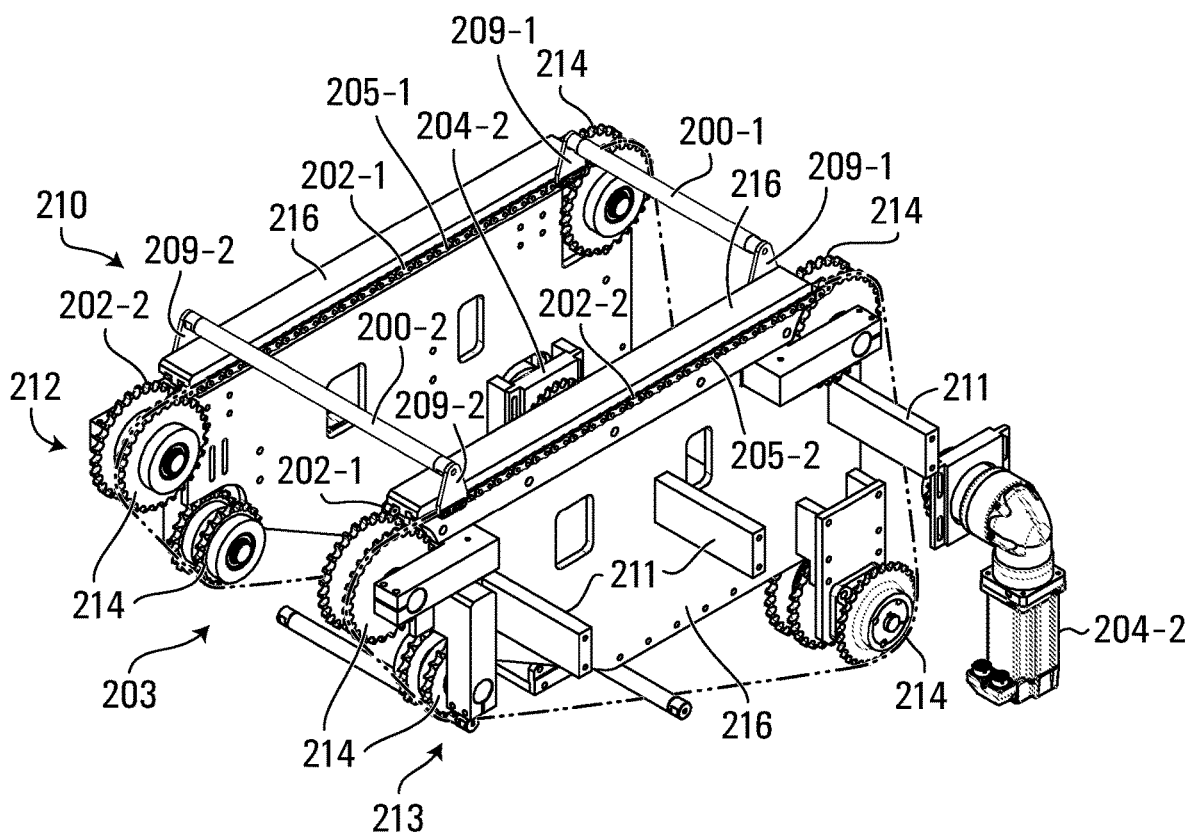
FIG. 9A, 9B, 9C are perspective, side and top views respectively of the moving rod sub-system forming part of the system of FIG. 1.
Figure 9B:
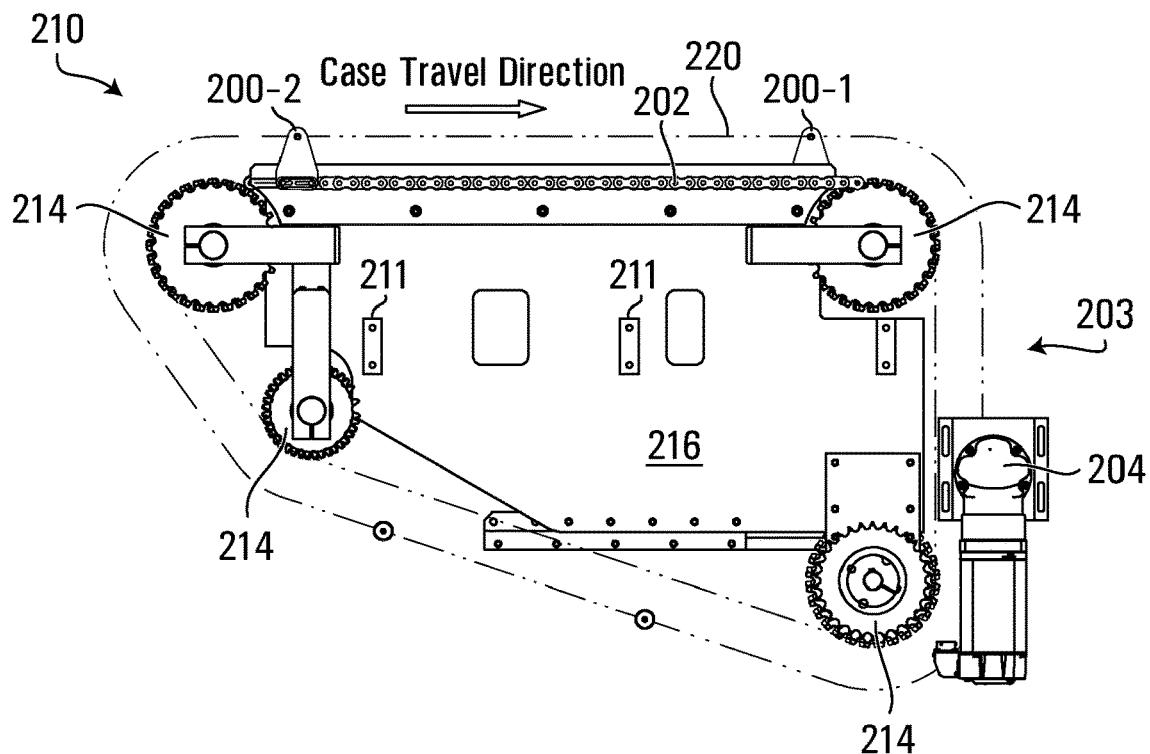
Figure 9C:
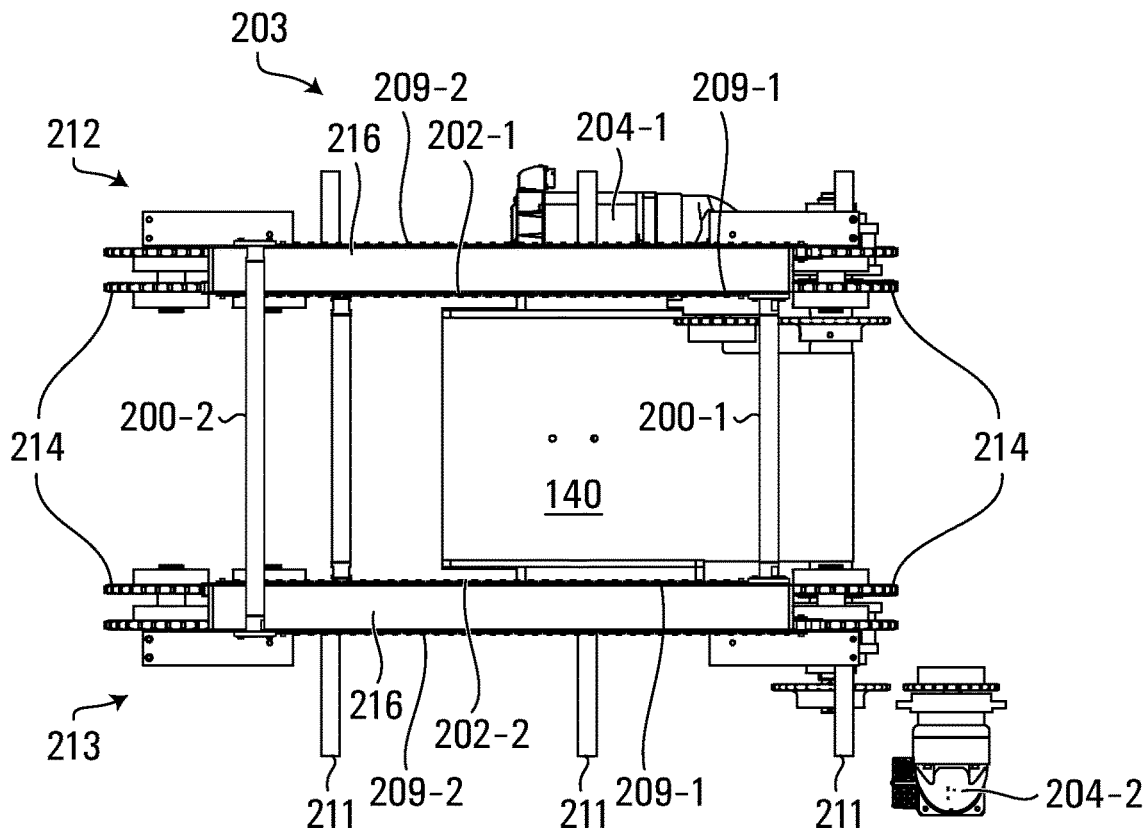
Figure 10:
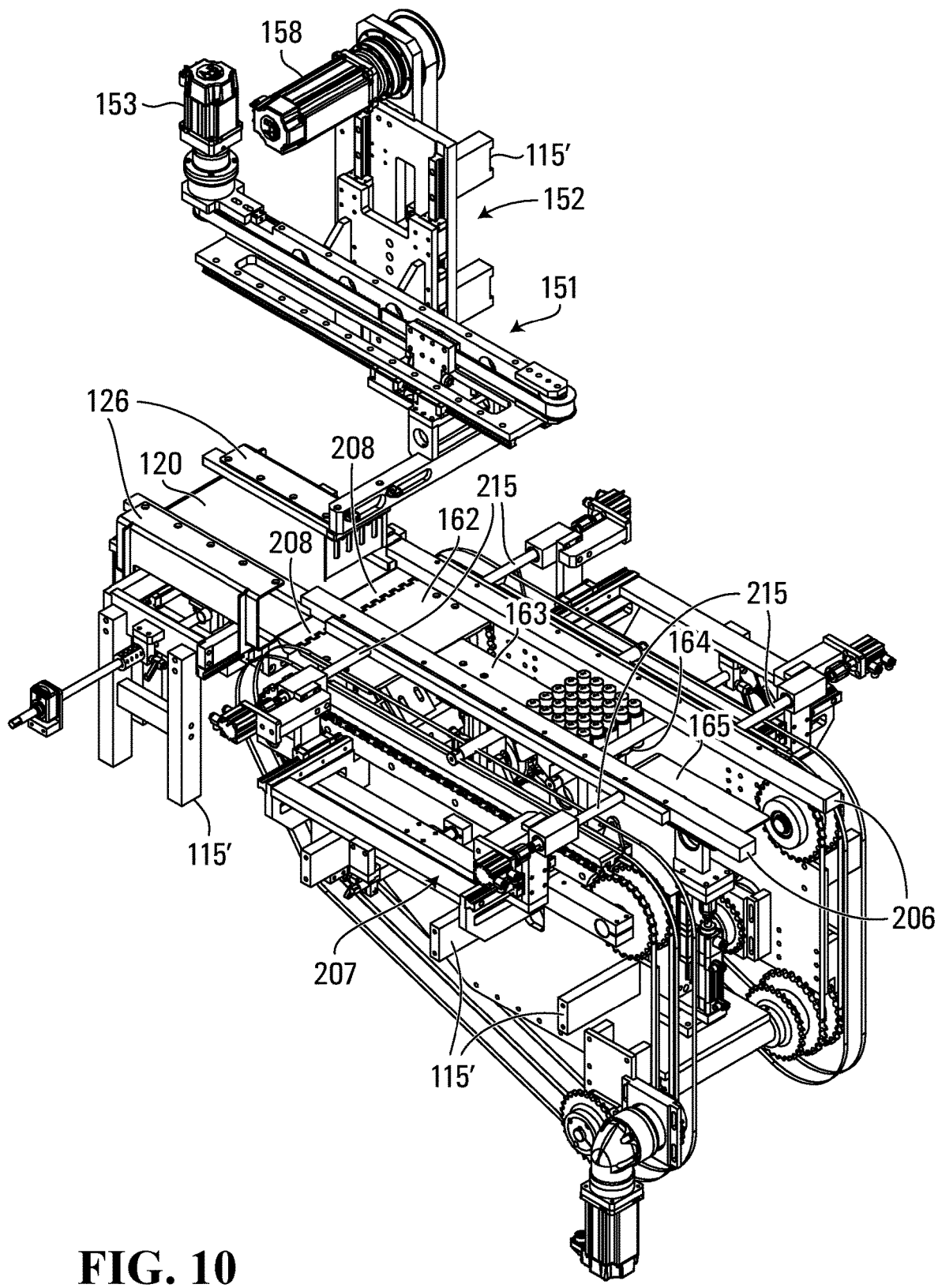
FIG. 10 an upper perspective view of the item collation area, moving rod sub-system and pedestal apparatus components of FIG. 9, in a second operational configuration.

With particular reference now to FIGS. 8, 9, 9A-C and 10, an example pedestal apparatus 140 is shown. Pedestal apparatus 140 may facilitate/assist with the sheathing of groups 122 of items 102 with erected cases 111C, as well as the closing of leading and trailing bottom flaps F, G respectively of the erected cases 111C, as described further hereinafter, in order to be able to interpose the leading and trailing flaps F, G of the erected case, into closed, support positions beneath the group 122 of items 102 that are positioned within the interior storage space 107 of the erected case 111C. Pedestal apparatus 140 may comprise input transfer platform 162, a first folding platform 163, a central loading platform 164, and a second folding platform 165, each located in series in longitudinal relation to each other (FIGS. 8, 9 and 10). Each of input transfer platform 162, first folding platform 163, central loading platform 164, and second folding platform 165 may have upwardly directed support surfaces for supporting items 102 thereon. The positions of support surfaces of first folding platform 163, central loading platform 164, and second folding platform 165 may be capable of limited vertical and longitudinal adjustment relative to each other.

Transversely oriented hinged gate/door 208 may be located between the upstream edge region of input transfer platform 162 and the downstream edge region of collation platform 120. Gate 208 may be configured for operational movement between a closed position and an open position. In the open position of gate 208, a substantially smooth, horizontal flat continuous extending support surface between the upper surface of collation platform 120 and the upper surface of input transfer platform 162 is interrupted by gate 208 having been moved downward to provide an opening between the upper surface of collation platform 120 and the upper surface of input transfer platform 162. In the closed position of gate 208, a substantially smooth, horizontal flat continuous support surface extends between the upper surface of collation platform 120 and the upper surface of input transfer platform 162 over the upper surface of gate 208 mating with the upper surface of collation platform 120 and the upper surface of input transfer platform 162.

Trailing movement rod 200-2 may move from a lowered start position, longitudinally forwards and upwards, through this opening provided when gate 208 is in an open position, between the lowered start position in which trailing movement rod 200-2 does not extend across the upper surfaces of any of gate 208, input transfer platform 162, first folding platform 163, central loading platform 164 or second folding platform 165 to a group engagement position behind the last row of items 102 in a group 122. When trailing movement rod 200-2 is in a lowered start position, gate 208 may be moved between the open position and the closed position.

When gate 208 is in the closed position of gate 208, a substantially smooth, flat uninterrupted surface is provided between the upper surface of collation platform 120 and the upper surface of input transfer platform 162. In this position, trailing movement rod 200-2 may be either positioned vertically beneath gate 208 in its start position, and the substantially smooth, flat continuous surface between the upper surface of collation platform 120, gate 208, and the upper surface of input transfer platform 162 is provided, allowing a collated group to pass over top of the trailing movement rod 200-2. Alternatively, during operation, trailing movement rod 200-2 may be located above that continuous flat surface, and in an engagement position rearward of a group 122 of items with which it is operationally engaging, as described herein. In some embodiments, gate 208 may be connected at both opposite ends by a hinge mechanism and gate 208 may be moved between the open and closed positions under control of PLC 132 by a gate drive mechanism interconnected to gate 208, which may include a pneumatic piston device with a reciprocating piston arm that may drive gate 208 downwards and upwards between the respective closed and open positions. According to some embodiments, gate 208 may be mounted to a cylinder actuation device to move between the open and closed position, or may. in embodiments, be actuated by a servo drive actuator.

Figure 18:
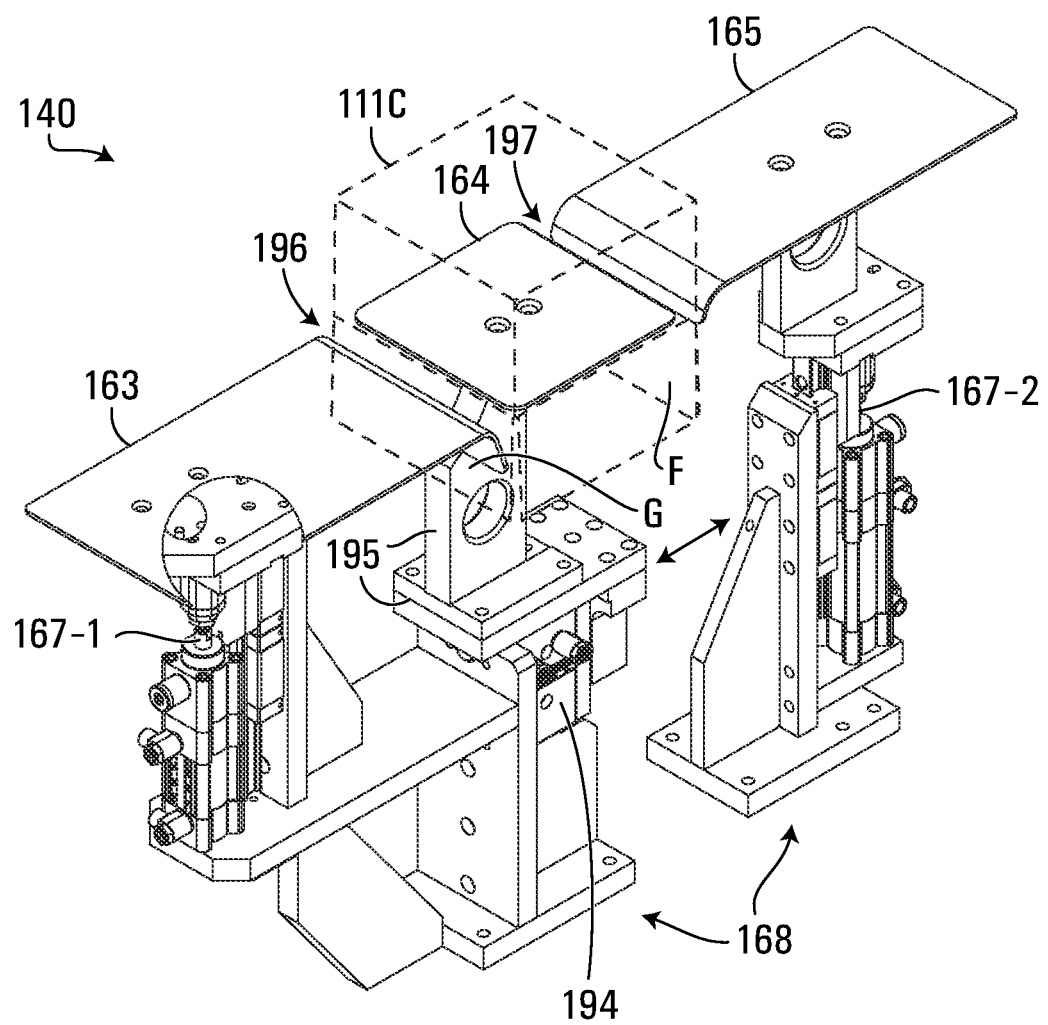
FIG. 18 is a perspective view of platforms and supporting components of FIG. 17 forming part of the pedestal apparatus of FIG. 10.
Figure 20:
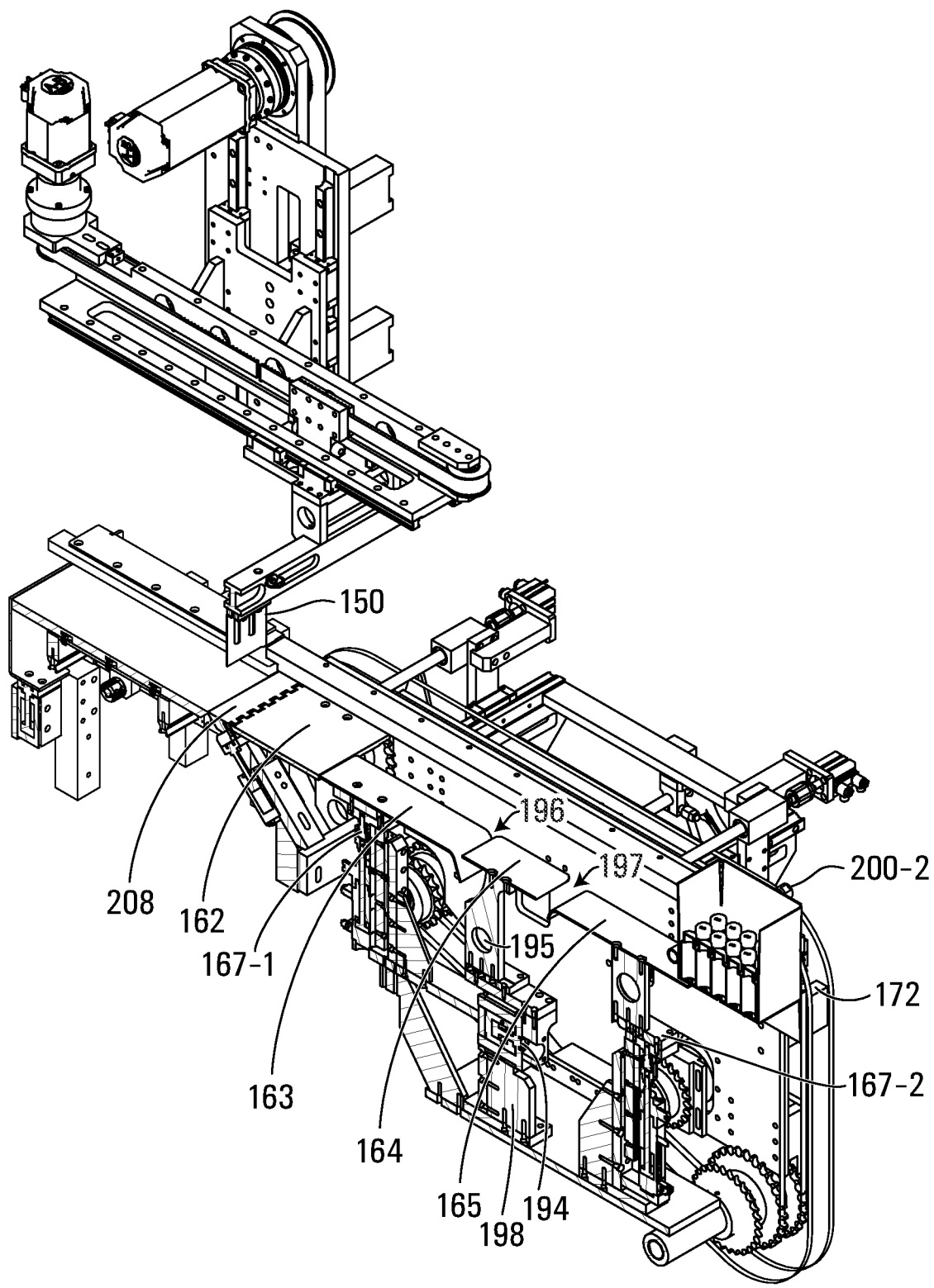
FIG. 20 is an upper side perspective view of the moving rod sub-system, pedestal apparatus components and an output conveyor, forming part of the system of FIG. 1, with some components removed for clarity, and in a first operational configuration.

With particular reference to FIGS. 9, 18 and 20, first folding platform 163 and second folding platform 165 may be adjustable up and down in the vertical axis direction using pneumatic piston devices 167-1 and 167-2 that are interconnected thereto, controlled by valves of valve system 332, operated by PLC 132, such that each platform support surface 163a, 165a of first folding platform 163 and second folding platform 165 respectively may have its vertical distance and position adjusted by PLC 132 relative to the support surface 164a of central loading platform 164, to fulfil the functions described herein. First folding platform 163, second folding platform 165 and central loading platform 164 may be supported by a pedestal support frame 168.

Central loading platform 164 may be supported by one or more platform support plates 195. Platform support plates 195 may be supported and operable for limited longitudinal rearward and forward movement (Y direction) and may be interconnected to a movement actuator 194—that may also be for example a pneumatic piston device. Operation of piston device/actuator 194 may be controlled by valves of system 332, operated by PLC 132 operating air valve system 332, such that the upper support surface of central loading platform 164 may have its longitudinal distance and position varied to a limited extent relative to the support surfaces of the first folding platform 163 and second folding platform 165 to thereby adjust the size of the longitudinal space/gap 196 between the central loading platform 164 and first folding platform 163, and the size of the longitudinal space/gap 197 between the central loading platform 164 and second folding platform 165 (FIG. 18).

Movement of successive groups 122 of items 102 across pedestal apparatus 140 may be achieved using movement rods 200-1, 200-2 of rod movement sub-system 203. Specifically, movement of each collated group 122 of items 102 across components of pedestal apparatus 140 may be facilitated using leading movement rod 200-1 and trailing movement rod 200-2 which can be positioned longitudinally, on longitudinally opposite, front and rearward transverse sides of each group 122 of collated items 102. Leading movement rod 200-1 and trailing movement rod 200-2 may be each driven to move generally longitudinally, independently of each other, and the movement of each may be controlled by PLC 132.

FIGS. 9A-C depict rod movement sub-system 203 including leading movement rod 200-1 and trailing movement rod 200-2. In these figures, rod movement sub-system 203 has been isolated from further components of system 100 including (apart from in FIG. 9C) components of pedestal apparatus 140, for ease of illustration. Moving rod sub-system 203 may comprise a leading rod movement system 212 and a trailing rod movement system 213, which may have similar components. Leading rod movement system 212 may facilitate the movement of leading movement rod 200-1 and trailing rod movement system 213 may facilitate the movement of trailing movement rod 200-2. Leading movement system 212 and trailing movement system 213 may be mounted to components of system frame 115 using mounting blocks 211.

Leading rod movement system 212 may comprise a motor 204-1, a pair of transversely spaced drive chains 202-1, a plurality of idler wheels/cogwheels 214, and leading movement rod 200-1. Similarly, trailing movement system 213 may comprise a motor 204-2, a pair of laterally spaced drive chains 202-2, a plurality of idler wheels/cogwheels 214, and trailing movement rod 200-2. Motors 204-1, 204-2 may be servomotors or similar systems configured to receive an input from a PLC 132 to determine a direction to rotatably drive a drive wheel (i.e. clockwise or counter-clockwise). Idler wheels 214 may include bearings and be attached to contact points such that they may rotate freely in both rotational directions. Motors 204-1, 204-2 may be configured to operate in both directions and varying speeds under control of PLC 132.

Leading movement rod 200-1 may be configured to move on its cyclical path suspended between the pair of laterally spaced, longitudinally and vertically running, continuous conveyor chains 202-1. Conveyor chains 202-1 may each extend and move in a path around a plurality of spaced toothed idler wheels 214. The paths of each of conveyor chains 202-1 may have a top run path portion 205-1 and side and bottom run path portions. Top run path portions 205-1 may be oriented generally horizontally and longitudinally and generally in the same horizontal plane to each other. Conveyor chains 202-1 may be driven by motor 204-1 that has a drive wheel which is operable to engage directly or indirectly at least one of the conveyor chains 202-1 and drive the transversely spaced pair of conveyor chains 202-1 on their path in both a forward and rearward direction under control of PLC 132. Movement rod 200-1 may be mounted with mounting blocks 209-1 to, and extend laterally and horizontally between, conveyor chains 202-1. Movement rod 200-1 may be positioned during operation to move backwards and forwards with the movement of chains 202-1 generally along the path of the top run portion 209-1 of the conveyor chains 202-1.

Trailing movement rod 200-2 may be configured and driven in a similar manner to leading movement rod 200-1. Trailing movement rod 200-2 may be configured to move on its path suspended between a first pair of laterally spaced, longitudinally and vertically running, continuous conveyor chains 202-2. Conveyor chains 202-2 may be spaced laterally outside of conveyor chains 202-1 as depicted in FIGS. 9A and 9C. Conveyor chains 202-2 may each extend and move in a path around the plurality of spaced toothed idler wheels 214. The paths of each of conveyor chains 202-2 may have a top run path portion 205-2 and side and bottom run path portions. The top run path portions 205-2 may be oriented generally horizontally and longitudinally and generally in the same horizontal plane to each other. Conveyor chains 202-2 may be driven by a motor 204-2 that has a drive wheel which is operable to engage directly or indirectly at least one of the conveyor chains 202-2 and drive the pair of conveyor chains 202-2 on their path in both a forward and rearward direction under control of PLC 132. Movement rod 200-2 may be mounted with mounting blocks 209-2 to, and extend laterally and horizontally between, conveyor chains 202-2. Movement rod 200-2 may be positioned during operation to move backwards and forwards with the movement of chains 202-2 generally along the path of the top run portion 209-2 of the chain conveyor 202-2.

Components of leading rod movement system 212 and trailing rod movement system 213 including pairs of conveyor chains 202-1, 202-2, idler wheels 214, motors 204-1, 204-2 may be interconnected to, and supported on a pair of longitudinally and vertically extending plates 216. Plates 216 may be mounted to frame 115 using blocks 211.

Movement rods 200-1, 200-2 may be each cylindrical in shape (e.g. circular in cross-sectional shape). In other embodiments, Movement rods 200-1, 200-2 may have cross sectional shapes that are non-circular. In some other embodiments (for example when dealing with relatively light weighted items 102), in order to engage the leading and trailing sides of a group 122 of items (and an erected case 111C containing such group of items) the movement rods 200-1, 200-2 may not extend continuously across the entire transverse span, and may have for example have opposed cantilevered rod portions extending inwards towards each other from a support (such as a conveyor chain) at only one end thereof.

As is illustrated in particular in FIGS. 9, 9C and 10, top run path portions 205-1 and 205-2 of conveyor chains 202-1, 202-2 respectively may be positioned laterally outward of components of pedestal apparatus 140. Similar to the bumper members 126, opposed guide members 206 collation platform 120 may extend longitudinally on transversely opposite sides of input transfer platform 162; first folding platform 163; central loading platform 164; and second folding platform 165. Guide members 206 may also be constructed with metal support frames and having inner support surfaces of a similar low friction, high rigidity material such as UHMW polyethylene. In the longitudinal area of guide members 206 adjacent to central loading platform 164, the inward facing surface of opposite guide members 206 are spaced further apart than elsewhere along the opposed guide members 206 (e.g. the inward facing surfaces of opposed guide members 206 may be notched for a short longitudinal distance). This additional transverse spacing adjacent to central loading platform 164 assists in providing sufficient room for the erected case 111C carried by robotic arm 250 to be able to sheath the group 122 of items 102 with an erected case 111C while the group rests on the central loading platform. In general, the inward facing, spaced surfaces of opposed guide members 206 help ensure the maintenance of the upright positioning and ordered arrangement of the group 122 of collated items 102 during movement over components of pedestal apparatus 140 by movement rods 200-1, 200-2. Longitudinally extending, horizontally oriented guide members 206 may be supported by longitudinally spaced, transversely oriented support arms 215 connected to a central movement apparatus 207 that is operable to provide for reciprocating inward and outward movement of guide members 206, relative to a group 122 of items 102 and an erected case 111C when positioned near the group, and when being moved to sheath a group with an erected case. Guide members 206 may each be linked to a motor or linear actuator configured to receive an operational input from PLC 132 to move from a first position (directly abutting collated group 122) to a second position (providing clearance for the erected case 111C).

As illustrated in FIG. 9, a collated group 122 of items 102 is positioned on input transfer platform 162. Trailing movement rod 200-2 is in an operational engagement position, located longitudinally behind a group 122 of collated items 102 and within or below the opening of gate 208, with gate 208 in an open position. Leading movement rod 200-1 is in its corresponding start position directly in front of the forward face of a group 122 of collated items 102. Trailing movement rod 200-2 is in a position or close to a position where it can engage the rearward side of the group 122 and then push the group 122, resulting in the sliding of the group of items in a forward longitudinal direction from input transfer platform 162, over first folding platform 162 and onto the central loading platform 164. Upper support surface of central loading platform 164 may have its longitudinal distance and position selected relative to the support surface of the first folding platform 163 by PLC 132 operating valve system 332 to operate actuator 194, to adjust the size of the longitudinal space/gap 196 between the central loading platform 164 and first folding platform 163 to be sufficiently small to ensure that the items 102 in each group 122 passing from first folding platform 163 to central loading platform 164, do not have any problems in passing over the gap 196 (i.e. gap 196 is not so large such that when passing over the gap, that one or more items 102 may become dis-oriented so as to disrupt the ordered configuration of the collated group 122). This is particularly important when trying to load items 102 that have a relatively small dimension in the longitudinal direction.

Leading movement rod 200-1 and trailing movement rod 200-2 will be configured and positioned sufficiently vertically high enough above the support surfaces of the input transfer platform 162, first folding platform 162 and central loading platform 164 that the movement rods will engage the group 122 of items 102 in a manner which does not cause them to fall over, or break up the collated group when moved. Leading movement rod 200-1 and trailing movement rod 200-2 (operating in conjunction with side guide members 206) will be configured and positioned so as to confine the group 122 in the ordered array, and be able to slide the group 122 over the support surfaces while maintaining the integrity of the relative positioning of the items 102 within the group 122. The vertical positioning of the movement rods 200-1, 200-2 (and of guide members 206) may be chosen depending in part on the vertical height and centres of gravity of the items 102. Leading movement rod 200-1 may thus be positioned and operable to move in synchronized movement with trailing movement rod 200-2, to hold collated items 102 together during such sliding movement of the group 122 onto central loading platform 164, to prevent toppling and maintain the grouping formation. Leading movement rod 200-1 may be operated so as to apply a small amount of force in the opposite, rearward direction on collated items 102 to prevent toppling and hold the group 122 in the desired ordered array of items 102.

Similarly, movement rods 200-1, 200-2 may also be configured to move in the opposite rearward direction and to move a group 122 of items therewith also in an opposite, rearward movement. During this operation, leading movement rod 200-1 may provide the necessary force to move the collated items 102 backwards, and trailing movement rod 200-2 may provide similar support to prevent toppling and maintain grouped formation. This rearward movement of a group 122 may be utilized to facilitate the sealing of a lower flap of an erected case 111C, as described herein.

Trailing and leading movement rods 200 may each be driven independently under control of PLC 132. Therefore, PLC 132 will manage conveyor chain movements to ensure each movement rod 200-1, 200-2 is appropriately moved such that the two movement rods will not interfere with each other's movement.

FIG. 9C is a top view of movement assembly 210. As can be seen, the individual spaced chains of each pair of drive chains 202-1 and 202-2 may be spaced apart on opposite sides of components of pedestal apparatus 140 a sufficient distance sufficient to allow components of pedestal apparatus 140 to fit therebetween. For illustrative purposes, the components of pedestal apparatus are not shown in this figure. According to some embodiments, the entire pedestal apparatus 140 may be fastened to and suspended within the planar support plates 216. Thereby, the path of movement rods 200-1, 200-2 carried by their respective conveyor chains, may sweep under pedestal apparatus 140. Thus, movement rods 200-1, 200-2 generally move in one forward, cyclical direction in the path defined by the conveyor chains, apart from some limited, opposite rearward movements, as described herein.

PLC 132 can provide operational signals to the motors 204-1, 204-2 of movement rods 200-1, 200-2 to transport successively, spaced groups 122 of collated items 102 from the input transfer platform 162 across the input transfer platform 162 and the first folding platform 163 to a casing position on the central loading platform 164. There, leading and trailing movement rods 200-1 and 200-2 can be moved in operational directions a short longitudinal distance apart from the respective rearward and forward sides of the collated group 122 of items. This can provide sufficient clearance (e.g. approximately 0.5" (1.27 cm) in each direction) for case sheathing/bottom loading of items as will be described further hereinafter. This movement apart of leading and trailing movement rods 200-1 and 200-2 from the respective rearward and forward sides of the collated group 122 of items (along with the moving apart of guide members 206) from the side surfaces of the collated group 122 may take place after the initial engagement of an erected case 111C with the group as described hereinafter.

Figure 11:
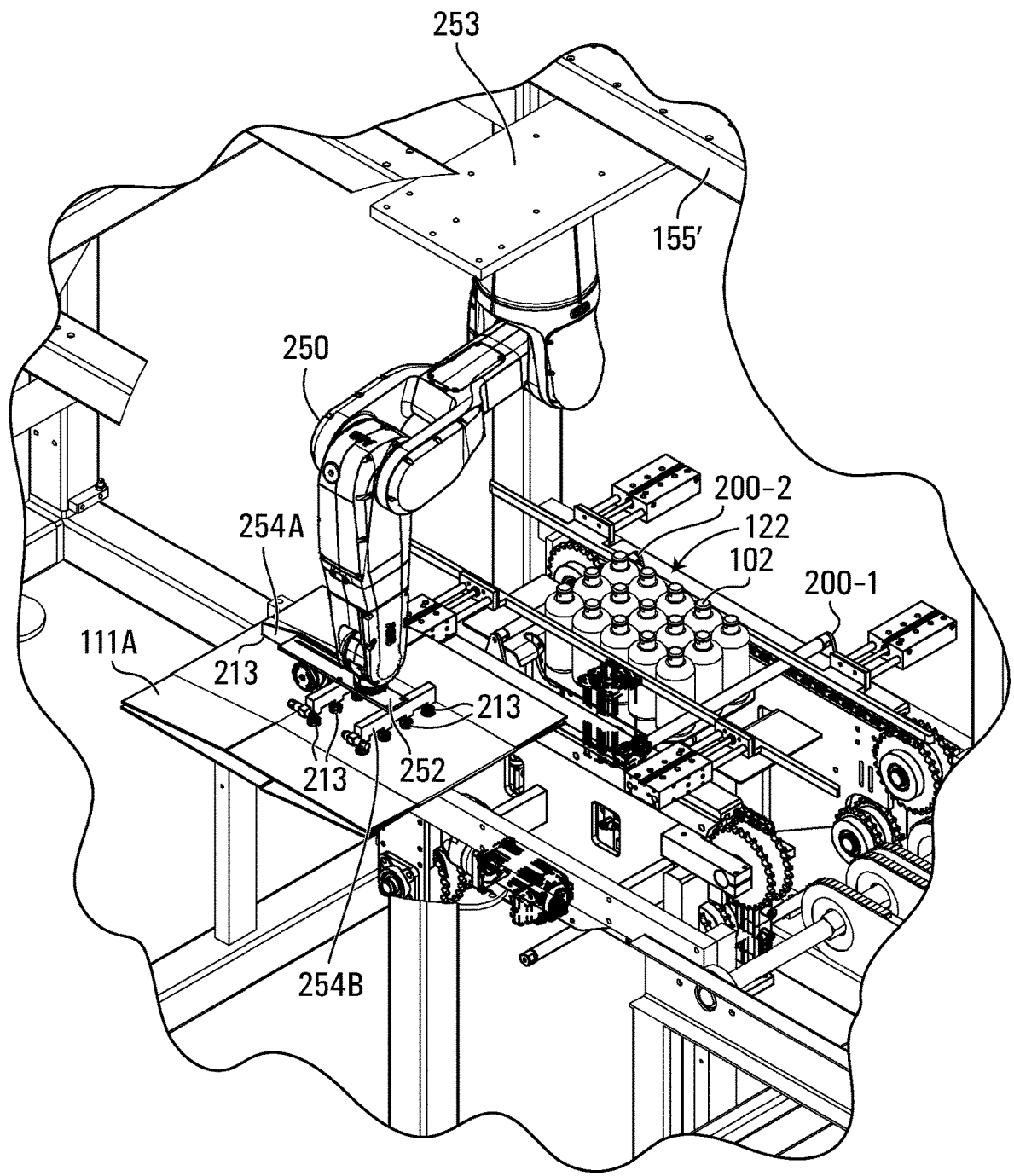
FIG. 11 is an enlarged perspective view of a robotic arm and some components of the pedestal apparatus, moving rod sub-system, forming part of the system of FIG. 1, showing a case in a substantially flattened configuration.

As a group 122 of collated items 102 is being delivered by movement rods 200-1, 200-2 from the collation platform 120 to central loading platform 164, a knocked-down, flattened case blank 111A may have already been converted to an erected case 111C by robotic arm 250 which can retrieve a flattened blank 111A delivered to a pick-up position from or within blank magazine 251. Optionally, a pre-break mechanism of a known type of pre-break mechanism, may be provided as part of the case magazine, to pre-break the flat case blank. As shown in FIG. 11, a knock-down flattened case blank 111 (such as one described with relation to FIG. 3), may be retrieved by an end effector 252 of robotic arm 250. The knock-down flattened case blank 111 may be Robotic arm 250 may have a first arm segment 250' mounted to a robot mounting plate 253, in a position generally vertically above central loading platform 164. Mounting plate 253 may in turn be fixedly connected to one or more support frame members 115'.

Figure 11A:
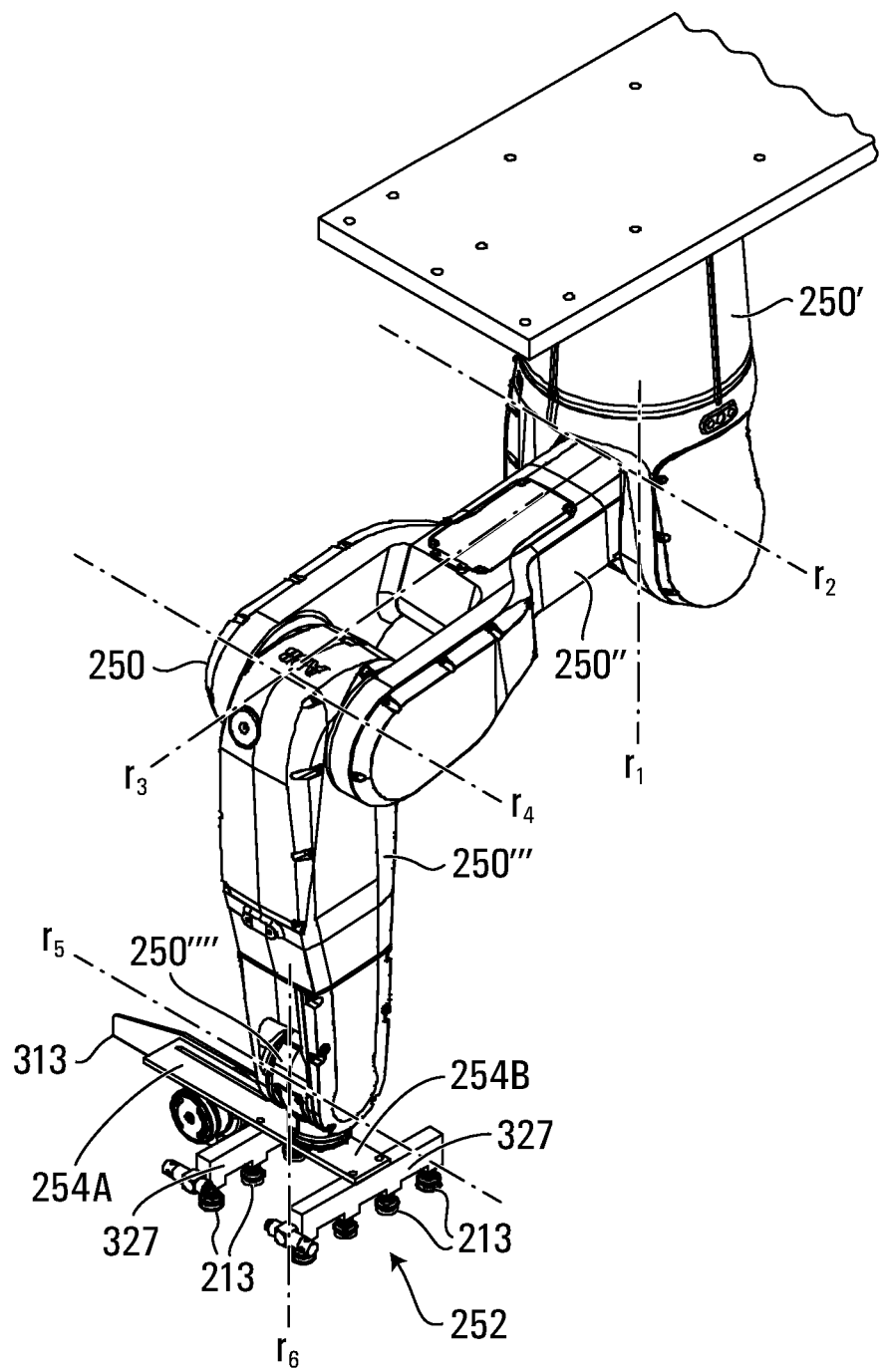
FIG. 11A is an enlarged perspective view of the robotic arm of system of FIG. 1 substantially in isolation.

According to some embodiments, magazine 251 containing a stack of knock-down case blanks 111 may be situated within an operating radius/reach of robotic arm 250. With particular reference to FIGS. 11 and 11A, an example robotic arm that may be suitable is the FANUC M-20iA/12A Series Robot made by Fanuc Corporation and/or an affiliated company, having a payload of 12 Kg, an arm reach of 2009 mm. Robotic arm 250 be equipped with end effector 252 mounted to the end of a plurality of interconnected arm segments 250' of robotic arm 250 and which enable end effector 252 to be rotated about six different axes of rotation R1 to R6 as illustrated in FIG. 11A. Robot axes of rotation are dependent upon each other as a result of the specific configuration of the robotic arm 250. Having a plurality of plurality of arm segments 250', 250", 250''' and 250'''' that provide for rotation of an end effector 252 about several axes of rotation provides enhanced flexibility in the path that the end effector 252 can take with a flattened case blank 111A and in particular with an erected case blank 111C.

In the illustrated embodiment, arm segment 250' may be rotatable about a longitudinal axis R1 that extends along a centre longitudinal axis of arm segment 250'. Arm segments 250' and 250" may be pivoted relative to each other about a pivot mechanism having an axis of rotation R2. Arm segment 250" may be rotatable about a longitudinal axis R3 that extends along a centre longitudinal axis of arm segment 250". Arm segments 250" and 250''' may be pivoted relative to each other about a pivot mechanism having an axis of rotation R4. Arm segments 250''' and 250'''' may be pivoted relative to each other about a pivot mechanism having an axis of rotation R5. Arm segment 250'' may also be rotatable about a longitudinal axis R6 that extends along a centre longitudinal axis of arm segment 250''.

According to some embodiments, the robotic arm 250 may be operable in five or less axes of rotation and still achieve a path for a specific configuration of erected case blank 111C to bottom load a group of items of specific configuration. However, as described herein, a 5 or 6 axes robot is preferably used for the bottom loading sequence to provide a particularly desirable path of end effector 252, and an erected case 111C held by the end effector. Modifications to the movement path and position of the robotic arm 250 may be made to accommodate a specific determined number of axes of rotation.

End effector 252 may have a first arm 254A and a second arm 254B. First arm 254A may be rotatable relative to second arm 254B. While second arm 254B may be attached in a fixed position relative to robot arm segment 250''' to which it is attached, first arm portion 254A may be operable to rotate about an axis R7 (see FIG. 12). An actuating mechanism 261 which may be a Rotary Compressed Air Cylinder or a Servo Actuated Device may be provided to facilitate rotation of first arm 254A relative to second arm 254B under control of PLC 132.

Each of first arm 254A and 254B may be provided with suction cups 313, 312 respectively. Vacuum forces may be generated at the suction cups in a variety of ways including providing hoses delivering pressurized air to vacuum generators mounted on the end effector, with the vacuum generators interconnected to the suction cups 313, 312. Electronic valves (not shown) that are part of a valve system 332 (FIG. 2) under the control of PLC 132 may be provided to control the flow of pressurized air to the vacuum generators and thus to control the vacuum at suction cups 313, 312 including being able to turn on and off the vacuum generated at the suction cups. Arm 254B of end effector 252 may have a plurality of hollow suction rods 327 with a generally square rectangular shape and peripheral flanged openings, each receiving a suction cup 312. It should be noted that while many types of suction cups 312, 313 may be employed on the end effector 252, a preferred type of suction cup is the model 1340.10.04AB made by Piab. Each suction cup 312, 313 may connected to an outlet from a vacuum generator. The vacuum generator may be any suitable vacuum generator device such as for example the model VCH12-016C made by Pisco. Vacuum generators each have an inlet interconnected to a hose (not shown) that can carry pressurized air from an air compressor or other vacuum source to the vacuum generator. The vacuum generator converts the pressurized air supplied to the inlet port into a vacuum at one of the outlet ports. That vacuum outlet port is interconnected to a suction cup 312, 313 so that the suction cup can have a vacuum force. A solenoid valve device that is part of valve system 332 may be interposed along the pressurized air channel running between each vacuum generator and the source of pressurized air. The solenoid valve device may for example be a model CPE14-M1BH-5L-1/8 made by Festo. Valve system 332 is in electronic communication with PLC 132 and controlled by PLC 132. In this way PLC 132 can turn on and off the supply of vacuum force to the suction cups 312, 313.

Robotic arm 250, with end effector 252, under control of PLC 132, may be operable for successively picking up knock-down case blanks 111A located at the case blank pick up position in magazine 251, opening the blanks 111A to form an erected case 111C and moving the erected case 111C towards the central loading platform 164. When a group 122 of collated items 102 is located at the central loading platform 164, robotic arm 250 may manipulate the path of the end effector 252, and the erected case 111C held by the end effector, to sheath the group 122 of items resting on central loading platform 164 of pedestal apparatus 140.

According to some embodiments, magazine 251 holding the knock down blanks may be configured to lift the stack of blanks to an operating height, such that the topmost blank is always in a specific position. According to other embodiments, the end effector 252 may be equipped with an electronic eye sensor such as the model 42KL-D1LB-F4 made by ALLEN BRADLEY. The electronic eye sensor may be configured to detect the position of the top-most blank 111A, and generate signals for the PLC 132 to follow a specific path for movement of the robotic arm 250.

Figure 12:
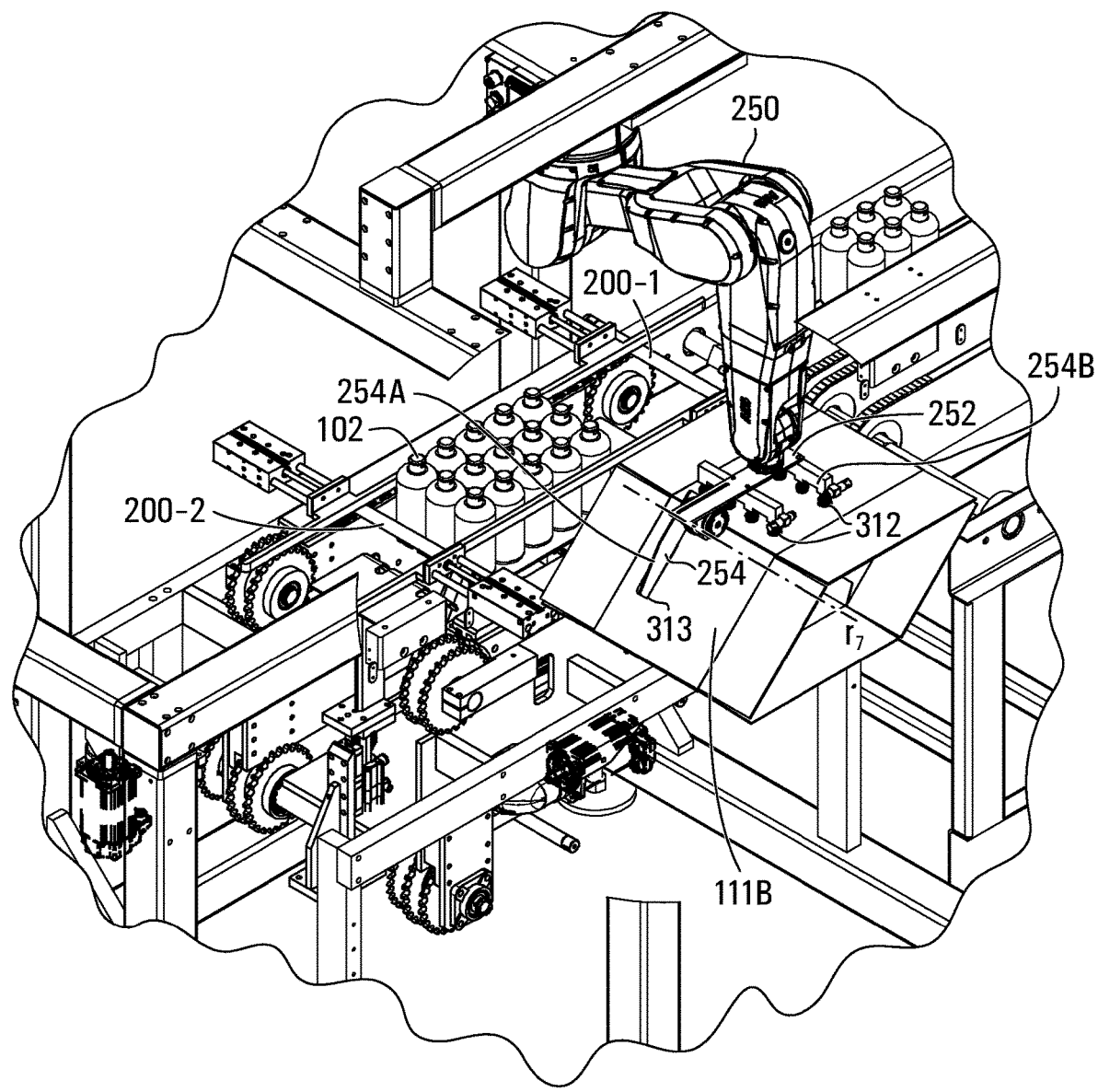
FIG. 12 is an enlarged perspective view of a robotic arm and some components of the pedestal apparatus, moving rod sub-system, forming part of the system of FIG. 1, showing a case in a partially erected configuration.

The end effector 252 may engage with a blank 111A. The end effector is then raised vertically in the Z-direction, lifting blank 111A. In consequence of this operations (as shown in FIG. 12), the blank begins to open-up (blank 111B) as arm 254A is rotated relative to arm 254B.

As end effector 252 continues to move vertically upwardly, arm 254A of end effector 252 may be activated by the actuator, to ensure the knock-down blank 111A is opened to have a substantially right-angle cross section. According to some embodiments, arm 254A may also be equipped with a suction cup head system 313 as previously described. With the case blank opened to a partially opened form 111B (FIG. 12) to a fully erected form of case 111C, panel A of the sleeve (seen in FIG. 13) abuts arm 254A of the end effector 252.

Figure 13:
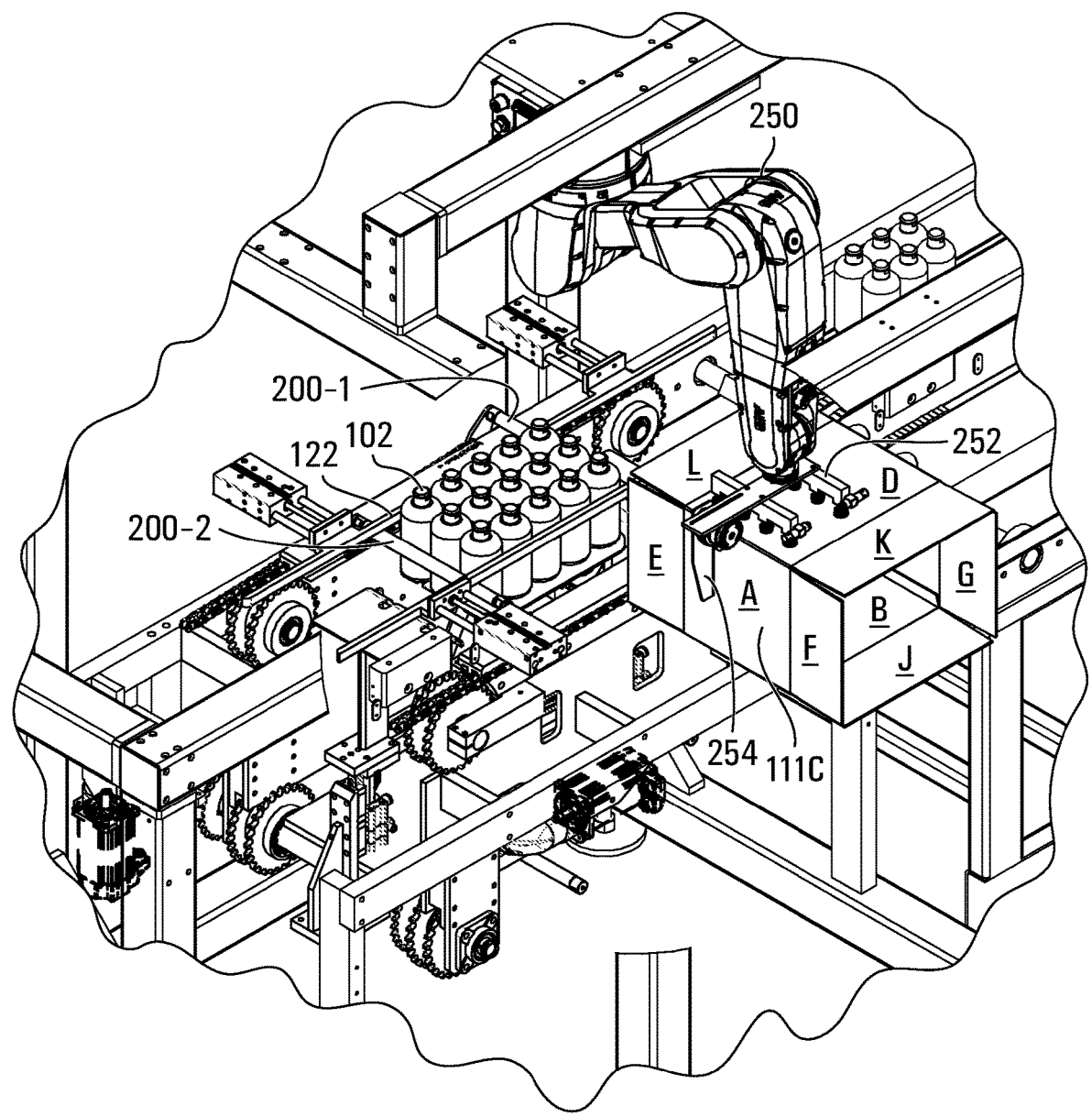
FIG. 13 is an enlarged perspective view of a robotic arm and some components of the pedestal apparatus, moving rod sub-system, forming part of the system of FIG. 1, showing a case in a fully erected configuration.
Figure 14:
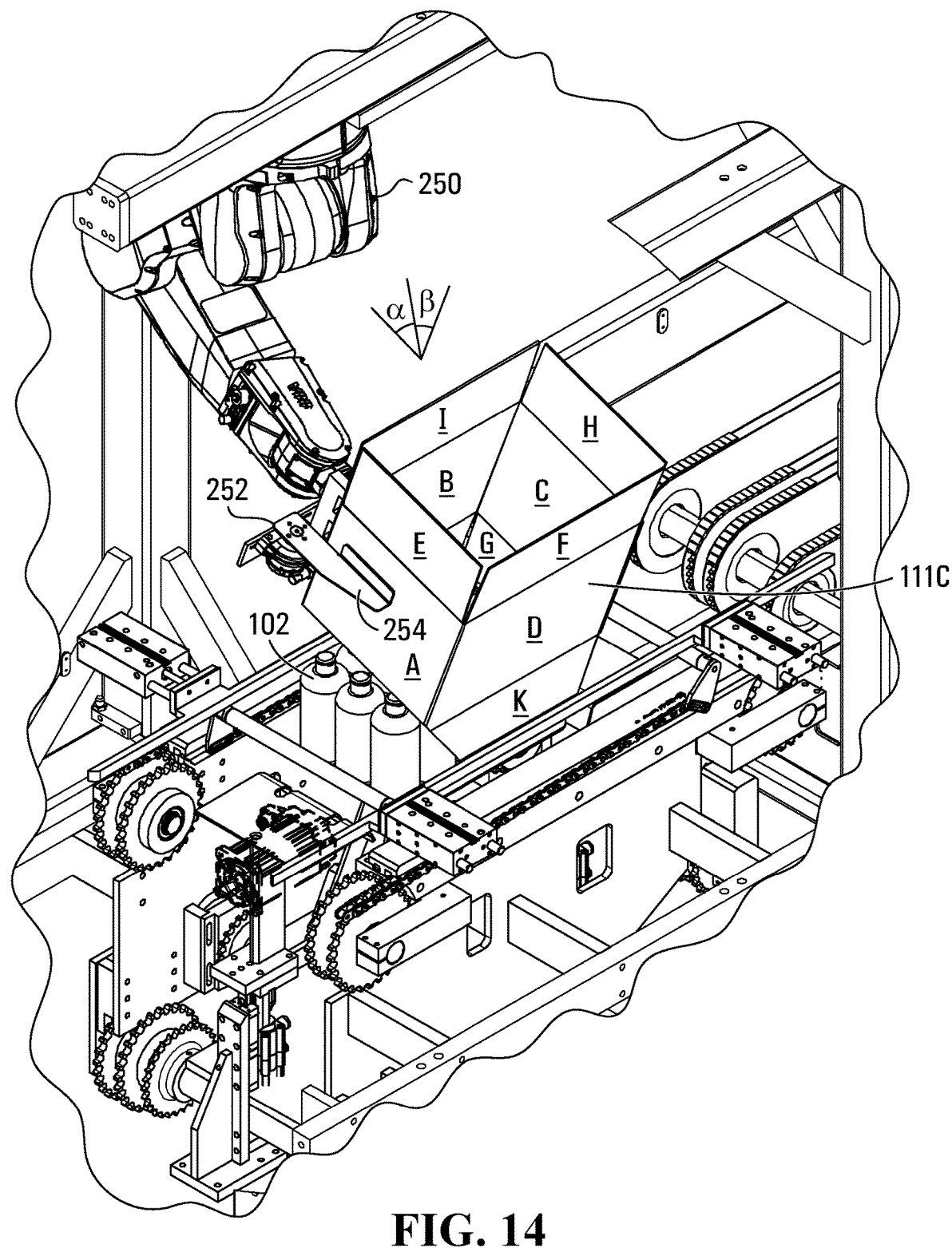
FIG. 14 is the robotic arm of FIG. 11 and some components of the system of FIG. 1 in a loading commencement operational position.
Figure 16:
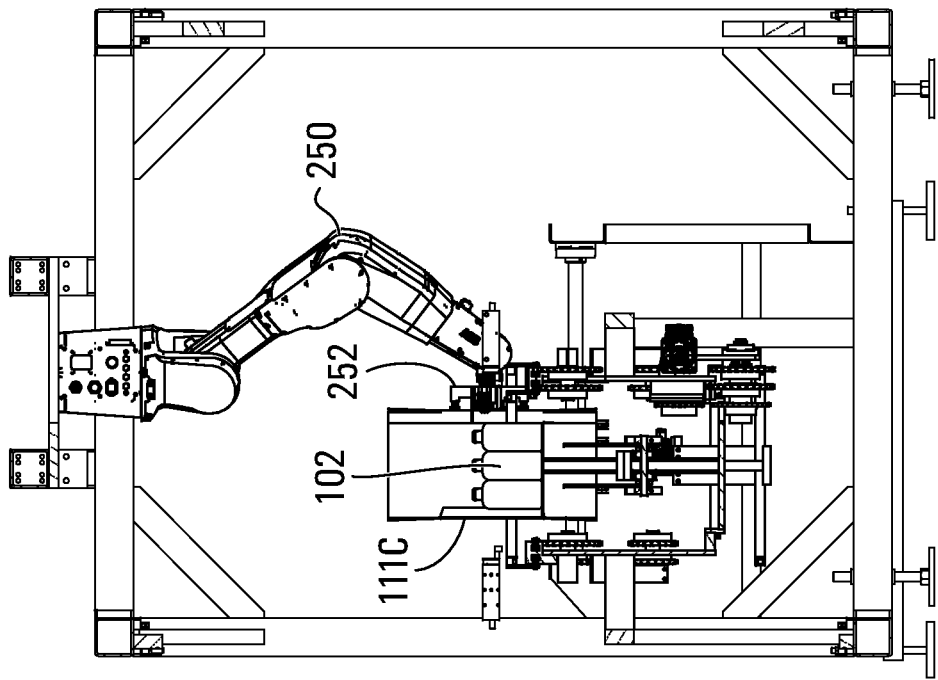
FIG. 16 is the robotic arm of FIG. 11 in a fully loaded operational position.
Figure 15:
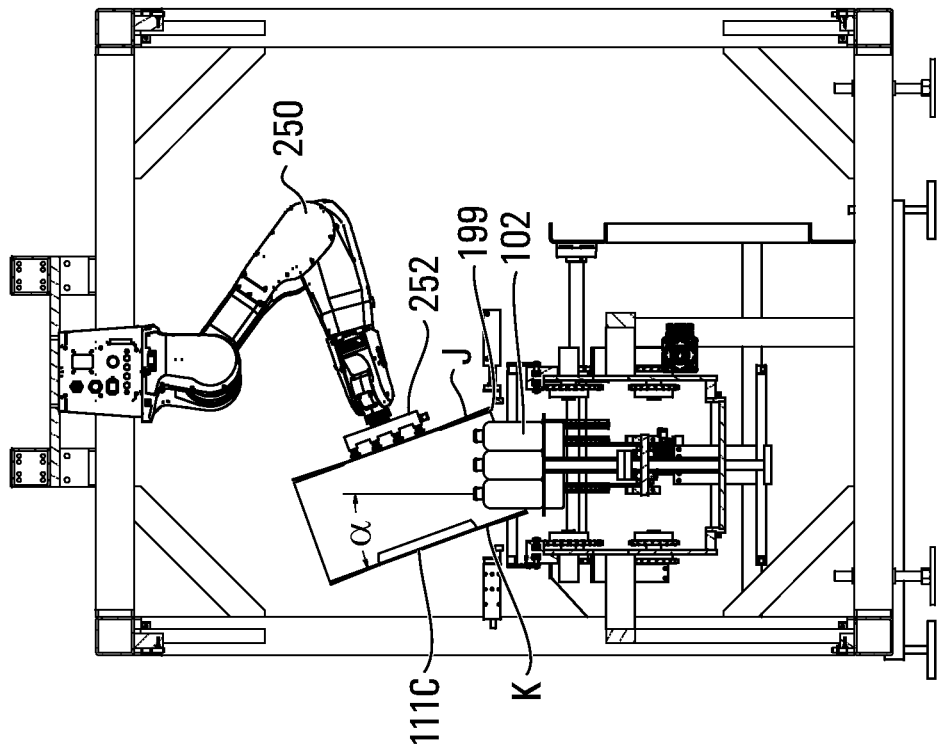
FIG. 15 is an end view of the robotic arm of FIG. 14.
Figure 24A:
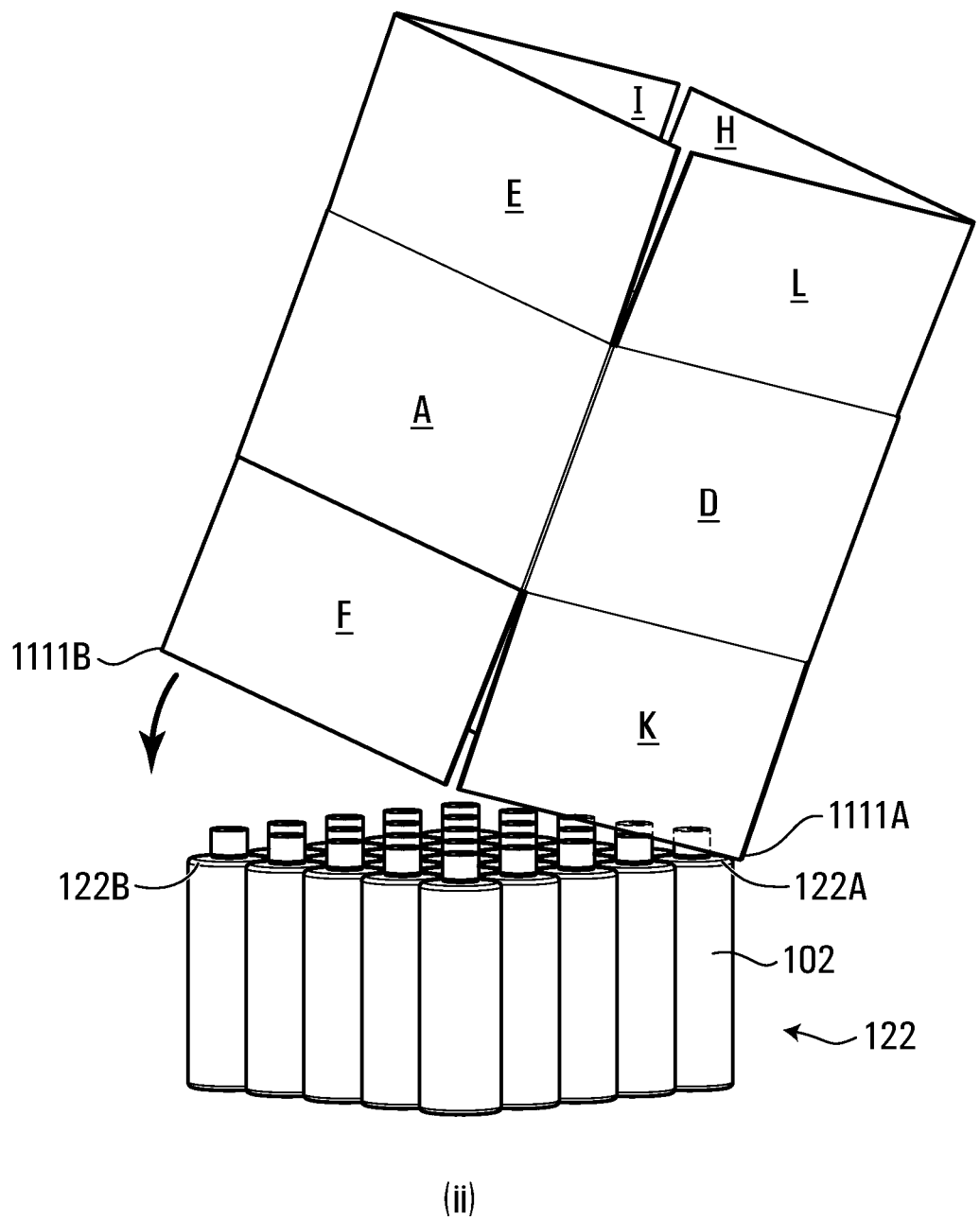
FIGS. 24A, 24B and 24C are side perspective views showing a case loading sequence.
Figure 24B:
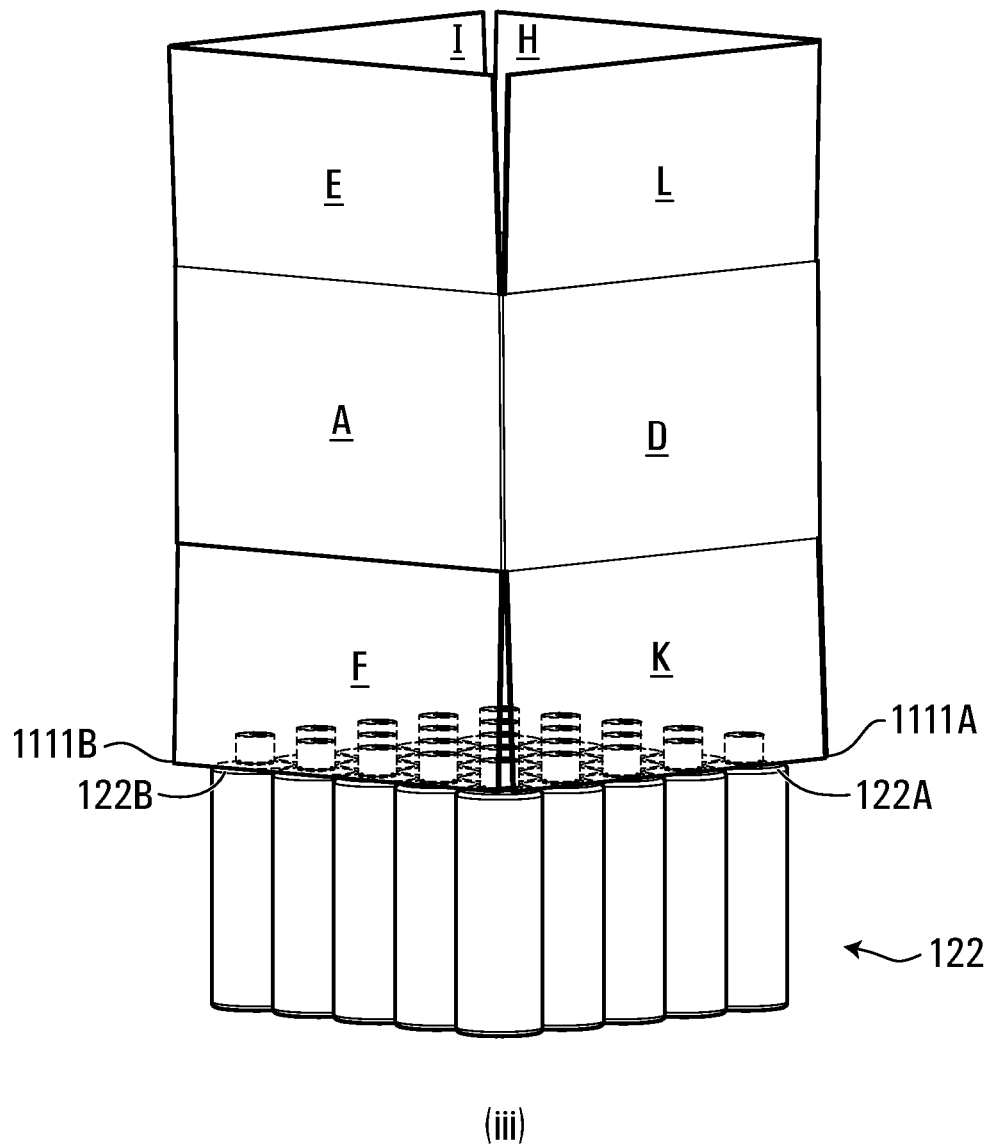
Figure 24C:
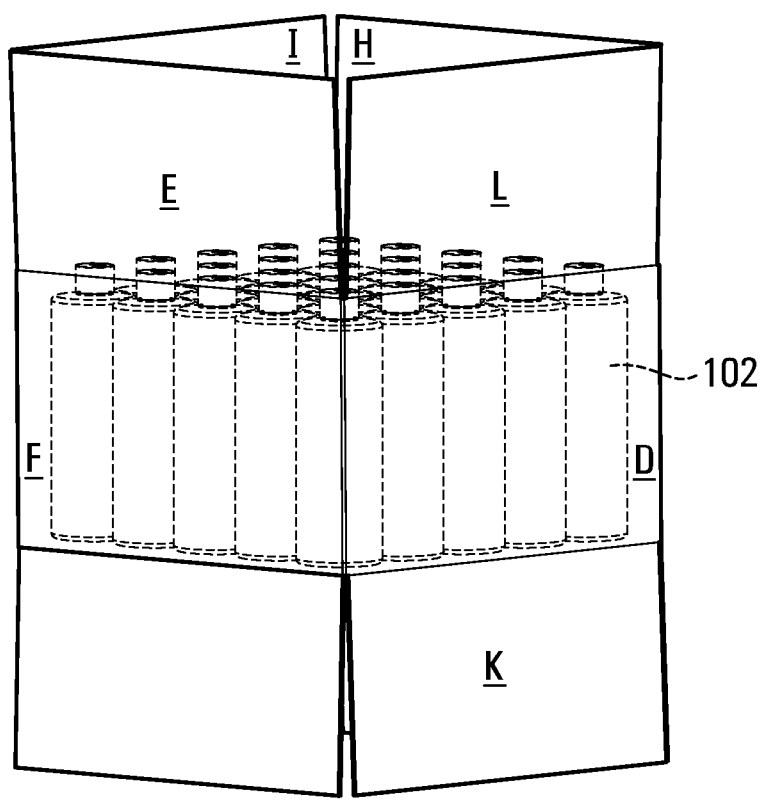

A fully opened, erected case 111C (having a configuration as shown in FIG. 3C) may be moved by end effector 252, from the position shown in FIG. 13 to (i) a preloading position above central folding platform 164, then to (ii) a loading commencement position shown in FIGS. 14, 15, and 24A, then to (iiii) a fully engaged position as shown in FIG. 24B, and then to (iv) a fully loaded position as shown in FIGS. 16 and 24C, with the group 122 of items fully located within the bounds of storage space 107 of erected case 111C. In this fully loaded position (iv), the erected case 111C has been placed over the group 122 of collated items 102 while the group 122 is positioned on central loading platform 164 and the movement rods 200-1, 200-2 and guide members 206 are in retracted positions.

Prior to end effector 252 moving an erected case 111C to the loading commencement position (ii), to commence a loading sequence of movement of erected case 111C with the group of items 122, upper support surface of central loading platform 164 may have its longitudinal distance and position adjusted relative to the support surface of the first folding platform 163 and second folding platform 165 by PLC 132 to thereby adjust the size of the longitudinal space/gaps 196, 197 between the central loading platform 164 and first and second folding platforms 163, 165 to be sufficiently large to ensure that bottom leading and trailing flaps F, G of erected case 111C can be brought vertically down through the gaps 196, 197, when the erected case 111C sheaths the group 122 of items 102 as they are supported on the support surface of central loading platform 164. PLC 132 can take into account any such adjustment when positioning end effector 252 of robotic arm 150 in the loading commencement position (ii) shown in FIGS. 14, 15, and 24A.

According to embodiments where the robotic arm 250 has a plurality of arm segments and a corresponding plurality of axes of rotation, the case 111C can be placed in the pre-loading position and orientation (i) generally above central loading platform 164 and at a vertical distance sufficiently above the uppermost surface of the items in the group 122 to be loaded. However, in the initial pre-loading position (i), no portion of the bottom edges of any of the bottom flaps J, K, F, G may be vertically below the top surface of the items. This initial pre-loading position (i) allows the group 122 of items to be moved onto the central loading platform 164 with sufficient clearance to avoid contact with any items and/or cause any bottom flaps to become misaligned with their respective side panels.

Once a group 122 of items 102 is correctly longitudinally positioned on central loading platform 164, the case 111C may be moved by end effector 152 under control of PLC 132 from the preloading position (i) above central folding platform 164, to the loading commencement position (ii) shown in FIGS. 14, 15, and 24A. At this loading commencement position, the case 111C may have a tilt angle (see FIG. 15) in its angle of approach to a group 122 of items 102. Prior to sheathing a group 122 with an erected case 111C, the case at the loading commencement position (ii) may be held by end effector 252 with both a transverse tilt angle about a longitudinal Y direction axis relative to the vertical axis Z (i.e. the angle $\alpha$ towards the X axis) and a longitudinal tilt angle about a transverse X direction axis relative to the vertical axis Z (i.e. the angle $\beta$ towards the Y axis). Tilt angles $\alpha$ and $\beta$ may each range from 5 degrees to 20 degrees, dependent on the constructed case 111C, dimensions of the collated items 122 and the approach path determined by PLC 132. The angles $\alpha$ and $\beta$ may be determined for the constructed case 111C to approach collated items 122 having a combined tilt angle comprising angles both $\alpha$ and $\beta$.

End effector 252 may move case 111C to a loading commencement position proximate to the group 122 with tilt angles $\alpha$ and $\beta$ and may have a bottom corner 1111A of case 111C (FIG. 24A) positioned very close to, and possibly making slight contact with, a corresponding top corner area 122A of the group 122 of items 102. The inward facing surfaces of bottom flaps K and G at the corner region of bottom corner 1111A may be directly facing and possibly contact edge surface at the corner 122A of the group 122.

It should also be noted that bottom flaps J, K F, G may be joined to their respective panels A-D, in a manner such that when panels A-D are titled at a tilt angle, flaps J, K F, G remain in a respective planar relationship to the respective side panel and remain at the same tilt angle(s) as the panels A-D (i.e. the joint has a certain degree of resistance to rotation/stiffness and can resist the forces/torque about the joint result from inertia based on the movement of the robotic arm 250 acting on the tilted flaps).

Tilting erected case 111C may allow for a side flap K of the bottom flaps of opened case 111C to be vertically lower than the opposite side flap J, as shown in the position of FIGS. 14 and 15. Thus, the bottom edge of flap K may be in a position that it will not catch upon the top neck surface or other top surface regions of the outside row of items 102 This tilting angle may allow for the transverse positioning of the bottom edge of opposite flap J to have an appropriate transverse clearance distance 199 (FIG. 15) from the top neck regions of the inside row of items 102 and thus can also avoid the bottom edge of flap J from catching on the neck region/closure of an item.

End effector 252 may then commence to rotate/pivot the case 111C substantially about the bottom corner 122A, such that the diagonally opposite bottom corner 1111B of the case will be moved in a generally arced path towards the corresponding diagonally opposite top corner 1111B of the group 122. During this pivoting movement, the case 111C will eventually reach the position shown in FIG. 24B where the diagonally opposite bottom corner 1111B of the case is positioned directly adjacent/proximate to the corresponding diagonal top corner 1111B of the group 122 and all four bottom corners of the erected case lie in a horizontal, longitudinally and transversely extending plane. The bottom plane defined by the bottom edges of the bottom flaps F, J, G, K, will have become parallel to, if not co-planar with, a horizontal plane defined by a top surface plane of the group 122 of items. This arced movement of the case corner 1111B, pivoting around corner 1111A, and in the pivoting diagonal planar movement of the bottom plane defined by the bottom edges of the bottom flaps, towards a horizontal plane defined by the top surface plane of the group of items, allows for easier sheathing of the collated items. To accomplish this pivoting movement of the case, robotic arm 250 may cause effector 252 to be rotated about a plurality of the multiple axes R1 to R6 (FIG. 11A), including axes R5 and R6 in order to reduce angles $\alpha$ and angle $\beta$ to approximately zero.

It should be noted that a six rotational axis robotic arm 250 is particularly useful for system 100 as it provides a high degree of flexibility in the path that that the end effector can take during operation, including in the path used in moving the erected case 111C through the loading sequence positions (i) to (iv). Having a six rotational axis robot is also useful in providing flexibility in movement when handling cases of different dimensions, when system 100 needs to be re-configured for handling cases of different dimensions.

During the movement of case 111C from the loading commencement position shown in FIGS. 14, 15, and 24A, to the fully engaged position as shown in FIG. 24B, leading and trailing movement rods 200-1 and 200-2 may co-operate with side guide members 206 to provide a group holding apparatus that can securely hold the group 122 of items 102 together by maintaining contact/engagement with the sides of the group. Thus, while this initial loading sequence takes place, the group of items may continue to be held in a tight configuration by the movement arms 200-1, 200-2 at the front and rear faces of group, and by the guide members 206 on the side faces of the group.

The movement apart of leading and trailing movement rods 200-1 and 200-2 from the respective rearward and forward sides of the collated group 122 of items (along with the moving apart of guide members 206) from the sides of the collated group 122 may take place after erected case 111C has reached the fully engaged position (iii) as shown in FIG. 24B but before the erected case is moved to the fully loaded position (iv).

For the next sequence of movement to the fully loaded position, additional space for end effector 252 to move the erected case 111C vertically downwards over the group 122 of items may be provided by PLC 132 operating central movement apparatus 207 to move longitudinally extending, horizontally oriented guide members 206 outwards a short distance (for example in the range of 2 to 9 inches relative to a group 122 of items 102 when positioned on the central loading platform 164).

Next, the robotic arm may move the end effector 252 and the case 111C held by the end effector from the fully engaged position (iii) in a vertical path portion vertically downwards (parallel to axis Z) in order to fully sheath the group 122 of items 102 with the erected case 111C. In this fully loaded position (iv) shown in FIG. 24C, the group 122 of items is located entirely within the interior storage space 107 of the erected case 111C and the side flaps J and K (along with leading and trailing flaps F and G) are all positioned below the item support surface of central loading platform 164.

Figure 17:
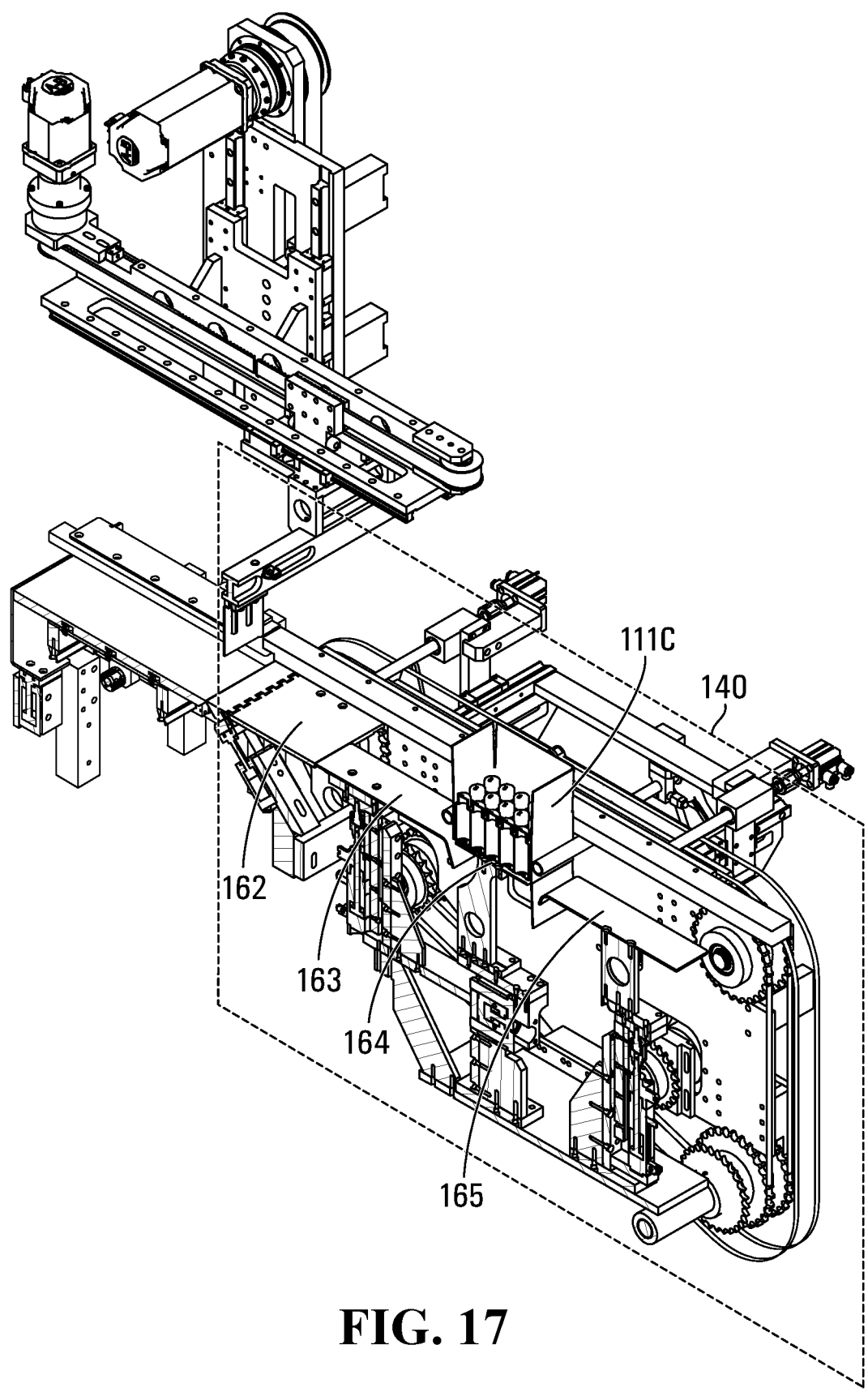
FIG. 17 is a side perspective view of the item collation area, moving rod sub-system and pedestal apparatus components of the system of FIG. 1, with some components removed for clarity, and in a first operational configuration.
Figure 19:
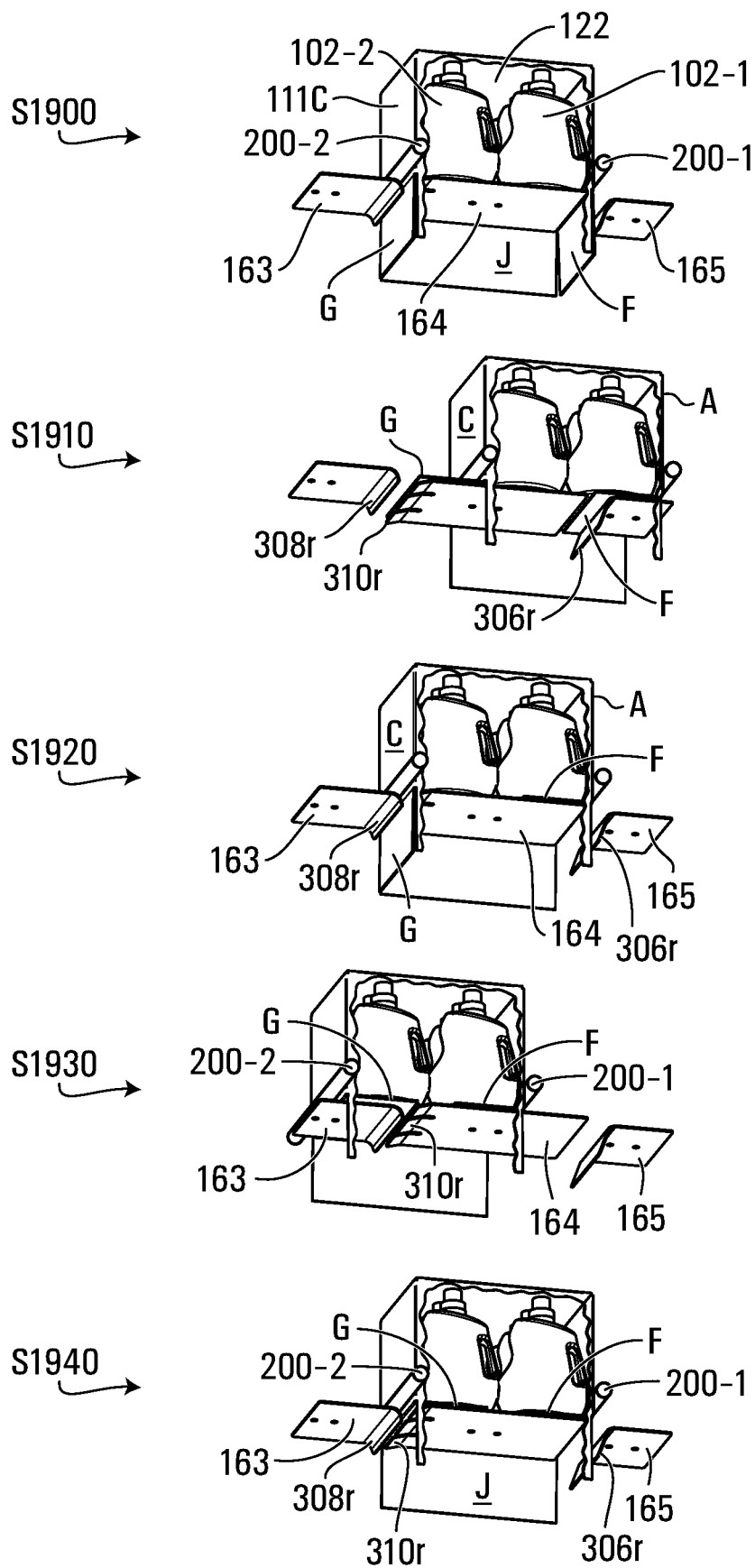
FIG. 19 is a schematic perspective view of the platforms of FIG. 18, showing various positions of a loaded case across during movement across the platforms of FIG. 18.

In some embodiments, the relative dimensions/configuration of the interior storage space 107 of an erected case 111C and the outer perimeter dimensions/configuration of the outward facing surfaces of the group 122 of items 102, are such that when the group 122 of items 102 has been bottom loaded into the storage space 107 of an erected case 111C, the outward facing surfaces of the items 102 on the perimeter of the group 122 are in very close proximity and/or in contact with the inward facing surfaces of main panels A-D such that the group of items 102 are tightly packed within the interior storage space 107 (see FIGS. 17 and 19). In such embodiments, providing a tilted angle(s) of case 111C at a load commencement position, may be particularly helpful in bottom loading the group 122 of items 102. In some other embodiments, the relative dimensions/configuration of the interior storage space 107 of an erected case 111C and the outer perimeter dimensions/configuration of the outward facing surfaces of the group 122 of items 102, are such that when the group 122 of items 102 has been bottom loaded into the storage space 107 of the erected case 111C, the outward facing surfaces of the items on the perimeter of the group 122 are not in close proximity or in contact with the inward facing surfaces of main panels A-D such that the group 122 of items 102 are not tightly packed within the interior storage space 107. In some embodiments, such as for example, where the group of items 102 is not tightly packed within storage space 107, a tilt angle of an erected case 111C at the initial load commencement position described above may not be utilized and the path of the erected case 111C created by end effector 252 may be straight vertically downwards over the group of items to bottom load the group 122 of items 102. In other embodiments, erected case 111C may in the loading commencement position shown, be angled at an angle α in the opposite angular direction to the vertical, in such a manner that main side flap J is initially, when in the preloading position, positioned vertically lower than opposite side flap K, and case 111C is in the opposite angular position about axis Z to the orientation shown in FIG. 15 and then the arced movement described above may be between opposite diagonal bottom corners of the case 111C and the top surface corners of the group 122.

As shown in FIGS. 16 and 17, when the storage space 107 of erected case 111C holds the group 122 of collated items 102, end effector 252 of robotic arm 250 may be disengaged by PLC 132 by operating electronic valves to turn off the suction cup engagement of cups 312, 313 with case 111C. thus releasing the case 111C from end effector 252. Robotic arm 250 will then move away, and return to the blank magazine 251 and be ready to engage a new case blank. Also, once end effector 252 has moved the erected case 111C vertically downwards over the group 122 of items to the fully loaded position (iv), a further input may be provided by PLC 132 operating central movement apparatus 207 to move longitudinally extending, horizontally oriented guide members 206 inwards again a short distance (for example in the range of 2 to 9 inches relative to a group 122 of items 102 and the case 111C containing the same Thus, guide members 206 can again provide side support for movement of the erected case 111C containing the group 122 of items 102 during the training and leading bottom flap movements described hereinafter.

Turning to FIGS. 18 and 19, leading and trailing, bottom flaps F and G respectively of an erected case 111C may be folded about their joints with panels A and C respectively, via horizontal, longitudinal movements across the pedestal apparatus 140. It should be noted that in FIGS. 18 and 19, the upper flaps E, I, H and L have been omitted for clarity. Also, in FIG. 19, panel K has also been omitted for clarity. First folding platform 163 and second folding platform 165 may be adjustable up and down in the vertical axis using pneumatic piston devices 167-1 and 167-2 that are interconnected thereto, controlled by valves of system 332, operated by PLC 132, such that each platform surface of first folding platform 163 and second folding platform 165 may adjust its vertical distance and position relative to the surface of the surface of central loading platform 164, to fulfil the functions described hereinafter.

First folding platform 163, second folding platform 165 and central loading platform 164 may be supported by a pedestal support frame 168. As referenced above, the entire pedestal apparatus 140 may be fastened to and suspended within the planar support plates 216 so that movement rods 200-1, 200-2 carried by their respective conveyor chains, may sweep under pedestal apparatus 140.

PLC 132 may provide signals to valve system 332, to control movement of piston device 194 such that the upper support surface of central loading platform 164 may have its longitudinal distance and position adjusted relative to the support surfaces of the first folding platform 163 and second folding platform 165 to thereby adjust the size of the longitudinal space/gap 196 between the central loading platform 164 and first folding platform 163, and the size of the longitudinal space/gap 197 between the central loading platform 164 and second folding platform 165 (FIG. 18) to facilitate the bottom flap F, G, folding sequences described hereinafter.

Movement rods 200-1, 200-2 may move into contact with and engage with the forward and rearward exterior surfaces of respectively, leading panel A and trailing panel C, of erected case 111C. Trailing movement rod 200-1 is able to apply a force to the exterior surface of panel C to slide the erected case 111C containing a group of items (illustrating only a single leading row 102-1 and a single trailing row 102-2 in FIG. 19). By moving the opened case 111C right/longitudinally forward using movement rods 200-1, 200-2 together in tandem (i.e. towards second folding platform 165), leading flap F is folded inwardly onto the top surface of second folding platform 165 beneath the row of bottles 102-1, this motion being assisted by ramp 306r. At the same time, trailing flap G is folded outwardly onto the top of central loading platform 164 being deflected upwards with the assistance of ramp 310r. This motion is illustrated between steps S1900 and S1910 in FIG. 19.

Next, first folding platform 163 and second folding platform 165 are raised under control of PLC 132 so their top support surfaces are at a position slightly higher than the support surface of central loading platform 164 (with the surface of second folding platform 165 being raised slightly more than the surface of first folding platform 163). According to some embodiments, the first folding platform 163, second folding platform 165 and central loading platform 164 may all be similar in size. Movement rods 200-1 and 200-2 then shift the case 111C back to the left/rearward (i.e. onto central loading platform 164) as illustrated in step S1920.

As is apparent in S1920, as the open and loaded case 111C shifts back onto the central loading platform 164, the trailing minor flap G is folded back vertically downwards to substantially its starting orientation, perpendicular to the item support surfaces of the platforms of pedestal apparatus 140. This folding action is effected by the leading edge of trailing flap G, catching ramp 308r of first folding platform 163—due to the surface of first folding platform 163 having been raised to a position above the surface of central loading platform 164—and being directed/deflected downwards. Leading flap F is located between the top surface of central loading platform 164 and the bottom surface of the leading row of bottles 102-1.

Next, second folding platform 165 is lowered by control of PLC 132 to a position where its support surface is slightly below the support surface of central loading platform 164 (approximately 0.5") and the movement rods 200-1 and 200-2 under control of PLC 132 shift case 111C rearwards towards the first folding platform 163, as shown in S1930. During this shift onto the first folding platform 163, trailing flap G is deflected upwards and folded onto the top surface of first folding platform 163 beneath the trailing row of bottles 102-2, this motion being assisted by ramp 308r such that the opened case 111C and its minor flaps F, G, reach the position shown in S1930. In this position, trailing flap G is now also folded horizontally inwards and is perpendicular relative to the vertical side walls of the opened case 111C. Trailing flap G is located between the top surface of first folding platform 163 and the bottom surface of the trailing row of bottles 102-2.

In the final movement in the sequence, second folding platform 165 is moved under control of PLC 132, so that its support surface is in a slightly raised position higher the support surface of central loading platform 164 (approximately 0.5") and movement rods 200-1 and 200-2 shift case 111C forward again to be completely on the surface of the central loading platform 164 such that during the shift forward, the trailing flap G is maintained in a horizontal position and the leading edge of trailing flap G catches ramp 310r of central loading platform 164.

Thus, as shown in 51940, when the opened case 111C and bottles 102-1, 102-2 contained therein are again centrally located on the support surface of central loading platform 164, leading flap F and trailing flap G have been both folded horizontally inwards and are perpendicular relative to the vertical side walls of the opened case 111C. Leading flap F is located between the top surface central loading platform 164 and the bottom surface of the leading row of bottles 102-1. Trailing flap G is located between the top surface of central loading platform 164 and the bottom surface of the trailing bottles 102-2. The result is that now the flaps F and G have both been moved into an operationally closed supporting position beneath the rows of bottles 102-1, 102-2.

Variations of the foregoing sequential movements of case 111C and flaps F, G, relative to the first folding platform 163, central loading platform 164 and second folding platform 165 are possible. For example, in a first movement of case 111C effected by movement rods 200-1, 200-2, case 111C may be moved backwards onto first folding platform 163 a sufficient rearward distance to place trailing flap G between the bases of rearward row(s) of items and the surface of the folding platform 163. This may be assisted by the leading edge of flap G catching ramp 308r. This movement may also cause leading flap F to become angled upwards from the vertical downwards direction, and outwards.

In a second movement of case 111C effected by movement rods 200-1, 200-2, case 111C may be moved forwards, back onto central loading platform 164, allowing leading flap F to drop down. Platform 163 may have been raised sufficiently relative to central platform 164 to ensure trailing flap G catches ramp 310r and is positioned between the bases of rearward row(s) of items and the surface of the central loading platform 164 during this forward movement.

In a third movement of case 111C effected by movement rods 200-1, 200-2, case 111C may be moved forwards from central loading platform 164 onto second folding platform 165, allowing leading flap F to be folded upwards and inwards. Platform 165 may have been lowered sufficiently relative to central loading platform to ensure trailing flap G catches ramp 306r and moves between the bases of rearward row(s) of items 102 and the support surface of the second folding platform 165 during this forward movement. After this movement, the result is that now the flaps F and G have both been moved into an operationally closed supporting position beneath the rows of bottles 102-1, 102-2.

Turning now to FIG. 20, after having bottom flaps F and G, moved to the closed position the collated items 102 having been bottom-loaded into the case 111D, the movement rods 200-1, 200-2 may re-engage case 111D to move case 111D containing the collated items 102 in storage space 107 to a platform 172 of an output conveyor 170, where the case 111D is handed off to output conveyor 170 for further processing. A linear actuator may be affixed to central loading platform 164. This linear actuator may bring collated items closer to robotic arm 250, and reduce the gap between the central loading platform 164 and either of first folding platform 163 and second folding platform 165.

To review the overall movement of movement rods 200-1, 200-2 (with particular reference to FIGS. 9 and 9A-C), the movement rods 200-1 and 200-2 will receive a group 122 of collated items delivered from collation platform 120 by transfer paddle 150. Movement rods 200-1 and 200-2 are moved by pairs of continuous looped conveyor chains 202-1, 200-2. Movement rods 200-1 and 200-2 primarily move in a single cyclical direction (i.e. across the surface and clockwise as shown in FIG. 9). Once each movement rod 200-1, 200-2 reaches the downstream end edge area of the pedestal apparatus 140, the movement rods will return and are cycled back to their start positions to await the next group 122 of items 102 to be loaded into a case. In the illustrated embodiment, chains 202-1, 202-2 each form loops extending about a physical perimeter of the pedestal apparatus 140 (i.e. above and below). As shown, returning to the start positions is facilitated by movement rods 200-1, 200-2 traversing with the chains in a cyclical path direction below the pedestal apparatus 140, until they have returned to their starting positions. Once there, the entire process of engagement/dis-engagement with a group 122 of items 102 may be repeated. In the illustrated embodiment, throughout this cycle of movements, the leading movement rod 200-1 remains ahead of the trailing rod 200-2.

In other embodiments, the movement rods 200-1 and 200-2 may be alternatively operated without the use of a chain loop extending around such a perimeter. For example, movement rods 200-1 and 200-2 may be configured to only traverse across a top surface, and return to the initial point by moving counter clockwise. Movement rods 200-1 and 200-2 may further alternatively be positioned extending from a vertical drivetrain and may be configured to optionally articulate in and out of the path of collated items 122.

Each collated group 122 will be transferred from collation platform 120 via transfer paddle 150. Each group 122 will have a leading face (i.e. a front or first row) and trailing face (i.e. a back or last row). Transfer paddle 150 will shift the entire collated group 122 by applying force to the back row. This will translate across the entire collated group 122, shifting all individual items 102. As the front row reaches the downstream end region of input transfer platform 162, it will meet and be engaged by leading movement rod 200-1, positioned at a cycle start position above and at the downstream end region of input transfer platform 162. Trailing movement rod 200-1 will be positioned in its cycle start position below input transfer platform 162, at a longitudinal downstream position that allows the collated items 122 (still being moved by the transfer paddle 150), to move downstream on surfaces of collation platform 120 and input transfer platform 162, until the back row of the group 122 has crossed over the gate 208 and is positioned onto the input transfer platform 162. Once there, the trailing movement rod 200-2 moves from its cycle start position below gate 208, after gate 208 is opened, to an operational engagement position where it meets and engage with the back row of collated group 122. Once both movement rods 200-1 and 200-2 have engaged with the front and back rows of the collated group 122 respectively, the movement rods 200-1 and 200-2 may be used to move together in tandem to translate the collated group to the central loading platform 164.

There, at some point prior to or during the case loading sequence, movement arms 200-1 and 200-2 will temporarily move in opposite directions from the collated group, providing between 0.5" to 2" of space for the collated group to be sheathed with a constructed case 111C by robotic arm 250 as described above.

After the collated group has been sheathed with constructed case 111C, movement arms 200-1 and 200-2 will both move in their respective directions towards front and rear faces of the panels of the erected and loaded case 111C, and may move as previously described to fold bottom minor flaps. Once this bottom leading and trailing flap F, G folding and closing has occurred, the movement arm 200-2 will push the constructed case 111C to the output conveyor 170. This final movement for the constructed case 111C to be delivered to the output conveyor 170, requires the leading movement arm 200-1 to move out of the way of the constructed case 111C. In the illustrated embodiment, as the case approaches the output conveyor 170, movement arm 200-1 will begin its movement on its return path portion to return to its start position, moving below the sealing pedestal 140, and eventually through gate 208. Similarly, once the case has been received by output conveyor 170, the trailing movement arm 200-2 will traverse the same return path, and will stop at its cycle start position before moving through gate 208 and gate 208 will then be or have been moved into a closed position.

Output Folding and Sealing Conveyor

Figure 21:
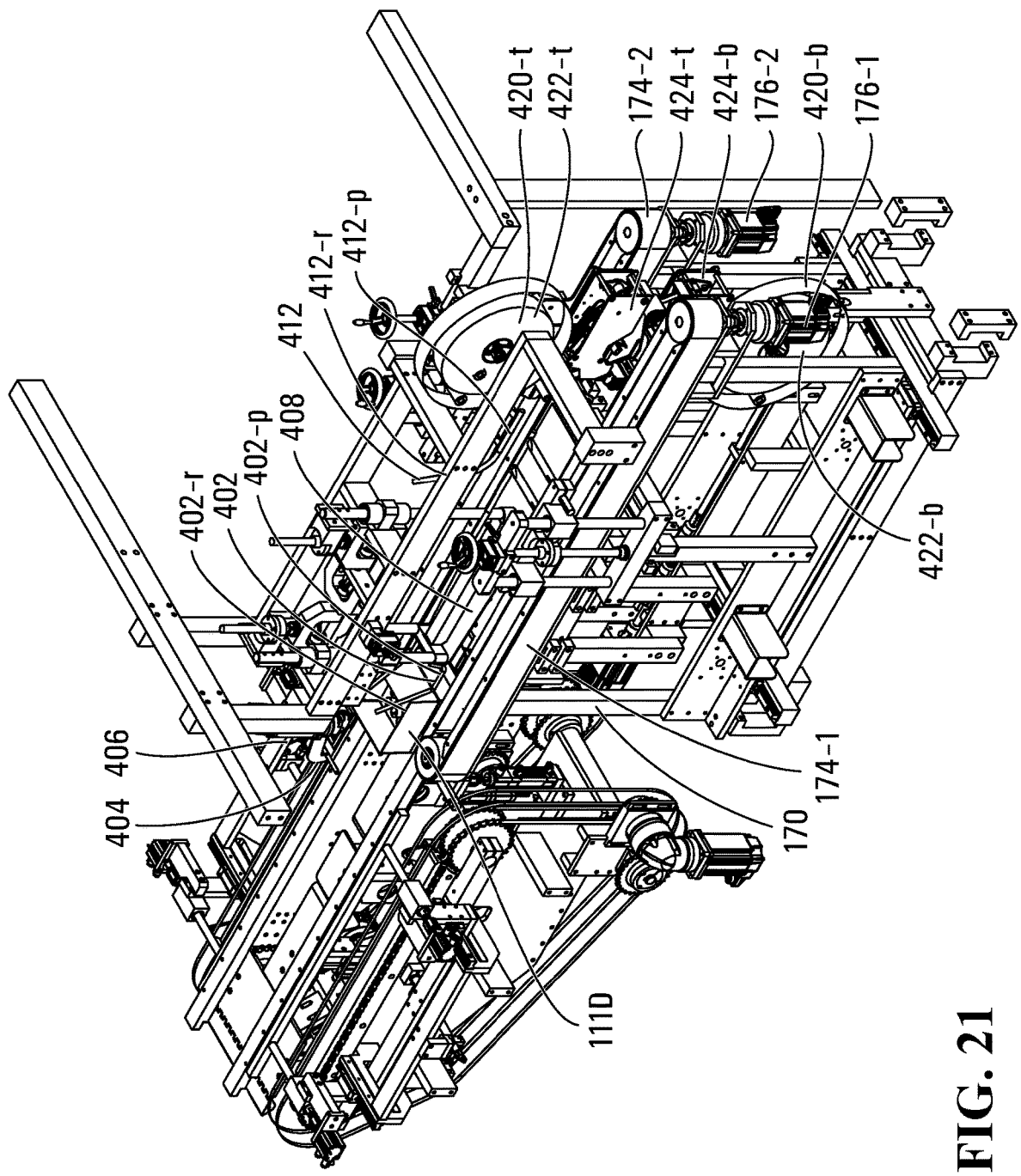
FIG. 21 an upper side perspective view of the moving rod sub-system, pedestal apparatus components and an output conveyor, of FIG. 20.
Figure 22:
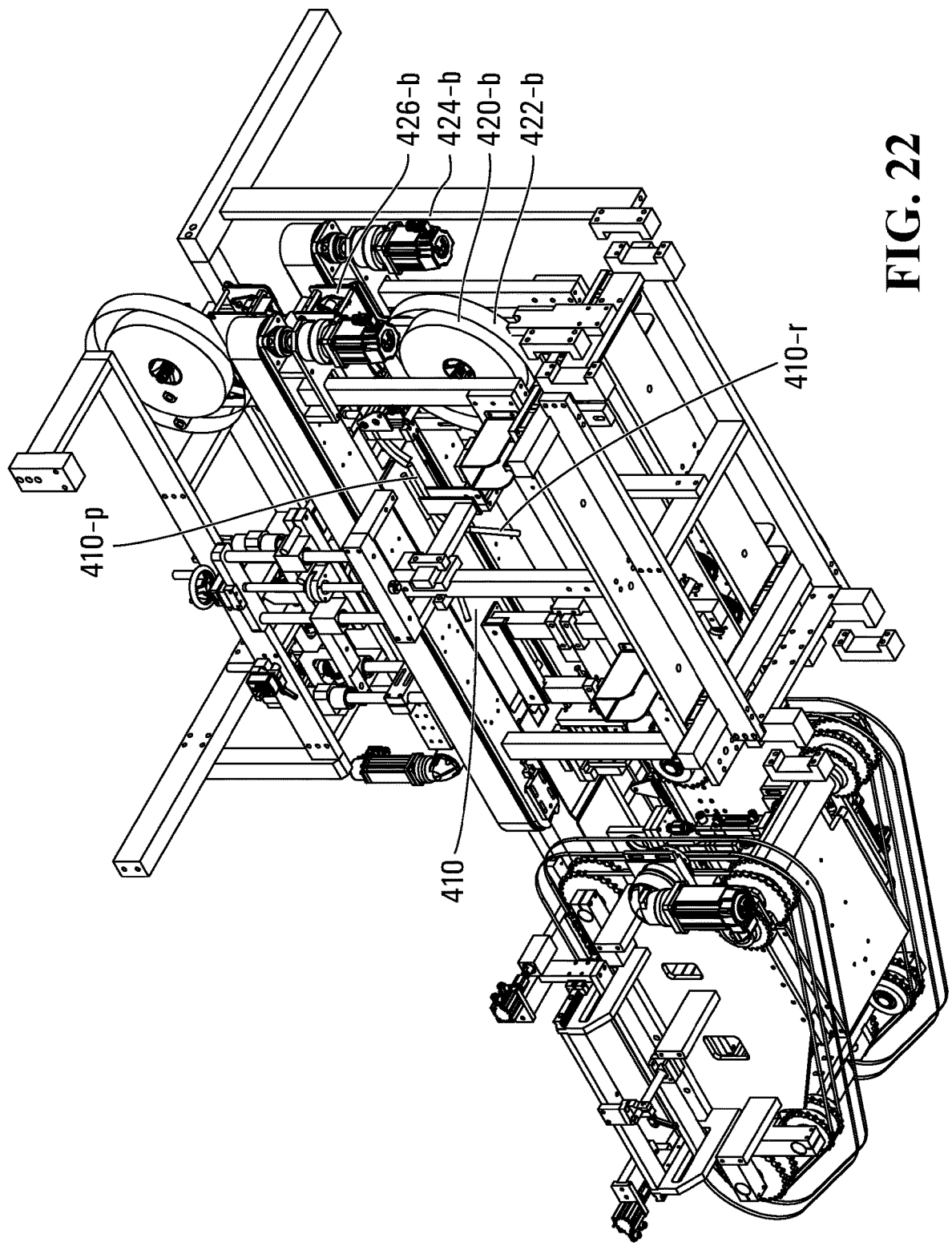
FIG. 22 is a lower side perspective view of the moving rod sub-system, pedestal apparatus components and an output conveyor, of FIG. 21.

FIGS. 21 and 22 are a top and bottom view of output conveyor 170, respectively. Output conveyor 170 may be configured to receive, from the sealing platform, a case 111D having bottom leading and trailing flaps F, G respectively, folded with a group 122 of items 102 held within interior storage space 107 defined by panels A-D of the case. Next the remaining bottom side flaps J and K can be closed, which is made relatively straightforward, since leading and trailing flaps F and G are already closed, and provide support surfaces for holding items 102 within interior space 107 of case 111D. In some embodiments where the top flaps were not closed previously, system 100 can also close the top flaps E, I, H and L. Additionally, the case typically needs to be sealed in a manner that seals the group 122 of items 102 within the storage space 107 of case 111D.

Output conveyor 170 may comprise a generally horizontal and longitudinally extending support plate with a low friction support surface, and a pair of side-mounted, transversely spaced vertically oriented side conveyor drive belts 174-1 and 174-2 that extend longitudinally, and are operable to engage the exterior surfaces of side panels B and D and drive case 111D through the remaining folding and sealing apparatuses. The spacing of conveyor drive belts 174-1 and 174-2 may be easily adjustable to vary the transverse distances therebetween, to enable cases with different width dimensions to be processed by the output conveyor 170. Conveyor drive belts 174-1 and 174-2 may be provided with high-friction case contact surfaces at a specific width corresponding to a width dimension of the case 111D. Conveyor drive belts 174-1 and 174-2 may be operable to engage side panels B and D of the case 111D and move the case 111D in a forward longitudinal and horizontal direction (Y). Conveyor drive belts 174-1 and 174-2 may be driven to move continuously. Similar to the infeed conveyor 104, output conveyor belts 174-1 and 174-2 may be driven by suitable motors 176-1 and 176-2 such as a DC motor or a variable frequency drive motor controlled through a DC motor drive (sold by Oriental under model AXH-5100-KC-30) by PLC 132. Output conveyor 170 may be configured to close the remaining open bottom flaps (flaps K, J) of case 111D and all the top flaps (flaps E, I, H, L).

Top leading/trailing flap rails 402 may be situated on a frame of system 100. Top leading/trailing flap rails 402 may have a configuration that includes a pair of side-by-side, transversely spaced, downward angled portions 402-*r* leading to a single, horizontal portion 402-*p*. As the output conveyor 170 transports a case 111D past top flap rails 402, the leading flap E will be folded inwards by first angled portion 402-*r* and held in place by horizontal portion 402-*p*. Concurrently, with the top minor flap leading portion being folded by rails 402, an overhead kicker rod device 404 driven by a servomotor 406 controlled by PLC 132 may rotate/articulate, folding the trailing flap H forward, so that it will subsequently be also engaged by first angled portion 402-*r* of flap rails 402, and then also be held in place in a closed position by horizontal portion 402-*pbe* Servomotor 406 may receive operational instructions from PLC 132. Once both leading and trailing top flaps E and H, are closed, these flaps may be maintained in a closed position by a generally flat and thin, longitudinally extending compression plate 408.

With reference now to FIG. 22, bottom side flaps J, K may also be folded using bottom rails 410, positioned on an underside of the output conveyor platform. Bottom rails 410 may be two generally tubular shapes (i.e. an elongated rounded rod or tube). The rails 410 may formed having two portions, the first portion 410-*r* being a downstream, inwardly angled input portion configured to contact the flaps J, K, and a second portion 410-*p* of the tubes narrowing to an individual point. As output conveyor 170 transports the case 111D along the first portion 410-*r* of bottom rails 410, bottom flaps J, K may be moved inward alongside the angle of the rail portion 410-*r*. At the nexus of first portion 410-*r* and second portion 410-*p*, the bottom flaps will be fully closed.

Returning to FIG. 21, a similar top flap rail 412 may be employed to fold the top side flaps I, L through the movement of the case by the output conveyor 170. The rails 412 may be formed having two portions, the first portion 412-*r* being an angled downstream, inwardly angled input portion configured to contact flaps I, L, and a second portion 412-*p* of the tubes narrowing to an individual point. As output conveyor 170 transports the case along the first portion 412-*r* of top flap rails 412, top flaps I, L may be moved inward alongside the angle of the portion. At the nexus of first portion 412-*r* and second portion 412-*p*, the top flaps I, L will fully close and the case will have traversed outside of the compression plate. It should be noted that these folding apparatuses may be able to process a variety of different sized cases without adjustment. However, the components of these folding apparatuses may also be mounted to the frame 115 in a manner that there positioning can be readily adjusted to accommodate different sized cases.

After top and bottom major flaps have been folded, the case may be then sealed at both top and bottom ends along their top and longitudinal central flaps joints, using a sealing mechanism 420. Sealing mechanism may have a top portion 420-*t* comprising a tape wheel 422-*t*. Tape wheel 422-*t* may be driven by a motor and configured to hold a supply of tape adhesive. Top portion 420-*t* may further include and seal the top of the case. A corresponding bottom portion of the sealing mechanism may also include a bottom tape wheel 422-*b* also driven by a motor and configured to also hold a supply of sealing tape. According to some embodiments, top portion and bottom portion of sealing mechanism may be a tape applicator, configured to apply a strip of tape across the top side flaps and bottom side flaps, sealing the case completely. Similarly, the top and bottom sealing mechanisms may be able to process a variety of different sized cases without adjustment. However, the components of these mechanisms may also be mounted to the frame 115 in a manner that there positioning can be readily adjusted to accommodate different sized cases. Conveyor drive belts 174-1 and 174-2 may drive the cases 111D past the upper and lower tape wheels, 422-*t*, 422-*b*, thus sealing the top and bottom central joints. The sealed cases are then discharged from output conveyor 170 for further handling.

Components of system 100, and parts thereof, that are described herein, may generally be made from generally available materials. For example, some components or parts thereof, may be made of suitable metals such as steel and/or aluminium, as will be evident to a person skilled in the art, when reading the present disclosure.

Method

Figure 23:
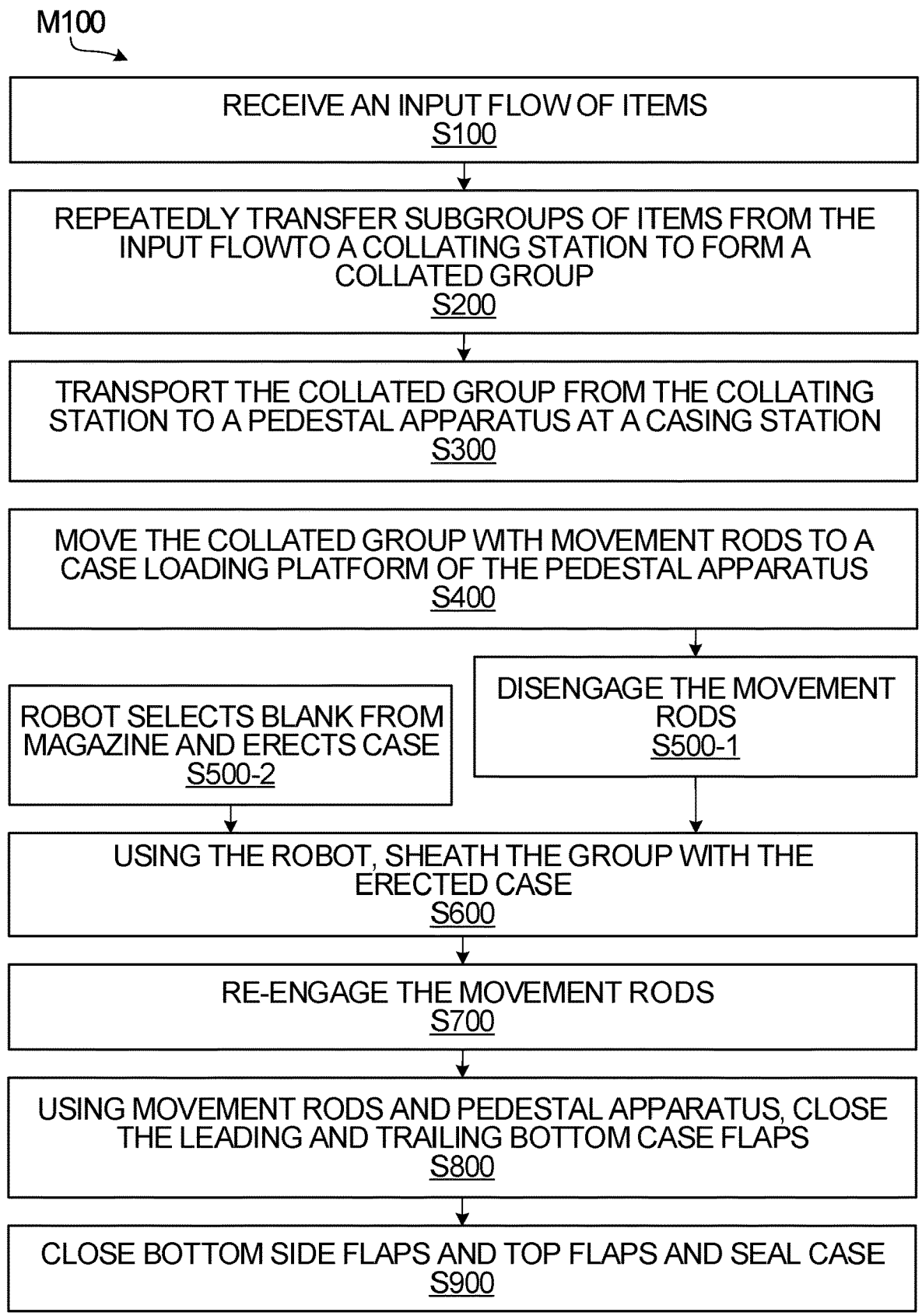
FIG. 23 is a flow chart diagram illustrating an example method of filling a case with items and closing and sealing the top and bottom ends of the case.

Turning now to FIG. 23, a flow-chart diagram describing a method M1000 of filling and sealing cases is illustrated. The method may be performed using system 100 described herein.

At step S100, an input flow of items (such as items 102) is received (such as from an input/infeed conveyor 104). The input flow of items may be received in a single line to a transfer station.

At step S200, subgroups/rows of items are transferred from the input flow to a collating station to form a collated group. This may be facilitated for example by transfer apparatus 112 including header 116 and topple plate 124. Topple plate 124 may be moved as the items are being transferred to the collating station by repeated pushing movements of header 116. The topple plate may be moved in co-ordinated movement with the header 116. The topple plate may ensure that the collated rows do not topple over throughout the addition of new collated rows by the header to the collating station. According to some embodiments, the topple plate is moved synchronously and at a similar speed to the header. Alternatively, the topple plate may be moved a predefined distance in advance of the header being actuated.

At step S300, a collated group is transferred from the collating station to pedestal apparatus at a casing area/station. The transfer may be done using another transfer apparatus, such as transfer paddle 150. The transfer apparatus may move to a first position behind the collated items on the collation platform at the collating station and slide the group of collated items to an input transfer platform of the pedestal apparatus.

At step S400, using engaged movement rods, the collated group is transported to a loading platform of the pedestal apparatus. Movement rods may include a trailing movement rod and a leading movement rod, that are individually controllable in the forwards and backwards longitudinal (Y) direction. The leading movement rod such as rod 200-1, may abut a leading edge of the collated group, and the trailing rod 200-2 may abut the rearward edge of the group. Through moving both rods in co-ordinated movement together, the movement rods may position collated items on a case loading platform.

In step S500-1—the movement rods disengage from contact with, and are spaced from, the rearward and forward edges of the group of items. This may be done by the trailing and leading movement rods moving in opposite longitudinal directions away from the collated group.

In S500-2 (which may have occurred during any of steps S200, S300 or S400) a robot (such as robotic arm 250) selects a blank from a magazine and erects a flat case blank 111A to form an erected case 111C.

At step S600, the collated group may be sheathed with an erected case. According to some embodiments, this may be performed using a robotic arm 250 having configured to pick up a knock-down blank, and lift and open the blank using an end effector equipped with a suction portion. The robotic arm may approach the collated group of items from an attack angle having a tilt about the Y, Z, or X axis, allowing for bottom flaps to remain open and provide clearance space for sheathing of the group by the erected case.

At step S700, the movement bars may re-engage with the sheathed collated group. This may be performed by the trailing and leading movement rods moving close enough to abut the collated items having a sheathed open-tube blank thereon.

At step S800, using the movement bars and pedestal apparatus, the leading and trailing bottom case flaps may be folded. The movement arms re-engage with contact on the erected case, now containing the group of items in the storage space of the case and move the case forward and rearward in relation to the pedestal apparatus. Pedestal apparatus may include left and right platforms, wherein each portion may include a ramp portion and a flat portion. Each of left and right portion may be linearly actuated in a vertical axis to allow left and right portion to be above or below the central portion. Using the method as described with relation to FIG. 19, the bottom minor flaps may be folded under the individual items.

At step S900, the bottom side flaps and all top case flaps may be closed. This may be performed by delivering the case to an output conveyor. The output conveyor may be configured to transport the case across a first rail to close the top leading and trailing flaps and a kicker arm actuated by a servomotor configured to assist in closing the top trailing minor flap. The top minor flaps may be held in place by a compression plate. Then, top rails and bottom rails may be employed to close the top and bottom side flaps. Once closed, the folded case may be fed through a top and bottom case joint sealer, configured to apply a strip of tape or adhesive to the top or bottom of the case along the exposed central flaps joints on the top and bottom of the case.

It is expected that in some embodiments, system 100 may be capable of erecting, loading, and sealing in the range of approximately 10 cases per minute, and possibly about 15 cases per minute or more, depending upon configuration of the specific cases, items/group of items, and specific component of system 100.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

Selected embodiments of the present invention may be used in a variety of fields and applications. Other features, modifications, and applications of the embodiments described here may be understood by those skilled in the art in view of the disclosure herein.

It will be understood that any range of values herein is intended to specifically include any intermediate value or sub-range within the given range, and all such intermediate values and sub-ranges are individually and specifically disclosed.

The word "include" or its variations such as "includes" or "including" will be understood to imply the inclusion of a stated integer or groups of integers but not the exclusion of any other integer or group of integers.

It will also be understood that the word "a" or "an" is intended to mean "one or more" or "at least one", and any singular form is intended to include plurals herein.

It will be further understood that the term "comprise", including any variation thereof, is intended to be open-ended and means "include, but not limited to," unless otherwise specifically indicated to the contrary.

When a list of items is given herein with an "or" before the last item, any one of the listed items or any suitable combination of two or more of the listed items may be selected and used.

What is claimed is:

1. A system for bottom loading an open case through a downward facing opening in said open case, with a plurality of un-cased items, wherein each of said plurality of un-cased items comprises a separate, rigid or semi-rigid upstanding body being self-supported on a base portion, the system comprising:
    an item delivery apparatus operable to deliver said plurality of un-cased items to a transfer station;
    a collation platform operable to support said plurality of un-cased items;
    a pedestal apparatus operable to support the plurality of items;
    a first transfer apparatus operable to transfer said plurality of un-cased items at said transfer station from said item delivery apparatus to said collation platform, to form a group of un-cased items on said collation platform from said plurality of un-cased items;
    a second transfer apparatus operable to transfer the group of un-cased items from said collation platform to said pedestal apparatus;
    at least one transversely extending movement rod operable to be driven in longitudinal movement by a rod movement drive apparatus;
    a case movement apparatus located proximate said pedestal apparatus, said case movement apparatus operable to move said open case in a path that sheaths the group of un-cased items located on said pedestal apparatus with said open case;
    wherein in operation:
    (a) said item delivery apparatus delivers said plurality of un-cased items to said transfer station;
    (b) said first transfer apparatus transfers said plurality of un-cased items from said item delivery apparatus to said collation platform, to form said group of un-cased items on said collation platform;
    (c) said second transfer apparatus transfers said group of un-cased items from said collation platform to a first upstream surface of said pedestal apparatus;
    (d) said at least one movement rod engages said group of un-cased items at a rearward transverse side of said group of un-cased when said group of un-cased items is located on said first upstream surface of said pedestal apparatus and moves said group of un-cased items on said pedestal apparatus onto a second downstream surface of said pedestal apparatus;
    (e) said at least one movement rod dis-engages from said group of un-cased items on said second downstream surface of said pedestal apparatus;
    (f) after (e) said case movement apparatus moves said open case to sheath said group of un-cased items located on said pedestal apparatus such that said group of un-cased items are received through said downward facing opening into said open case and a side of said open case is received between said at least one rod and said rearward side of said group of un-cased items, whereby said un-cased group of items is formed into a group of cased items;

(g) after (f) said at least one rod re-engages said open case at a rearward side of said open case on said pedestal apparatus, and moves said open case and said group of cased items held therein to a location for further processing.

2. The system as claimed in claim 1 wherein said at least one movement rod comprises first and second movement rods and wherein in operation said first movement rod is a trailing movement rod that engages said rearward transverse side of said group of un-cased items and said second movement rod is a leading movement rod that engages a forward transverse side of said group of un-cased items and wherein said trailing and leading movement rods move in tandem contact with said group of un-cased items to move said group of un-cased items on at least one support surface of said pedestal apparatus.

3. The system as claimed in claim 1, wherein said case movement apparatus comprises a multi-axis robot arm having an end effector operable to engage with, and release, said open case.

4. The system as claimed in claim 3, wherein said end effector is mounted to a multi-segment arm of said robot arm and said end effector is operable to rotate about several axes of rotation provided by said multi-segment arm.

5. The system as claimed in claim 3, wherein said end effector is operable to rotate about at least six separate axes of rotation.

6. The system as claimed in claim 3, wherein said end effector is operable to engage a flattened case blank and open said flattened case blank into said open case that is suitably configured to sheath said group of un-cased items.

7. The system as claimed in claim 3, wherein said items are each supported on a base portion in a generally vertically upright orientation, and wherein end effector is operable to move said open case in a path to sheath said group of un-cased items, said open case having a tilted position in which while said open case is located proximate to said group of un-cased items, said open case is tilted from a vertical axis at a tilt angle.

8. The system as claimed in claim 7, wherein in said tilted position, of the said open case is tilted from a vertical axis by said tilt angle being in the range of 5 to 20 degrees from the vertical axis.

9. The system as claimed in claim 8 wherein said tilt angle comprises both a transverse tilt angle and a longitudinal tilt angle each in the range of 5 to 20 degrees from the vertical axis.

10. The system as claimed in claim 7 wherein end effector is operable to move said open case from said tilted position by pivoting said open case about a first bottom corner of said open case such that a diagonally opposite corner of said open case moves in an arced path portion, to a case engagement position.

11. The system as claimed in claim 10 wherein when in operation, said end effector moves said open case in said arced path portion, to said case engagement position, a bottom plane defined by bottom edges of a plurality of bottom flaps of said open case, will become parallel to a horizontal plane defined by a top surface plane of the group of un-cased items.

12. The system as claimed in claim 10, wherein said path of said end effector has a vertical path portion such that robotic arm is operable to move said open case vertically downward from said case engagement position to a fully loaded position.

13. The system as claimed in claim 7, wherein said open case has a plurality of bottom flaps, and when said open case is angled at said tilt angle, a first side flap is positioned below a top surface of said group of un-cased items.

14. The system as claimed in claim 13 and when said open case is angled at said tilt angle, a second side flap of said open case, opposite to said first side flap, is also positioned below said top surface of said group of un-cased items.

15. The system as claimed in claim 7, wherein said path of said end effector has a vertical path portion and wherein while said group of un-cased items is on said pedestal apparatus, said end effector changes the tilt angle to zero as said open case moves from said tilted position to said vertical path portion.

16. The system as claimed in claim 15 wherein during said vertical path portion, said open case is moved vertically downward to locate said group of un-cased items within a storage space of said open case.

17. The system as claimed in claim 1, wherein the first transfer apparatus comprises a header configured to actuate from a first position to a second position, wherein the first position of the header allows for a collated row of individual items to move in front of the header, and wherein in the second position of the header pushes said plurality of items from the input delivery apparatus to the collation platform.

18. The system as claimed in claim 17 wherein said first transfer apparatus further comprises a topple plate configured to move in co-ordinated movement with said header, said topple plate operable to assist in maintaining said plurality of items in an upright orientation during movement from said input delivery apparatus to said collation platform.

19. The system as claimed in claim 18, wherein the second transfer apparatus comprises a transfer paddle operable to slide said group of un-cased items from a support surface of said collation platform onto said central loading platform of said pedestal apparatus.

20. The system as claimed in claim 1, wherein the second transfer apparatus comprises a transfer paddle operable to move said group of un-cased items from said collation platform to said pedestal apparatus.

21. The system as claimed in claim 1, further comprising transversely spaced, opposed guide members positioned to support opposed longitudinal sides of said plurality of items when said plurality of items are being transferred by said first transfer to said collation platform, to form said group of un-cased items on said collation platform.

22. The system as claimed in claim 1, further comprising transversely spaced, opposed guide members positioned to support opposed longitudinal sides of said group of un-cased items when said group of un-cased items are being transferred by said second transfer apparatus from said collation platform to said pedestal apparatus.

23. The system as claimed in claim 1 further comprising an output conveyor configured to receive the open case from the pedestal apparatus.

24. The system as claimed in claim 1 wherein the plurality of un-cased items are bottles.

25. A system of loading an open case with a plurality of un-cased items, the system comprising:
an item delivery apparatus operable to deliver said plurality of un-cased items to a transfer station;
a collation platform operable to support said plurality of un-cased items;
a pedestal apparatus operable to support the group of un-cased items;
a first transfer apparatus operable to transfer said plurality of un-cased items from said item delivery apparatus at said transfer station, to said collation platform, to form a group of un-cased items on said collation platform;
a second transfer apparatus operable to transfer the group of un-cased items from said collation platform to said pedestal apparatus;
at least one movement rod operable to be driven in longitudinal movement by a rod movement drive apparatus;
a case movement apparatus located proximate said pedestal apparatus, said case movement apparatus operable to move an open case in a path that sheaths a group of items located on said pedestal apparatus with an open case;
wherein in operation:
(a) said item delivery apparatus delivers said plurality of un-cased items to said transfer station;
(b) said first transfer apparatus transfers said plurality of un-cased items from said item delivery apparatus at said transfer station, to said collation platform, to form said group of un-cased items on said collation platform;
(c) said second transfer apparatus transfers said group of un-cased items from said collation platform to said pedestal apparatus;
(d) said at least one movement rod engages said group of un-cased items and moves said group of un-cased items while on said pedestal apparatus;
(e) said at least one movement rod dis-engages from said group of un-cased items on said pedestal apparatus;
(f) said case movement apparatus moves an open case to sheath and encase said group of items located on said pedestal apparatus;
wherein said at least one movement rod comprises first and second movement rods and wherein in operation said first movement rod is a trailing movement rod that engages a rearward side of said group of un-cased items and said second movement rod is a leading movement rod that engages a forward side of said group of un-cased items, and wherein said trailing rod and leading rod move in tandem contact with said group of un-cased items to move said group of un-cased items on said pedestal apparatus.

26. The system as claimed in claim 25, wherein the pedestal apparatus further comprises: a first folding platform; a second folding platform; and a central loading platform located between said first folding platform and said second loading platform; and wherein in operation, after (f), then (g) wherein said first and second movement rods re-engage said group of cased items on said central loading platform, and move said open case and said group of cased items held therein, in forward and rearward movements over said first folding platform, said central loading platform and second folding platform to thereby close a trailing bottom flap and a leading bottom flap of said open case, to support positions between said group of cased items and said pedestal apparatus.

27. The system as claimed in claim 26, wherein the first folding platform and the second folding platform are located on opposite longitudinal sides of the central loading platform.

28. The system as claimed in claim 27 wherein each of said first folding platform and said second folding platform, comprise a first surface that is a ramp portion at a proximal side to the central loading platform and a second surface that is a flat portion at a distal side of the central loading platform.

29. The system as claimed in claim 26, wherein said system is operable such that after (g), then (h) wherein said first and second movement rods move said open case to a flap folding apparatus, said flap folding apparatus is operable to close first and second opposed bottom side flaps of said open case.

30. The system as claimed in claim 29 wherein said open case has a plurality of top flaps and said flap folding apparatus is operable to close said plurality of top flaps of said open case.

31. The system as claimed in claim 29, wherein said system further comprises a flap sealing apparatus operable to seal the top flaps and bottom flaps of said open case.

32. The system as claimed in claim 26, further comprising a gate apparatus operable for movement between (i) a closed position wherein said trailing movement rod is positioned beneath said at least one support surface of said pedestal apparatus and an opening in said at least one support surface of said pedestal apparatus is closed by said gate such that said group of un-cased items can pass from said collation platform, over said gate and onto said pedestal apparatus; and (ii) an open position which allows said trailing movement rod to move through said opening in said at least one support surface of said pedestal apparatus to an engagement position behind said group of un-cased items on said pedestal apparatus.

33. The system as claimed in claim 25 wherein said first and second movement rods are generally oriented to and extend in a direction generally transverse direction and said first and second movement rods move forwards and backwards in a longitudinal direction of movement relative to said pedestal apparatus.

34. The system as claimed in claim 25, wherein said pedestal apparatus comprises:
a first folding platform;
a second folding platform; and
a central pedestal disposed longitudinally between said first folding platform and the second folding platform;
wherein, in operation, the first and second movement rods move tandem to move the open case and the group of items held therein, in forward and rearward movements over and relative to the first folding platform, the central pedestal and the second folding platform to thereby close a trailing bottom flap and a leading bottom flap of the open case.

35. The system as claimed in claim 25 wherein the plurality of un-cased items are a plurality of un-cased bottles.

36. A system for bottom loading an open case through a downward facing opening in said open case, with a plurality of items, wherein each of said plurality of items comprises a rigid or semi-rigid upstanding body being self-supported on a base portion, the system comprising:
an item delivery apparatus operable to deliver said plurality of items to a transfer station;
a collation platform operable to support said plurality of items;
a pedestal operable to support the plurality of items;
an item movement sub-system operable to:
move said plurality of items at the transfer station from the item delivery apparatus to the collation platform, to form a group of un-cased items on the collation platform; and
move the group of un-cased items from the collation platform to the pedestal;
a case movement apparatus located proximate to the pedestal apparatus, the case movement apparatus operable to move said open case in a path that sheaths, with said open case, said group of un-cased items located on the pedestal;

wherein, in operation:
the item delivery apparatus delivers the plurality of items to the transfer station;
the item movement sub-system moves the plurality of items from the item delivery apparatus to the collation platform, to form the group of un-cased items on the collation platform;
the item movement sub-system moves the group of un-cased items from the collation platform to the pedestal;
the case movement apparatus moves the open case to sheath the group of un-cased items located on the pedestal, such that said group of cased items are received through said downward facing opening in said open case to form a group of cased items;

wherein said system further comprises:
a first folding platform;
a second folding platform; wherein the first folding platform is located on a longitudinally opposite side of said pedestal to a side where said second folding platform is located;
wherein, in operation, the item movement sub-system provides forward and rearward longitudinal movements of the open case and the group of cased items held therein, relative to first, second and third upward facing surfaces of respectively the first folding platform, the pedestal and the second folding platform, to thereby close a trailing bottom flap and a leading bottom flap of the open case with the group of cased items held in said open case.

37. The system as claimed in claim 36 wherein the item moving sub-system is further operable to hold the group of un-cased items on said pedestal and operable to release said group of un-cased items to enable said group of un-cased items located on said pedestal to be sheathed with said open case by said case movement apparatus.

38. The system as claimed in claim 37 wherein said item moving sub-system comprises at least one movement rod operable to engage said group of un-cased items and move said group of items to said pedestal and wherein said at least one movement rod thereafter dis-engages from said group of un-cased items on said pedestal.

39. The system as claimed in claim 36 wherein the plurality of items are bottles.

40. A system for bottom loading an open case through a downward facing opening in said open case, with a plurality of items, wherein each of said plurality of items comprises a separate, rigid or semi-rigid upstanding body being self-supported on a base portion, the system comprising:
an item delivery apparatus operable to deliver said plurality of items to a transfer station;
a collation platform operable to support said plurality of items;
a pedestal apparatus operable to support the plurality of items;
a first transfer apparatus operable to transfer said plurality of items at said transfer station, from said item delivery apparatus to said collation platform, to form a group of items on said collation platform;
a second transfer apparatus operable to transfer the group of items from said collation platform to said pedestal apparatus;
at least one transversely extending movement rod operable to be driven in longitudinal movement by a rod movement drive apparatus;
a case movement apparatus located proximate said pedestal apparatus, said case movement apparatus operable to move said open case in a path that sheaths a group of items located on said pedestal apparatus with said open case;

wherein in operation:
a. said item delivery apparatus delivers said plurality of items to said transfer station;
b. said first transfer apparatus transfers said plurality of items from said item delivery apparatus to said collation platform, to form said group of items on said collation platform;
c. said second transfer apparatus transfers said group of items from said collation platform to a first upstream surface of said pedestal apparatus;
d. said at least one movement rod engages said group of items at a rearward transverse side of said group of products when said group of products is located on said first upstream surface of said pedestal apparatus and moves said group of items on said pedestal apparatus onto a second downstream surface of said pedestal apparatus;
e. said at least one movement rod dis-engages from said group of items on said second downstream surface of said pedestal apparatus;
f. after (e) said case movement apparatus moves said open case to sheath said group of items located on said pedestal apparatus such that said group of items are received through said downward facing opening in said open case;
and wherein said at least one movement rod comprises first and second movement rods, and wherein in operation said first movement rod is a trailing movement rod that engages a rearward side of said group of items and said second movement rod is a leading movement rod that engages a forward side of said group of items and wherein said trailing and leading movement rods move in tandem contact with said group of items to move said group of items from said first upstream surface of said pedestal apparatus onto said second downstream surface of said pedestal apparatus;
and wherein said system further comprises: a gate apparatus operable for movement between (i) a closed position wherein said trailing movement rod is positioned below the vertical level of the second downstream surface of said pedestal apparatus and an opening between said collation platform and said second downstream support surface of said pedestal apparatus is closed by said gate such that said group of items can pass from said collation platform, over a surface of said gate and onto said second downstream surface of said pedestal apparatus; and (ii) an open position which during operation, permits said trailing movement rod to move through said opening to an engagement position behind said group of items on said first upstream surface of said pedestal apparatus.

41. The system as claimed in claim 40, wherein said gate apparatus is positioned longitudinally downstream of said collation platform.

42. The system as claimed in claim 40, wherein the plurality of items comprises a plurality of bottles.

43. A system for bottom loading an open case through a downward facing opening in said open case, with a plurality of items, wherein each of said plurality of items comprises a rigid or semi-rigid upstanding body being self-supported on a base portion, the system comprising:
- an item delivery apparatus operable to deliver said plurality of items to a transfer station;
- a collation platform operable to support said plurality of items;
- a pedestal apparatus operable to support the plurality of items;
- a first transfer apparatus operable to transfer said plurality of items at said transfer station, from said item delivery apparatus to said collation platform, to form a group of items on said collation platform;
- a second transfer apparatus operable to transfer the group of items from said collation platform to said pedestal apparatus;
- at least one transversely extending movement rod operable to be driven in longitudinal movement by a rod movement drive apparatus;
- a plurality of transversely spaced, opposed guide members positioned to support opposed longitudinal sides of said group of items when said group of items are being transferred by said second transfer apparatus from said collation platform to said pedestal apparatus;
- a case movement apparatus located proximate said pedestal apparatus, said case movement apparatus operable to move said open case in a path that sheaths a group of items located on said pedestal apparatus with said open case;

wherein in operation:
  (a) said item delivery apparatus delivers said plurality of items to said transfer station;
  (b) said first transfer apparatus transfers said plurality of items from said item delivery apparatus to said collation platform, to form said group of items on said collation platform;
  (c) said second transfer apparatus transfers said group of items from said collation platform to a first upstream surface of said pedestal apparatus with the guide members supporting opposed longitudinal sides of said group of items
  (d) said at least one movement rod engages said group of items at a rearward transverse side of said group of products when said group of products is located on said first upstream surface of said pedestal apparatus and moves said group of items on said pedestal apparatus onto a second downstream surface of said pedestal apparatus;
  (e) said at least one movement rod dis-engages from said group of items on said second downstream surface of said pedestal apparatus;
  (f) after (e) said case movement apparatus moves said open case to sheath said group of items located on said pedestal apparatus such that said group of items are received through said downward facing opening in said open case and a side of said open case is received between said at least one rod and said rearward side of said group of items, and opposed longitudinal sides of said case are received between respective longitudinal sides of said group of items and said guide members.

44. The system as claimed in claim 43, wherein the plurality of items comprises a plurality of bottles.

45. A system for bottom loading an open case through a downward facing opening in said open case, with a plurality of items, wherein each of said plurality of items comprises a rigid or semi-rigid upstanding body being self-supported on a base portion, the system comprising:
- an item delivery sub-system operable to deliver said plurality of items to a collation platform, said collation platform operable to support said plurality of items;
- a pedestal apparatus located downstream of said collation platform and operable to support the plurality of items;
- a transfer apparatus operable to transfer the group of items from said collation platform to said pedestal apparatus;
- transversely oriented first and second movement rods operable to be driven in longitudinal movement by a rod movement drive apparatus; wherein in operation said first movement rod is a trailing movement rod that engages a rearward side of said group of items and said second movement rod is a leading movement rod that engages a forward side of said group of items and wherein said trailing and leading movement rods move in tandem contact with said group of items to move said group of items on at least one support surface of said pedestal apparatus;
- a case movement apparatus located proximate said pedestal apparatus, said case movement apparatus operable to move said open case in a path that sheaths a group of items located on said pedestal apparatus with said open case;

wherein in operation:
  (a) said item delivery apparatus delivers said plurality of items to said collation platform;
  (b) said transfer apparatus transfers said plurality of items from said collation platform to said pedestal apparatus;
  (c) said first and second movement rods engage said group of items and move said group of items on said pedestal apparatus;
  (d) said first and second movement rods dis-engage from said group of items on said pedestal apparatus;
  (e) said case movement apparatus moves said open case to sheath said group of items located on said pedestal apparatus such that said group of items are received through said downward facing opening in said open case;

and wherein said system further comprises: a gate apparatus operable for movement between (i) a closed position wherein said trailing movement rod is positioned beneath said at least one support surface of said pedestal apparatus and an opening in said at least one support surface of said pedestal apparatus is closed by said gate such that said group of items can be transferred by said transfer apparatus from said collation platform, over said gate and onto said pedestal apparatus; and (ii) an open position which allows said trailing movement rod to move through said opening in said at least one support surface of said pedestal apparatus to an engagement position behind said group of items on said pedestal apparatus.

46. The system as claimed in claim 45, wherein the pedestal apparatus further comprises: a first folding platform; a second folding platform; and a central loading platform located between said first folding platform and said second loading platform; and wherein in operation, after (e), then (f) wherein said first and second movement rods re-engage said group of items on said central loading platform, and provide for relative movement of said open case and said group of items held therein, in forward and rearward relative movements over said first folding platform, said central loading platform and second folding platform, to thereby close a trailing bottom flap and a leading bottom flap of said open case, to support positions between said group of items and said pedestal apparatus.

47. The system as claimed in claim 46, wherein the first folding platform and the second folding platform are located on opposite longitudinal sides of the central loading platform.

48. The system as claimed in claim 47, wherein each of said first folding platform and said second folding platform, comprise a first surface that is a ramp portion at a proximal side to the central loading platform and a second surface that is a flat portion at a distal side of the central loading platform.

49. The system as claimed in claim 46, wherein said system is operable such that after (f), then (g) wherein said first and second movement rods move said open case to a flap folding apparatus, said flap folding apparatus is operable to close first and second opposed bottom side flaps of said open case.

50. The system as claimed in claim 49 wherein said open case has a plurality of top flaps and said flap folding apparatus is operable to close said plurality of top flaps of said open case.

51. The system as claimed in claim 50, wherein said system further comprises a flap sealing apparatus operable to seal the top flaps and bottom flaps of said open case.

52. The system as claimed in claim 45, wherein the plurality of items comprises a plurality of bottles.

53. A system for loading cases with a plurality of items, the system comprising:
an item delivery apparatus operable to deliver the plurality of items to a transfer station;
a collation platform operable to support a group of items;
a pedestal apparatus operable to support the group of items;
an item movement sub-system operable to:
move the plurality of items at the transfer station, from the item delivery apparatus to the collation platform, to form the group of items on the collation platform; and
move the group of items from the collation platform to the pedestal apparatus;
wherein said pedestal apparatus comprises a central pedestal, a first folding platform and a second folding platform, wherein the first folding platform comprises a ramp portion at a proximal side to the central pedestal and a flat portion at a distal side of the central pedestal, and wherein the second folding platform comprises a ramp portion at a proximal side to the central pedestal and a flat portion at a distal side of the central pedestal;
a case movement and loading sub-system operable to move an open case blank to a position such that an open case blank is loaded with a group of items located on the central pedestal, the case movement and loading sub-system also operable to move the open case blank and the group of items held therein, in forward and rearward movements over the first folding platform, the central pedestal and the second folding platform to thereby close a trailing bottom flap and a leading bottom flap of the open case blank;
wherein, in operation:
the item delivery apparatus delivers a plurality of items to the transfer station;
the item movement sub-system transfers a plurality of items from the item delivery apparatus at the transfer station, to the collation platform, to form the group of items on the collation platform;
the item movement sub-system transfers the group of items from the collation platform to the central pedestal;
the case movement and loading sub-system loads the open case blank with the group of items located on the central pedestal; and
the case movement and loading sub-system moves the open case blank and the group of items held therein, in forward and rearward movements over the first folding platform, the central pedestal and the second folding platform to thereby close the trailing bottom flap and the leading bottom flap of the open case blank.

54. The system as claimed in claim 53, wherein the plurality of items comprises a plurality of bottles.

\* \* \* \* \*